(12) United States Patent
Ono et al.

(10) Patent No.: US 9,195,032 B2
(45) Date of Patent: Nov. 24, 2015

(54) IMAGE PICKUP APPARATUS EQUIPPED WITH ZOOM LENS WITH BENT OPTICAL PATH

(75) Inventors: Kenji Ono, Fussa (JP); Tetsuya Yanai, Kodaira (JP); Masato Katayose, Utsunomiya (JP)

(73) Assignee: OLYMPUS CORPORATION, Tokyo (JP)

( * ) Notice: Subject to any disclaimer, the term of this patent is extended or adjusted under 35 U.S.C. 154(b) by 448 days.

(21) Appl. No.: 13/532,573

(22) Filed: Jun. 25, 2012

(65) Prior Publication Data
US 2012/0327276 A1   Dec. 27, 2012

(30) Foreign Application Priority Data

| Jun. 24, 2011 | (JP) | 2011-140553 |
| Aug. 31, 2011 | (JP) | 2011-189895 |
| Sep. 27, 2011 | (JP) | 2011-211232 |
| Sep. 27, 2011 | (JP) | 2011-211233 |

(51) Int. Cl.
G02B 15/14   (2006.01)
G02B 13/00   (2006.01)
G02B 15/177  (2006.01)

(52) U.S. Cl.
CPC .......... *G02B 13/0065* (2013.01); *G02B 13/009* (2013.01); *G02B 15/177* (2013.01)

(58) Field of Classification Search
CPC ...... G02B 15/177; G02B 15/20; G02B 15/24; G02B 15/14; H04N 5/262
USPC ........................... 359/676, 686–688, 713–714
See application file for complete search history.

(56) References Cited

U.S. PATENT DOCUMENTS

| 6,452,729 | B2 | 9/2002 | Yamamoto | |
| 7,079,328 | B2 | 7/2006 | Kuba | |
| 7,193,786 | B2 | 3/2007 | Arimoto et al. | |
| 7,375,900 | B2 | 5/2008 | Yagyu et al. | |
| 7,379,250 | B2 * | 5/2008 | Souma | 359/686 |
| 7,443,599 | B2 | 10/2008 | Kohno et al. | |
| 7,458,735 | B2 | 12/2008 | Souma et al. | |
| 7,791,817 | B2 | 9/2010 | Shirota | |
| 7,869,134 | B2 | 1/2011 | Matsusaka et al. | |
| 7,982,968 | B2 | 7/2011 | Matsusaka et al. | |
| 8,049,969 | B2 * | 11/2011 | Nagaoka | 359/682 |

(Continued)

FOREIGN PATENT DOCUMENTS

| JP | 2001-343587 | 12/2001 |
| JP | 2004-205796 | 7/2004 |
| JP | 2005-338344 | 12/2005 |

(Continued)

*Primary Examiner* — Ricky Mack
*Assistant Examiner* — Robert E Tallman
(74) *Attorney, Agent, or Firm* — Kenyon & Kenyon LLP

(57) ABSTRACT

A zoom lens with a bent optical path includes, in order from the object side to the image side, a first lens unit including the reflecting member and having a negative refractive power, a second lens unit having a positive refractive power, a third lens unit having a negative refractive power, and a fourth lens unit having a positive refractive power. During zooming from the wide angle end to the telephoto end, the second lens unit moves closer to the first lens unit only toward the object side, the third lens unit moves in such a way that it becomes closest to the second lens unit at an intermediate focal length position in the course of zooming as compared to the state at the wide angle end and the state at the telephoto end, and the fourth lens unit moves. The zoom lens satisfies a certain condition.

51 Claims, 25 Drawing Sheets

(56) References Cited

U.S. PATENT DOCUMENTS

| | | | |
|---|---|---|---|
| 8,130,452 | B2 | 3/2012 | Shirota |
| 2010/0165480 | A1 | 7/2010 | Yamaguchi et al. |

FOREIGN PATENT DOCUMENTS

| | | |
|---|---|---|
| JP | 2006-330349 | 12/2006 |
| JP | 2006-343554 | 12/2006 |
| JP | 2007-072263 | 3/2007 |
| JP | 2007-232974 | 9/2007 |
| JP | 2007-279147 | 10/2007 |
| JP | 2008-096787 | 4/2008 |
| JP | 2010-152143 | 7/2010 |
| JP | 2010-152148 | 7/2010 |
| JP | 2010-181787 | 8/2010 |
| JP | 2011-059496 | 3/2011 |
| JP | 2011-059497 | 3/2011 |
| JP | 2011-059498 | 3/2011 |
| JP | 2013-064912 | 4/2013 |
| WO | 2006/115107 | 11/2006 |
| WO | 2008/072466 | 6/2008 |

* cited by examiner

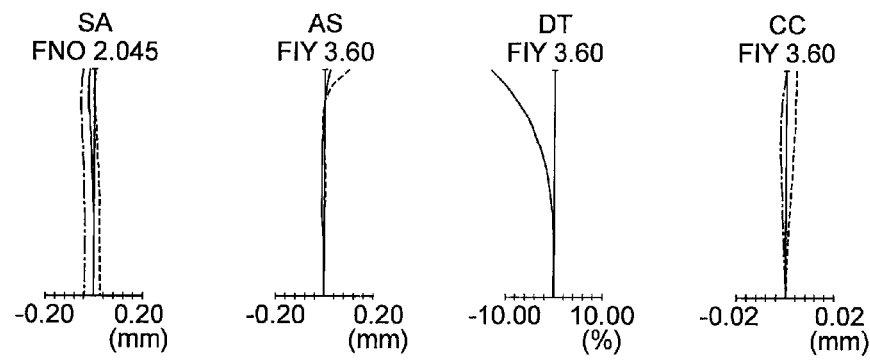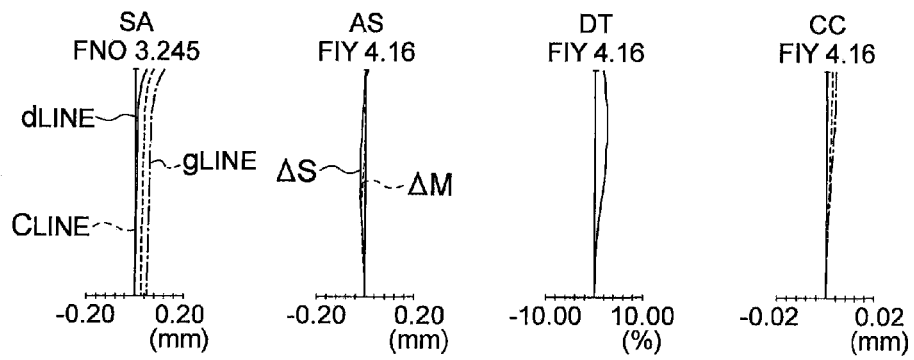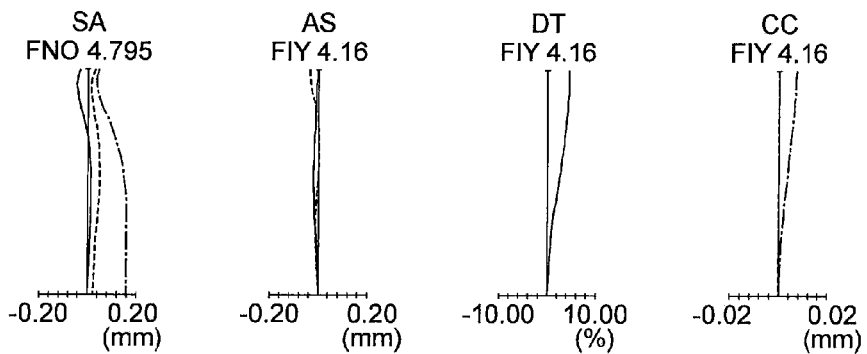

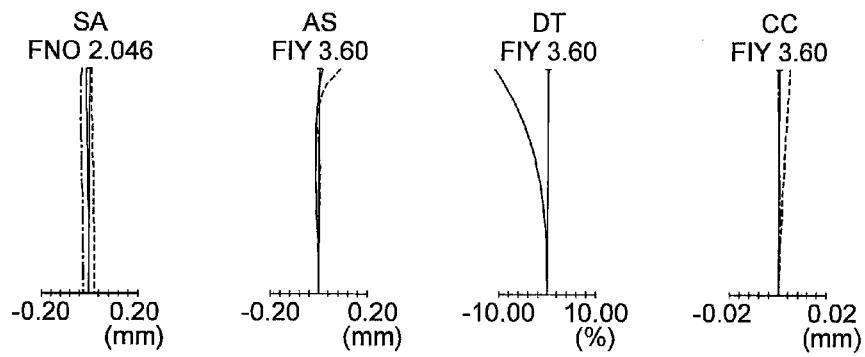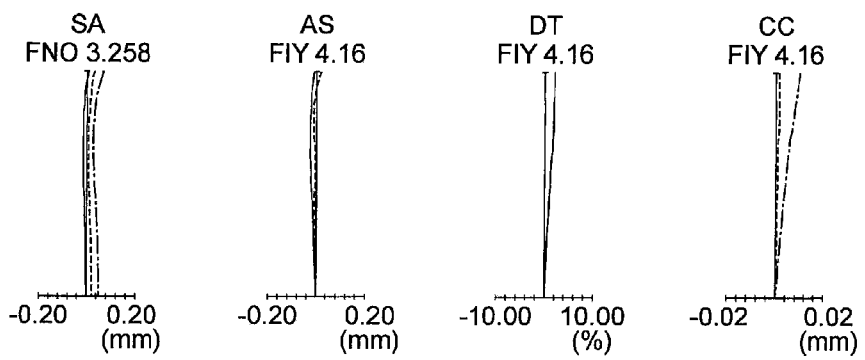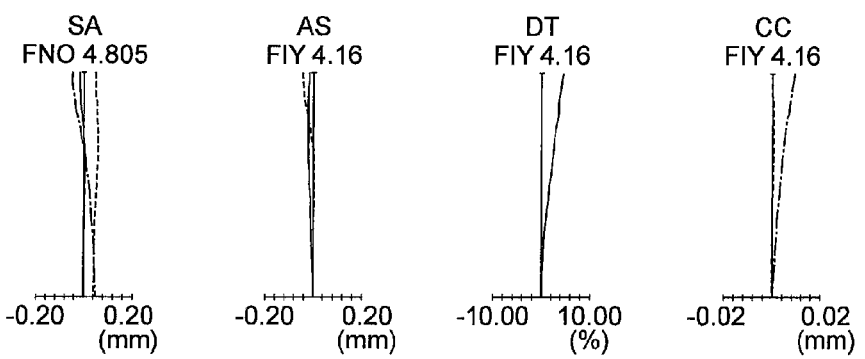

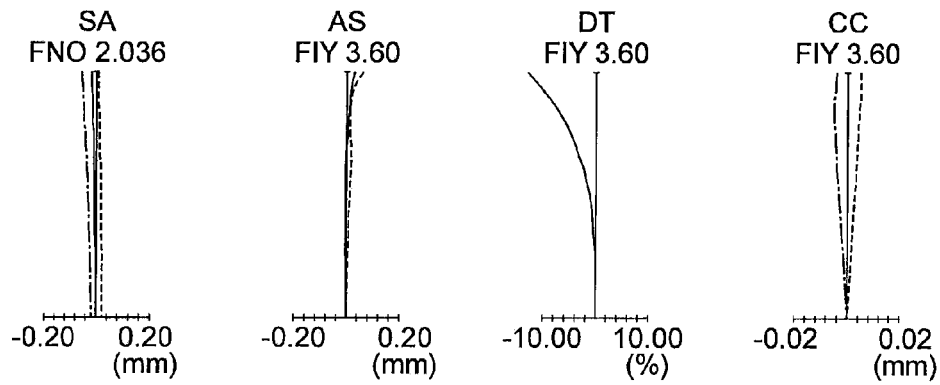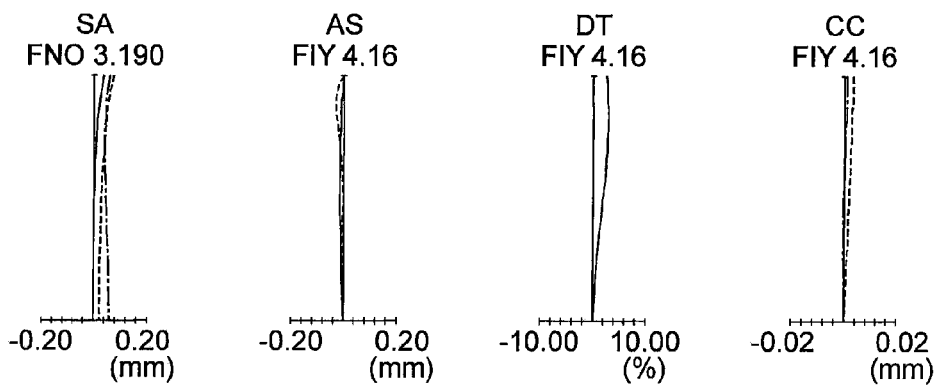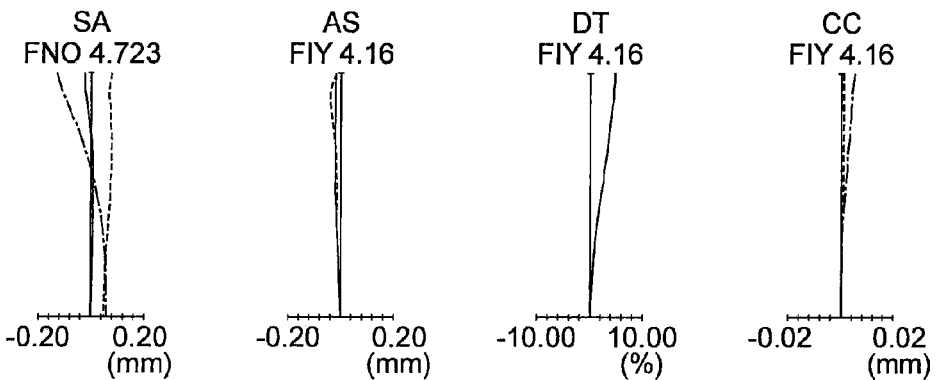

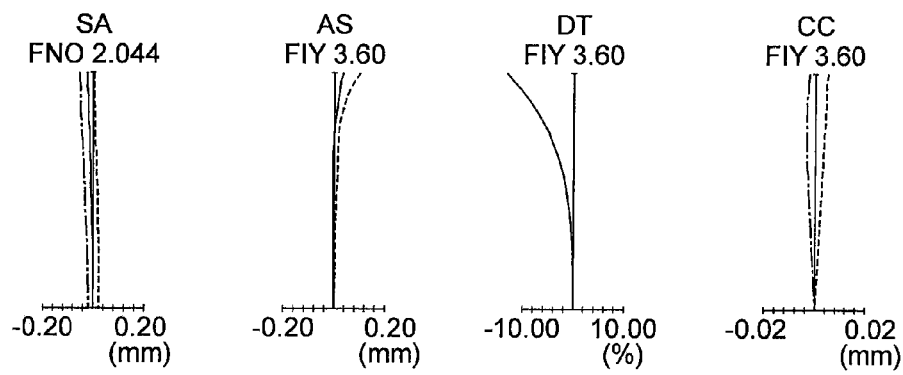
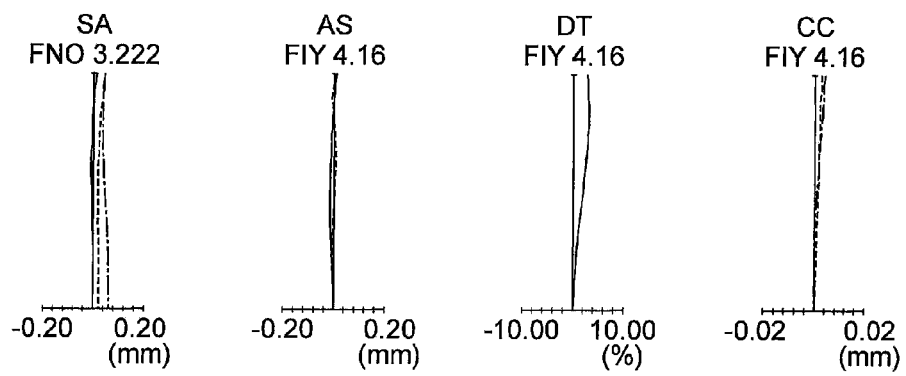
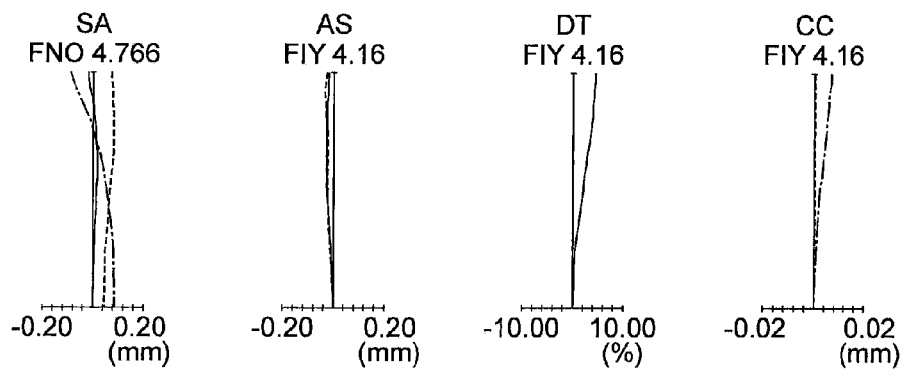

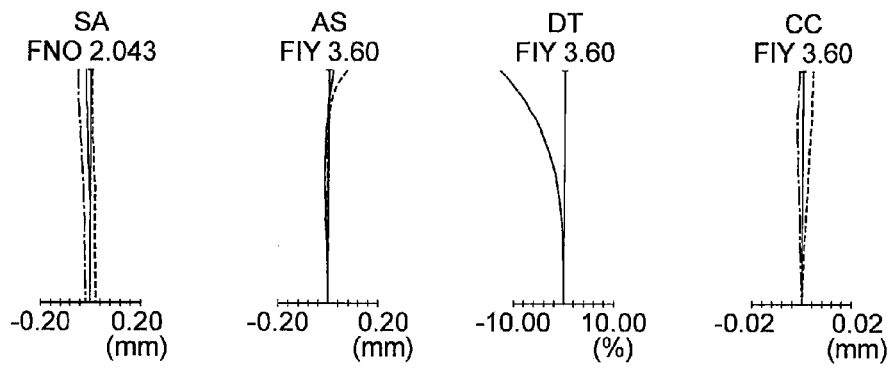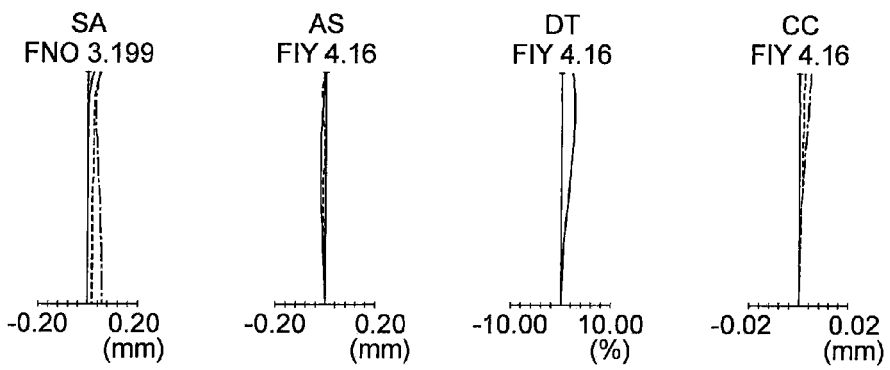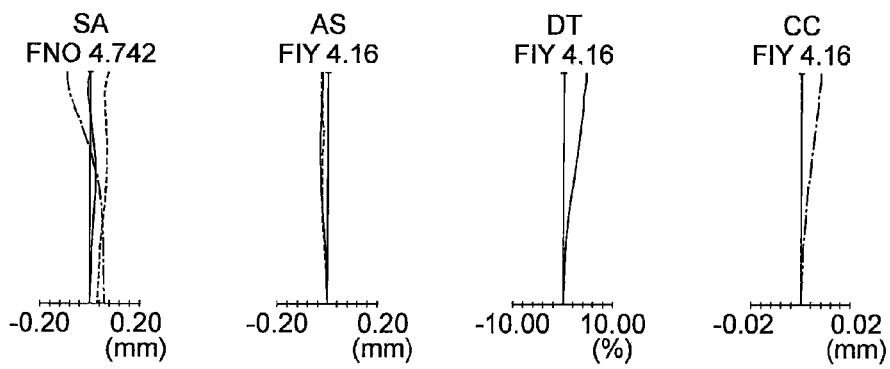

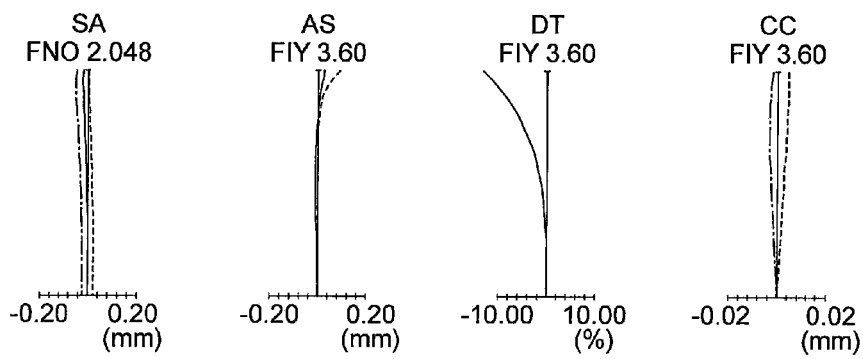
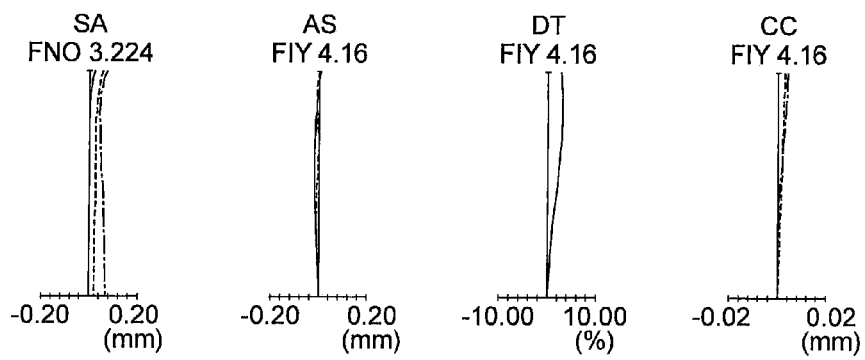
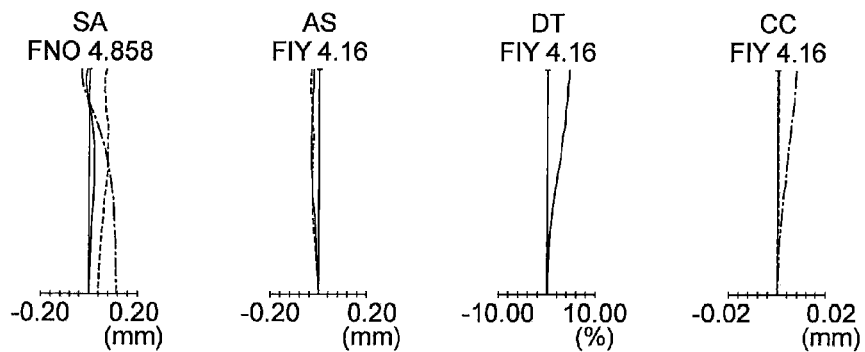

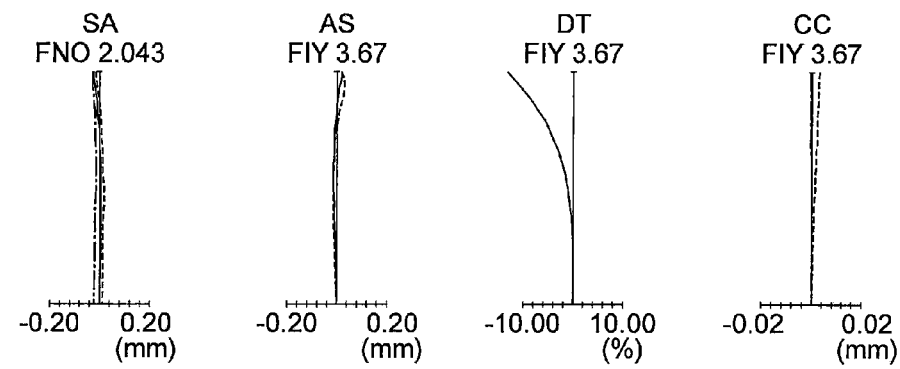
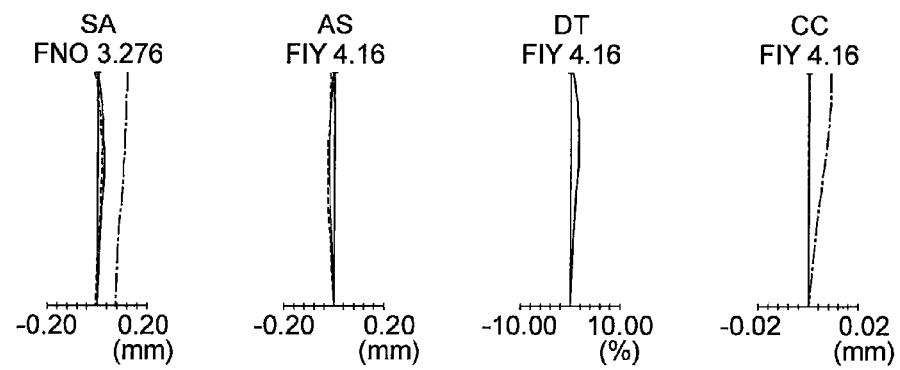
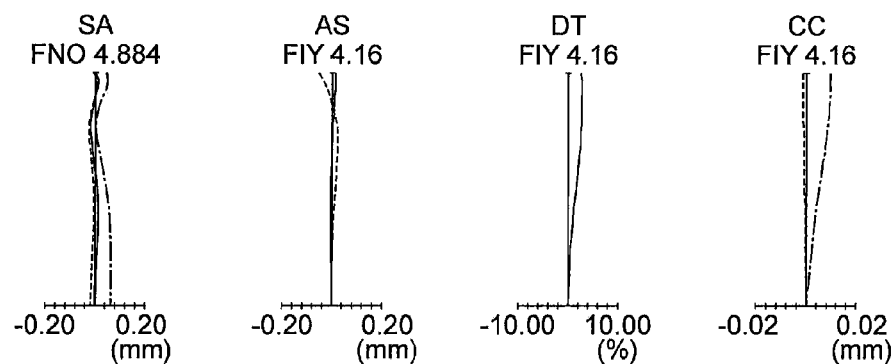

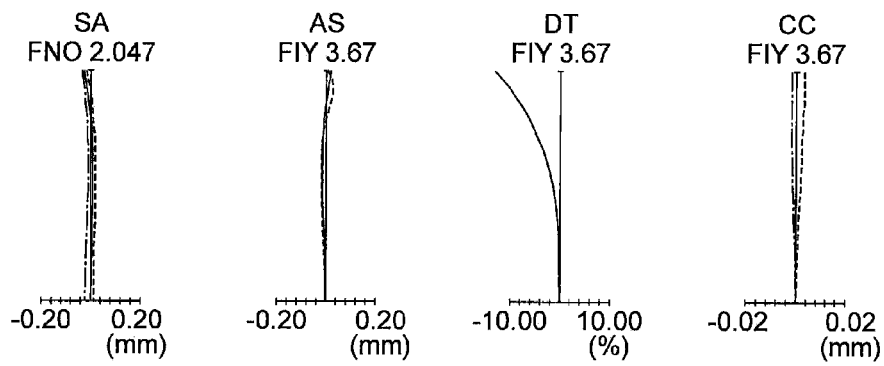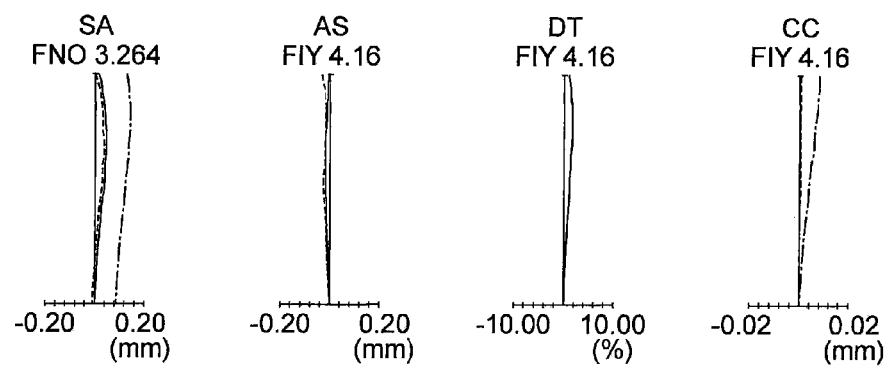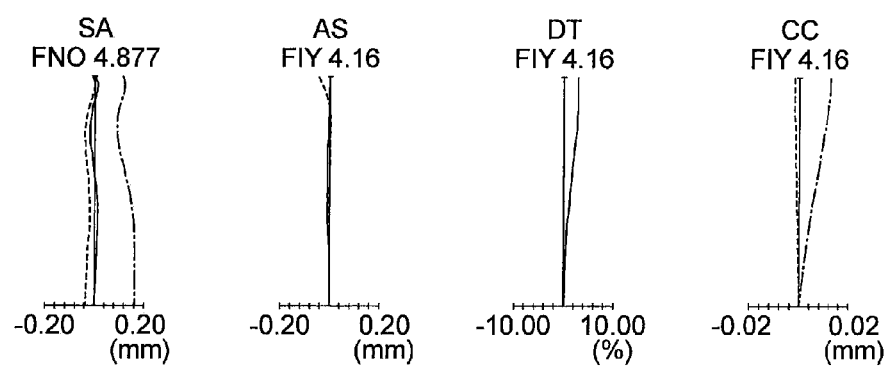

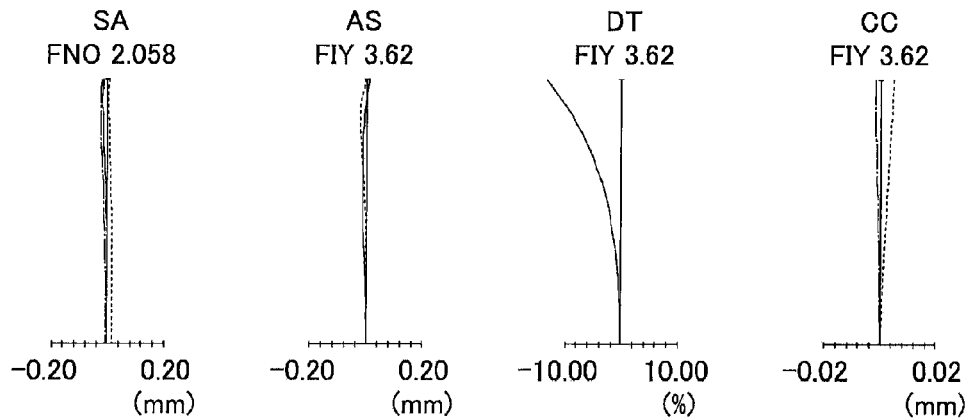
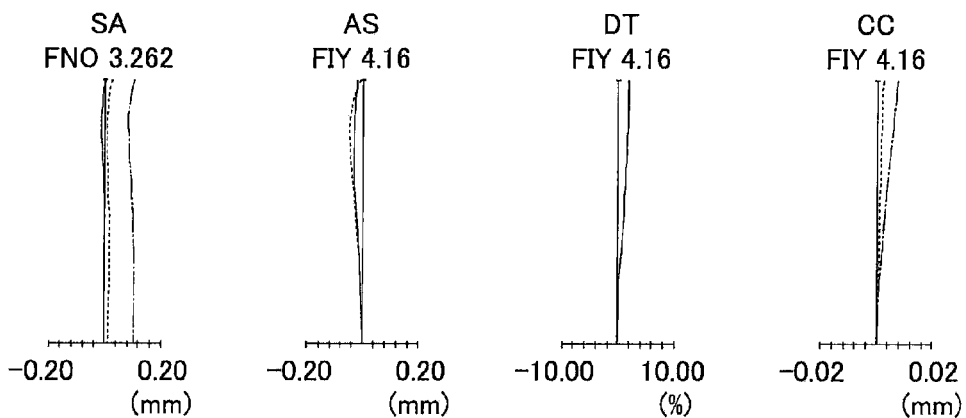
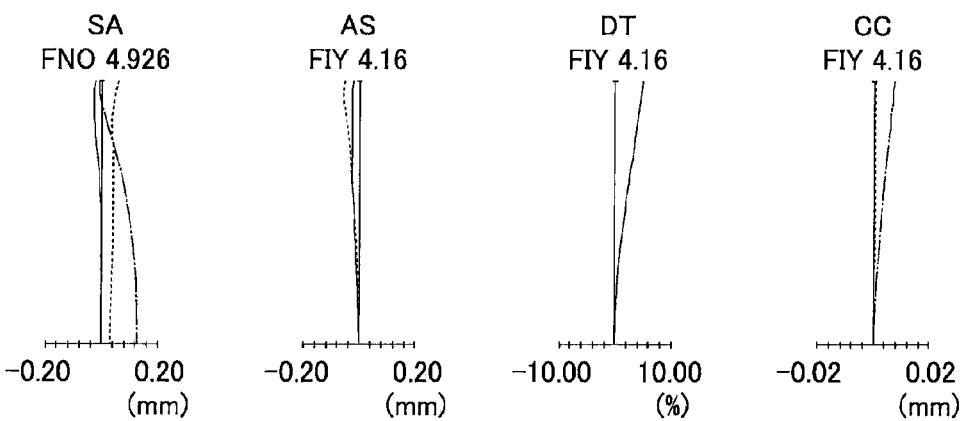

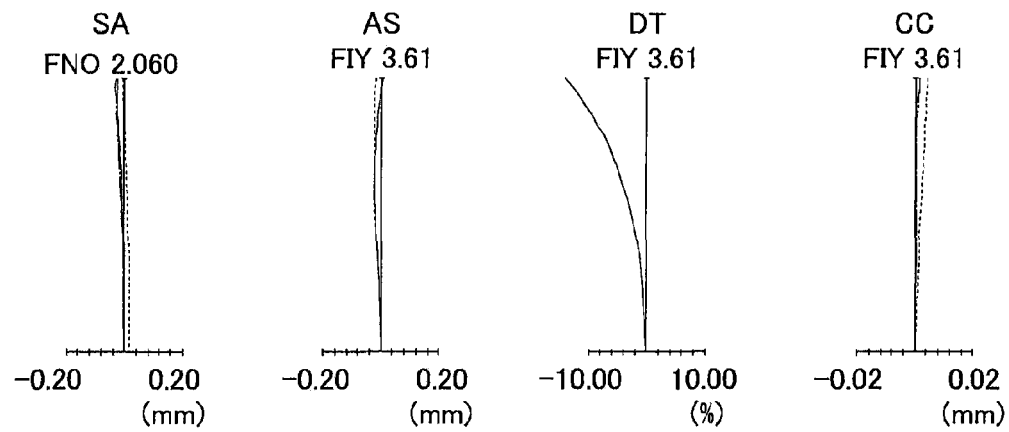
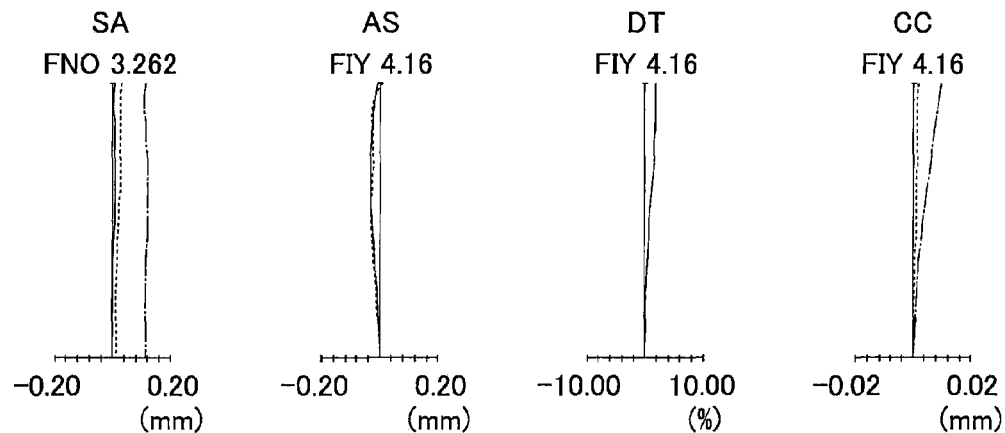
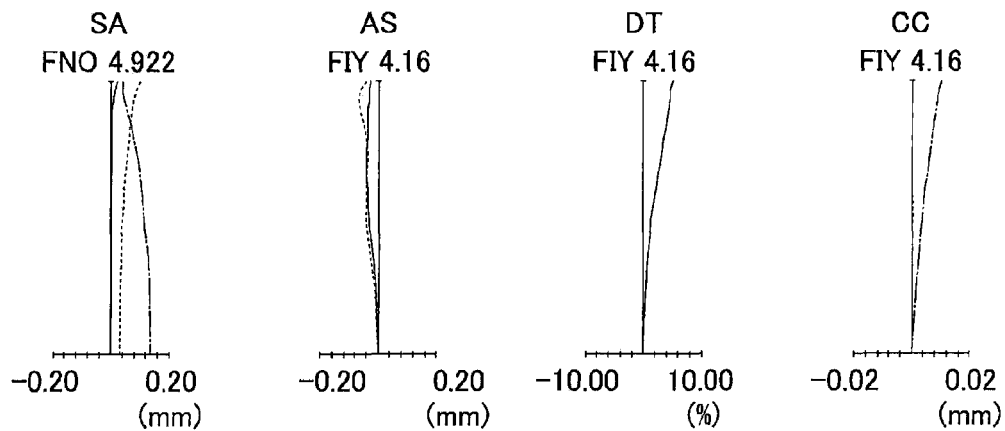

IMAGE PICKUP APPARATUS EQUIPPED WITH ZOOM LENS WITH BENT OPTICAL PATH

CROSS-REFERENCE TO RELATED APPLICATION

The present application is based upon and claims the benefit of priority from the prior Japanese Patent Application No. 2011-140553 filed on Jun. 24, 2011, the prior Japanese Patent Application No. 2011-189895 filed on Aug. 31, 2011, the prior Japanese Patent Application No. 2011-211232 filed on Sep. 27, 2011, and the prior Japanese patent Application No. 2011-211233 filed on Sep. 27, 2011; the entire contents of which are incorporated herein by reference.

BACKGROUND OF THE INVENTION

1. Field of the Invention

The present invention relates to an image pickup apparatus equipped with a zoom lens with a bent optical path.

2. Description of the Related Art

As a zoom lens that facilitates a reduction in the size of an image pickup apparatus with respect the thickness direction, there has been known a type of zoom lens in which a reflecting member is provided in the first lens unit that rays coming from the object enter firstly to bend the optical path.

Among zoom lenses of this type, zoom lenses composed of lens units respectively having, in order from the object side to the image side, negative, positive, negative, and positive refractive powers, including the first lens unit having a negative refractive power in which the reflecting member is provided have been developed as disclosed in Japanese Patent Application Laid-Open No. 2006-330349, Japanese Patent Application Laid-Open No. 2007-232974, Japanese Patent Application Laid-Open No. 2006-343554, Japanese Patent Application Laid-Open No. 2010-152148, Japanese Patent Application Laid-Open No. 2011-59496, Japanese Patent Application Laid-Open No. 2011-59497, and Japanese Patent Application Laid-Open No. 2011-59498.

SUMMARY OF THE INVENTION

According to a first aspect of the present invention, there is provided an image pickup apparatus equipped with a zoom lens with a bent optical path, comprising:

a zoom lens including a reflecting member having a reflecting surface that bends the optical path; and an image pickup element disposed on the image side of the zoom lens and having an image pickup surface that receives an image formed by the zoom lens and converts it to an electrical signal, wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power, during zooming from the wide angle end to the telephoto end, the second lens unit moves closer to the first lens unit only toward the object side, the third lens unit moves in such a way that it becomes closest to the second lens unit at an intermediate focal length position in the course of zooming from the wide angle end to the telephoto end as compared to the state at the wide angle end and the state at the telephoto end, and the fourth lens unit moves, and the following conditional expression (1) is satisfied:

$$0.3 < D_{23W}/D_{34W} < 9 \quad (1)$$

where $D_{23W}$ is the axial distance between the second lens unit and the third lens unit at the wide angle end, and $D_{34W}$ is the axial distance between the third lens unit and the fourth lens unit at the wide angle end.

According to a second aspect of the present invention, there is provided an image pickup apparatus equipped with a zoom lens with a bent optical path comprising:

a zoom lens including a reflecting member having a reflecting surface that bends the optical path; and an image pickup element disposed on the image side of the zoom lens and having an image pickup surface that receives an image formed by the zoom lens and converts it to an electrical signal, wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power, the total number of lens units in the zoom lens is four, during zooming from the wide angle end to the telephoto end, the second lens unit moves closer to the first lens unit only toward the object side, the distance between the second lens unit and the third lens unit changes, and the distance between the third lens unit and the fourth lens unit changes, the second lens unit comprises at least three lens components including an object side positive lens component having a positive refractive power and located closest to the object side among the lens components in the second lens unit, an image side positive lens component having a positive refractive power and located closest to the image side among the lens components in the second lens unit, and a cemented lens component including a positive lens and a negative lens and located between the object side positive lens component and the image side positive lens component, and the following conditional expression (A1) is satisfied:

$$0.1 < f_{2F}/f_{2R} < 0.61 \quad (A1),$$

where $f_{2F}$ is the focal length of the object side positive lens component in the second lens unit, and $f_{2R}$ is the focal length of the image side positive lens component in the second lens unit.

According to a third aspect of the present invention, there is provided an image pickup apparatus equipped with a zoom lens with a bent optical path comprising:

a zoom lens including a reflecting member having a reflecting surface that bends the optical path; and an image pickup element disposed on the image side of the zoom lens and having an image pickup surface that receives an image formed by the zoom lens and converts it to an electrical signal, wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power, during zooming from the wide angle end to the telephoto end, the second lens unit moves closer to the first lens unit only toward the object side, the distance between the second lens unit and the third lens unit changes, and the distance between the third lens unit and the fourth lens unit changes, the first lens unit comprises, in order from the object side to the image side along the optical axis, a negative single lens having a negative refractive power, the reflecting member, and a positive single lens having a positive refractive power and having a meniscus shape with a convex surface facing the object side, the total number of lenses in the first lens unit is two, and the reflecting member is a reflecting prism having a flat entrance surface and a flat exit surface.

According to a fourth aspect of the present invention, there is provided an image pickup apparatus equipped with a zoom lens with a bent optical path comprising:

a zoom lens including a reflecting member having a reflecting surface that bends the optical path; and an image pickup element disposed on the image side of the zoom lens and having an image pickup surface that receives an image formed by the zoom lens and converts it to an electrical signal, wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power, during zooming from the wide angle end to the telephoto end, the second lens unit moves closer to the first lens unit toward the object side, the distance between the second lens unit and the third lens unit changes, and the distance between the third lens unit and the fourth lens unit changes, and the second lens unit comprises at least five lenses including a plurality of positive lenses and at least one negative lens.

According to a fifth aspect of the present invention, there is provided an image pickup apparatus equipped with a zoom lens with a bent optical path comprising:

a zoom lens including a reflecting member having a reflecting surface that bends the optical path; and an image pickup element disposed on the image side of the zoom lens and having an image pickup surface that receives an image formed by the zoom lens and converts it to an electrical signal, wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power, during zooming from the wide angle end to the telephoto end, the second lens unit moves closer to the first lens unit toward the object side, the distance between the second lens unit and the third lens unit changes, and the distance between the third lens unit and the fourth lens unit changes, the second lens unit comprises at least four lenses including a plurality of positive lenses and at least one negative lens, the zoom lens has an aperture stop that moves toward the object side during zooming from the wide angle end to the telephoto end, and the following conditional expression (C1) is satisfied:

$$1 < D_{2G}/\phi S < 2.35 \quad (C1),$$

where $D_{2G}$ is the distance on the optical axis from the lens surface closest to the object side to the lens surface closest to the image side in the second lens unit, and $\phi S$ is the largest effective radius of the aperture of the aperture stop at the wide angle end.

BRIEF DESCRIPTION OF THE DRAWINGS

FIG. 1A shows the state of the zoom lens at the wide angle end, FIG. 1B shows the state of the zoom lens in an intermediate focal length state, and FIG. 1C shows the state of the zoom lens at the telephoto end;

FIG. 2A shows the state of the zoom lens at the wide angle end, FIG. 2B shows the state of the zoom lens in an intermediate focal length state, and FIG. 2C shows the state of the zoom lens at the telephoto end;

FIG. 3A shows the state of the zoom lens at the wide angle end, FIG. 3B shows the state of the zoom lens in an intermediate focal length state, and FIG. 3C shows the state of the zoom lens at the telephoto end;

FIG. 4A shows the state of the zoom lens at the wide angle end, FIG. 4B shows the state of the zoom lens in an intermediate focal length state, and FIG. 4C shows the state of the zoom lens at the telephoto end;

FIG. 5A shows the state of the zoom lens at the wide angle end, FIG. 5B shows the state of the zoom lens in an intermediate focal length state, and FIG. 5C shows the state of the zoom lens at the telephoto end;

FIG. 1A shows the state of the zoom lens at the wide angle end, FIG. 1B shows the state of the zoom lens in an intermediate focal length state, and FIG. 1C shows the state of the zoom lens at the telephoto end;

FIG. 7A shows the state of the zoom lens at the wide angle end, FIG. 7B shows the state of the zoom lens in an intermediate focal length state, and FIG. 7C shows the state of the zoom lens at the telephoto end;

FIG. 8A shows the state of the zoom lens at the wide angle end, FIG. 8B shows the state of the zoom lens in an intermediate focal length state, and FIG. 8C shows the state of the zoom lens at the telephoto end;

FIG. 9A shows the state of the zoom lens at the wide angle end, FIG. 9B shows the state of the zoom lens in an intermediate focal length state, and FIG. 9C shows the state of the zoom lens at the telephoto end;

FIG. 10A shows the state of the zoom lens at the wide angle end, FIG. 10B shows the state of the zoom lens in an intermediate focal length state, and FIG. 10C shows the state of the zoom lens at the telephoto end;

FIGS. 11A, 11B, 11C, 11D, 11E, 11F, 11G, 11H, 11I, 11J, 11K, and 11L are aberration diagrams of the zoom lens according to the first embodiment in the state in which the zoom lens is focused on an object point at infinity;

FIGS. 12A, 12B, 12C, 12D, 12E, 12F, 12G, 12H, 12I, 12J, 12K, and 12L are aberration diagrams of the zoom lens according to the second embodiment in the state in which the zoom lens is focused on an object point at infinity;

FIGS. 13A, 13B, 13C, 13D, 13E, 13F, 13G, 13H, 13I, 13J, 13K, and 13L are aberration diagrams of the zoom lens according to the third embodiment in the state in which the zoom lens is focused on an object point at infinity;

FIGS. 14A, 14B, 14C, 14D, 14E, 14F, 14G, 14H, 14I, 14J, 14K, and 14L are aberration diagrams of the zoom lens according to the fourth embodiment in the state in which the zoom lens is focused on an object point at infinity;

FIGS. 15A, 15B, 15C, 15D, 15E, 15F, 15G, 15H, 15I, 15J, 15K, and 15L are aberration diagrams of the zoom lens according to the fifth embodiment in the state in which the zoom lens is focused on an object point at infinity;

FIGS. 16A, 16B, 16C, 16D, 16E, 16F, 16G, 16H, 16I, 16J, 16K, and 16L are aberration diagrams of the zoom lens according to the sixth embodiment in the state in which the zoom lens is focused on an object point at infinity;

FIGS. 17A, 17B, 17C, 17D, 17E, 17F, 17G, 17H, 17I, 17J, 17K, and 17L are aberration diagrams of the zoom lens according to the seventh embodiment in the state in which the zoom lens is focused on an object point at infinity;

FIGS. 18A, 18B, 18C, 18D, 18E, 18F, 18G, 18H, 18I, 18J, 18K, and 18L are aberration diagrams of the zoom lens according to the eighth embodiment in the state in which the zoom lens is focused on an object point at infinity;

FIGS. 19A, 19B, 19C, 19D, 19E, 19F, 19G, 19H, 19I, 19J, 19K, and 19L are aberration diagrams of the zoom lens according to the ninth embodiment in the state in which the zoom lens is focused on an object point at infinity;

FIGS. 20A, 20B, 20C, 20D, 20E, 20F, 20G, 20H, 20I, 20J, 20K, and 20L are aberration diagrams of the zoom lens according to the tenth embodiment in the state in which the zoom lens is focused on an object point at infinity;

DETAILED DESCRIPTION OF THE INVENTION

Figure 1A:
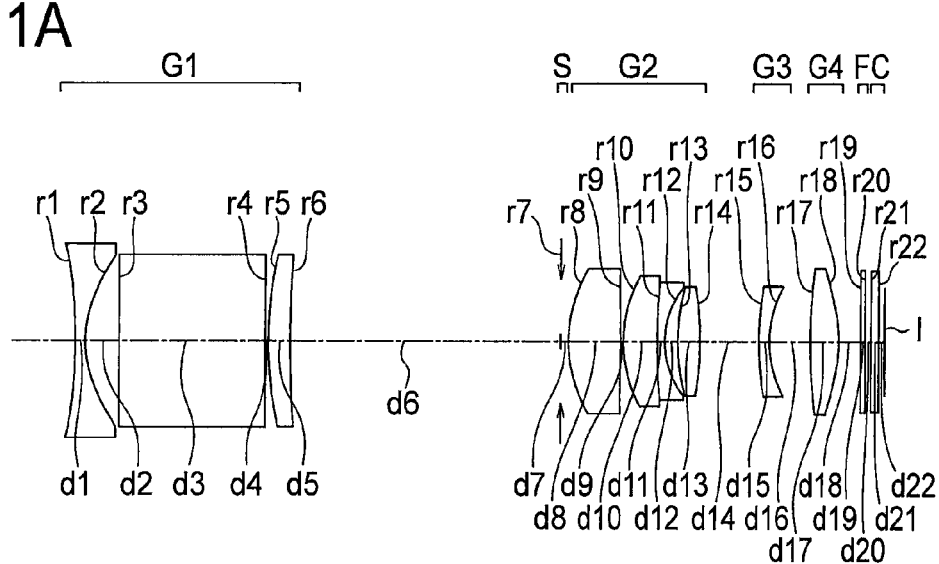
FIGS. 1A, 1B, and 1C are cross sectional views taken along the optical axis, showing the construction of a zoom lens with a bent optical path according to a first embodiment of the present invention in the state in which the zoom lens is focused on an object point at infinity, where

An image pickup apparatus equipped with a zoom lens with a bent optical path according to a first aspect of the present invention comprises:

a zoom lens including a reflecting member having a reflecting surface that bends the optical path; and an image pickup element disposed on the image side of the zoom lens and having an image pickup surface that receives an image formed by the zoom lens and converts it to an electrical signal, wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power, during zooming from the wide angle end to the telephoto end, the second lens unit moves closer to the first lens unit only toward the object side, the third lens unit moves in such a way that it becomes closest to the second lens unit at an intermediate focal length position in the course of zooming from the wide angle end to the telephoto end as compared to the state at the wide angle end and the state at the telephoto end, and the fourth lens unit moves, and the following conditional expression (1) is satisfied:

$$0.3 < D_{23W}/D_{34W} < 9 \qquad (1),$$

where $D_{23W}$ is the axial distance between the second lens unit and the third lens unit at the wide angle end, and $D_{34W}$ is the axial distance between the third lens unit and the fourth lens unit at the wide angle end.

In the above-described configuration, having a reflecting member in the first lens unit facilitates slimming of the image pickup apparatus.

In addition, the second lens unit having a positive refractive power moves closer to the first lens unit having a negative refractive power during zooming from the wide angle end to the telephoto end. With this movement, the second lens unit can have a sufficient magnification changing function.

Having a negative refractive power, the third lens unit has the function of refracting off-axis beams coming from the second lens unit in directions away from the optical axis. Since the subsequent fourth lens unit has a positive refractive power, it has the function of shifting the position of the exit pupil away from the image pickup surface by refracting off-axis beams exiting from the third lens unit. These functions of the third lens unit having a negative refractive power and the fourth lens unit having a positive refractive power facilitate slimming of the lens configuration on the object side of the third lens unit while shifting the position of the exit pupil away from the image pickup surface. This leads to a reduction in the overall length of the zoom lens. Moreover, shifting the fourth lens unit is advantageous for compensation of the position of the exit pupil and the position of the image plane.

The third lens unit having a negative refractive power is located at a position that satisfies the conditional expression (1) at the wide angle end and moves firstly closer to the second lens unit and then away from the second lens unit as described above.

Locating the third lens unit so distant from the second lens unit that the conditional expression (1) is satisfied at the wide angle end and moving it closer to the second lens unit during zooming in the wide angle focal length range are advantageous for changing the magnification of the zoom lens as a whole in the wide angle focal length range.

On the other hand, if the distance between the second lens unit and the third lens unit is too short, decentering aberrations caused by relative decentering (if any) between the second lens unit and the third lens unit will tend to be conspicuous. In particular, if the zoom ratio is high and/or the F-number is small, the adverse effect of decentering tends to matter.

In view of this, the present invention employs the above-described configuration, in which the third lens unit is made farther from the second lens unit in the telephoto focal length range. This configuration reduces the adverse effect of decentering aberrations in the telephoto focal length range. This is advantageous when a sufficiently high zoom ratio and sufficient brightness are to be achieved.

Conditional expression (1) specifies a preferred range of the location of the third lens unit at the wide angle end.

As the lower limit of conditional expression (1) is reached so that the third lens unit is located not too close to the second lens unit, the third lens unit can easily have a sufficient magnification changing function. This is advantageous when a high zoom ratio is to be achieved and when adverse effects of decentering in the focal length range near the wide angle end is to be reduced.

As the upper limit of conditional expression (1) is not exceeded so that the third lens unit is located not too close to the fourth lens unit, the size of the zoom lens can readily be made small, and the telecentricity on the image side can readily be achieved.

The above-described configuration is advantageous when satisfactory optical performance is to be achieved while achieving a sufficiently high zoom ratio and sufficient brightness (or sufficiently high speed) in a negative-lead type zoom lens with a bent optical path, which can be advantageously designed to have a wide angle of view at the wide angle end.

In the case where the zoom lens with a bent optical path has the focusing function, the features described in the foregoing should be interpreted as those for the state in which the zoom lens is focused at the longest distance.

In order for the above-described image pickup apparatus equipped with a zoom lens with a bent optical path to have excellent performance, it is more preferred that apparatus further have one of the features described in the following or two or more of them in combination.

An image pickup apparatus equipped with a zoom lens with a bent optical path according to a second aspect of the present invention comprises:

a zoom lens including a reflecting member having a reflecting surface that bends the optical path; and an image pickup element disposed on the image side of the zoom lens and having an image pickup surface that receives an image formed by the zoom lens and converts it to an electrical signal, wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power, the total number of lens units in the zoom lens is four, during zooming from the wide angle end to the telephoto end, the second lens unit moves closer to the first lens unit only toward the object side, the distance between the second lens unit and the third lens unit changes, and the distance between the third lens unit and the fourth lens unit changes, the second lens unit comprises at least three lens components including an object side positive lens component having a positive refractive power and located closest to the object side among the lens components in the second lens unit, an image side positive lens component having a positive refractive power and located closest to the image side among the lens components in the second lens unit, and a cemented lens component including a positive lens and a negative lens and located between the object side positive lens component and the image side positive lens component, and the following conditional expression (A1) is satisfied:

$$0.1 < f_{2F}/f_{2R} < 0.61 \tag{A1},$$

where $f_{2F}$ is the focal length of the object side positive lens component in the second lens unit, and $f_{2R}$ is the focal length of the image side positive lens component in the second lens unit.

In the above-described configuration, having a reflecting member in the first lens unit facilitates slimming of the image pickup apparatus.

In addition, the second lens unit having a positive refractive power moves closer to the first lens unit having a negative refractive power during zooming from the wide angle end to the telephoto end. With this movement, the second lens unit can have a sufficient magnification changing function.

In addition, varying the distances between the lens units including the third and fourth lens units is advantageous when a sufficiently high zoom ratio and satisfactory optical performance are both to be achieved.

This zoom lens is essentially a four-units zoom lens. Therefore, the zoom lens can be made small. This leads to a reduction in the size of the apparatus and a reduction in the manufacturing cost.

Having a negative refractive power, the third lens unit has the function of refracting off-axis beams coming from the second lens unit in directions away from the optical axis. Since the subsequent fourth lens unit has a positive refractive power, it has the function of shifting the position of the exit pupil away from the image pickup surface by refracting off-axis beams exiting from the third lens unit. These functions of the third lens unit having a negative refractive power and the fourth lens unit having a positive refractive power facilitate slimming of the lens configuration on the object side of the third lens unit while shifting the position of the exit pupil away from the image pickup surface. This leads to a reduction in the overall length of the zoom lens.

In order to achieve an appropriately high zoom ratio while keeping sufficient brightness (or sufficiently high speed), it is preferred that the second lens unit have a sufficiently high positive refractive power and that aberrations in the second lens unit be small. With the above-described configuration, the second lens unit includes at least three lens components, among which the lens component located closest to the object side and the lens component located closest to the image side have positive refractive powers to contribute to the positive refractive power of the second lens unit. In addition, the cemented lens component including a positive lens and a negative lens is provided between the two positive lens components. This cemented lens component can be designed to provide correction of chromatic aberration and curvature of field. This is advantageous when correction of aberrations and sufficient brightness (or sufficiently high speed) are both to be achieved.

Moreover, conditional expression (A1) presented above is satisfied. Conditional expression (A1) specifies a preferred range of the ratio of the focal length of the object side positive lens component and the focal length of the image side positive lens component.

As the image side positive lens component has a sufficiently high refractive power and the refractive power of the object side positive lens component is not too high so that the lower limit of conditional expression (A1) is reached, well balanced distribution of the positive refractive power can be achieved in the second lens unit. This is advantageous for correction of aberrations.

As the object side positive lens component has a sufficiently high refractive power so that the upper limit of conditional expression (A1) is not exceeded, correction of spherical aberration is facilitated.

The above-described configuration is advantageous when satisfactory optical performance is to be achieved while achieving a sufficiently high zoom ratio and sufficient brightness (or sufficiently high speed) in a negative-lead type zoom lens with a bent optical path, which can be advantageously designed to have a wide angle of view at the wide angle end.

In the case where the zoom lens with a bent optical path has the focusing function, the features described in the foregoing should be interpreted as those for the state in which the zoom lens is focused at the longest distance. This also applies to more preferred features that will be described later.

In order for the above-described image pickup apparatus equipped with a zoom lens with a bent optical path to have excellent performance, it is more preferred that apparatus further have one of the features described in the following or two or more of them in combination.

An image pickup apparatus equipped with a zoom lens with a bent optical path according to a third aspect of the present invention comprises:

a zoom lens including a reflecting member having a reflecting surface that bends the optical path; and an image pickup element disposed on the image side of the zoom lens and having an image pickup surface that receives an image formed by the zoom lens and converts it to an electrical signal, wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power, during zooming from the wide angle end to the telephoto end, the second lens unit moves closer to the first lens unit only toward the object side, the distance between the second lens unit and the third lens unit changes, and the distance between the third lens unit and the fourth lens unit changes, the first lens unit comprises, in order from the object side to the image side along the optical axis, a negative single lens having a negative refractive power, the reflecting member, and a positive single lens having a positive refractive power and having a meniscus shape with a convex surface facing the object side, the total number of lenses in the first lens unit is two, and the reflecting member is a reflecting prism having a flat entrance surface and a flat exit surface.

In the above-described configuration, having a reflecting member in the first lens unit facilitates slimming of the image pickup apparatus.

In addition, the second lens unit having a positive refractive power moves closer to the first lens unit having a negative refractive power during zooming from the wide angle end to the telephoto end. With this movement, the second lens unit can have a sufficient magnification changing function.

In addition, varying the distances between the lens units including the third and fourth lens units is advantageous when a sufficiently high zoom ratio and satisfactory optical performance are both to be achieved.

Having a negative refractive power, the third lens unit has the function of refracting off-axis beams coming from the second lens unit in directions away from the optical axis. Since the subsequent fourth lens unit has a positive refractive power, it has the function of shifting the position of the exit pupil away from the image pickup surface by refracting off-axis beams exiting from the third lens unit. These functions of the third lens unit having a negative refractive power and the fourth lens unit having a positive refractive power facilitate slimming of the lens configuration on the object side of the third lens unit while shifting the position of the exit pupil away from the image pickup surface. This leads to a reduction in the overall length of the zoom lens.

In order to achieve wide angle of view, low cost and small overall size of the zoom lens, the above-described configuration of the first lens unit is adopted according to the present invention. The flat incidence and exit surfaces of the reflecting prism lead to low cost. The number of optical components in the first lens unit is as small as three. Moreover, the first lens unit is designed to have a sufficiently high negative refractive power, which is needed to achieve a sufficiently large angle of view, and to facilitate correction of aberrations.

In particular, since the positive single lens has a meniscus shape with a convex surface facing the object side, the principal point of this positive single lens can readily be located closer to the object side along the optical axis. This allows a reduction in the size of the reflecting prism, leading to a size reduction with respect to the thickness direction.

The above feature additionally allows a reduction in the diameter of the negative single lens and a reduction in the distance between the negative single lens and the principal point of the positive single lens, facilitating a reduction in curvature of field and prevention of excessively high distortion.

The above-described configuration is advantageous when a sufficiently wide angle of view at the wide angle end, size reduction, and cost reduction are to be achieved in a negative-lead type zoom lens with a bent optical path, which can advantageously be designed to have a wide angle of view at the wide angle end.

In the case where the zoom lens with a bent optical path has the focusing function, the features described in the foregoing should be interpreted as those for the state in which the zoom lens is focused at the longest distance.

In order for the above-described image pickup apparatus equipped with a zoom lens with a bent optical path to have excellent performance, it is more preferred that apparatus further have one of the features described in the following or two or more of them in combination.

An image pickup apparatus equipped with a zoom lens with a bent optical path according to a fourth aspect of the present invention comprises:

a zoom lens including a reflecting member having a reflecting surface that bends the optical path; and an image pickup element disposed on the image side of the zoom lens and having an image pickup surface that receives an image formed by the zoom lens and converts it to an electrical signal, wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power, during zooming from the wide angle end to the telephoto end, the second lens unit moves closer to the first lens unit toward the object side, the distance between the second lens unit and the third lens unit changes, and the distance between the third lens unit and the fourth lens unit changes, and the second lens unit comprises at least five lenses including a plurality of positive lenses and at least one negative lens.

An image pickup apparatus equipped with a zoom lens with a bent optical path according to a fifth aspect of the present invention comprises:

a zoom lens including a reflecting member having a reflecting surface that bends the optical path; and an image pickup element disposed on the image side of the zoom lens and having an image pickup surface that receives an image formed by the zoom lens and converts it to an electrical signal, wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power, during zooming from the wide angle end to the telephoto end, the second lens unit moves closer to the first lens unit toward the object side, the distance between the second lens unit and the third lens unit changes, and the distance between the third lens unit and the fourth lens unit changes, the second lens unit comprises at least four lenses including a plurality of positive lenses and at least one negative lens, the zoom lens has an aperture stop that moves toward the object side during zooming from the wide angle end to the telephoto end, and the following conditional expression (C1) is satisfied:

$$1 < D_{2G}/\phi S < 2.35 \quad (C1),$$

where $D_{2G}$ is the distance on the optical axis from the lens surface closest to the object side to the lens surface closest to the image side in the second lens unit, and $\phi S$ is the largest effective radius of the aperture of the aperture stop at the wide angle end.

Having a reflecting member in the first lens unit facilitates slimming of the image pickup apparatus.

In addition, the second lens unit having a positive refractive power moves closer to the first lens unit having a negative refractive power during zooming from the wide angle end to the telephoto end. With this movement, the second lens unit can have a sufficient magnification changing function.

In addition, varying the distances between the lens units including the third and fourth lens units is advantageous when a sufficiently high zoom ratio and satisfactory optical performance are both to be achieved.

Having a negative refractive power, the third lens unit has the function of refracting off-axis beams coming from the second lens unit in directions away from the optical axis. Since the subsequent fourth lens unit has a positive refractive power, it has the function of shifting the position of the exit pupil away from the image pickup surface by refracting off-axis beams exiting from the third lens unit. These functions of the third lens unit having a negative refractive power and the fourth lens unit having a positive refractive power facilitate slimming of the lens configuration on the object side of the third lens unit while shifting the position of the exit pupil away from the image pickup surface. This leads to a reduction in the overall length of the zoom lens.

In order to achieve a sufficiently high zoom ratio while keeping sufficient brightness (or sufficiently high speed), it is preferred that the second lens unit have a sufficiently high positive refractive power and that aberrations in the second lens unit be small.

Having five lenses including a plurality of positive lenses and at least one negative lens in the second lens unit allows a reduction in aberrations in the second lens unit. Therefore, this configuration is advantageous when satisfactory optical performance is to be achieved while keeping sufficient brightness (or sufficiently high speed).

Alternatively, it is preferred that the second lens unit has at least four lenses including a plurality of positive lenses and at least one negative lens to facilitate correction of aberrations.

It is preferred that the zoom lens be essentially a four-units zoom lens. Then, the zoom lens can be made small. This leads to a reduction in the size of the apparatus and a reduction in the manufacturing cost.

Moreover, for the sake of simplicity of the configuration, it is more preferred that the zoom lens be a four unit zoom lens.

It is preferred that the third lens unit move only toward the object side during zooming from the wide angle end to the telephoto end. This prevents distance between the third lens unit and the second lens unit from becoming unduly large, facilitating correction of coma and astigmatism.

It is preferred that the third lens unit and the fourth lens unit satisfy the following conditional expression (2):

$$-5 < f_3/f_4 < -1 \quad (2),$$

where $f_3$ is the focal length of the third lens unit, and $f_4$ is the focal length of the fourth lens unit.

It is preferred that the upper limit of conditional expression (2) be not exceeded so that the third lens unit has a moderately low negative refractive power. This facilitates a further reduction of adverse effects of relative decentering between the second lens unit and the third lens unit on the image quality in the focal length range near the telephoto end. In addition, it is preferred that the fourth lens unit has a sufficiently high refractive power. This leads to a reduction in the amount of movement of the fourth lens unit. In particular, in the case where the fourth lens unit has the magnifying function, the fourth lens unit can readily provide a sufficient magnifying effect, leading to a reduction in the magnifying effect that the second lens unit is required to provide. This is advantageous when reduction of aberrations and sufficient brightness (sufficiently high speed) are to be achieved.

It is preferred that the lower limit of conditional expression (2) be reached so that the third lens unit has a sufficiently high negative refractive power. This further enhances the above-described advantage of the third lens unit in reducing the size of the zoom lens.

It is preferred that the following conditional expressions (3) and (4) be satisfied:

$$-0.2 < D_{23MIN}/f_3 < -0.01 \quad (3), \text{ and}$$

$$-0.6 < D_{23MAX}/f_3 < -0.1 \quad (4),$$

where $D_{23MIN}$ is the smallest value of the distance on the optical axis between the second lens unit and the third lens unit, $D_{23MAX}$ is the largest value of the distance on the optical axis between the second lens unit and the third lens unit, and $f_3$ is the focal length of the third lens unit.

If the distance between the second lens unit and the third lens unit is so large that the upper limit of conditional expressions (3) or (4) is not exceeded, a reduction of adverse effects of relative decentering between the second lens unit and the third lens unit will be facilitated.

If the distance between the second lens unit and the third lens unit is so small that the upper limits of conditional expressions (3) and (4) are reached, coma and astigmatism, which tend to be generated in the second lens unit, can easily be corrected by the third lens unit.

It is preferred that the following conditional expression (5) be satisfied:

$$0.1 < D_{23MIN}/D_{23W} < 0.9 \quad (5),$$

where $D_{23MIN}$ is the smallest value of the distance on the optical axis between the second lens unit and the third lens unit, and $D_{23W}$ is the distance on the optical axis between the second lens unit and the third lens unit at the wide angle end.

It is preferred that the change in the decreasing distance between the second lens unit and the third lens unit in the wide angle focal length range be so small that the lower limit of conditional expression (5) is reached. This will facilitate a reduction in adverse effects of relative decentering between the second lens unit and the third lens unit in the middle focal length range.

It is preferred that the distance between the second lens unit and the third lens unit in the wide angle focal length range be so large that the upper limit of conditional expression (5) is not exceeded. Then, the third lens unit will have a sufficient magnifying function.

It is preferred that the following conditional expression (6) be satisfied:

$$1.1 < D_{23T}/D_{23MIN} < 6 \quad (6),$$

where $D_{23T}$ is the distance on the optical axis between the second lens unit and the third lens unit at the telephoto end, and $D_{23MIN}$ is the smallest value of the distance on the optical axis between the second lens unit and the third lens unit.

It is preferred that the change in the increasing distance between the second lens unit and the third lens unit in the telephoto focal length range be so large that the lower limit of conditional expression (6) be reached. This is advantageous for a reduction of adverse effects of relative decentering between the second lens unit and the third lens unit, which tend to be conspicuous in the focal length range near the telephoto end.

It is preferred that the change in the distance between the second lens unit and the third lens unit in the telephoto focal length range be so small that the upper limit of conditional expression (6) is not exceeded. Then, correction of coma and astigmatism by the third lens unit in the focal length range near the telephoto end will be facilitated.

It is preferred that the fourth lens unit be located closer to the image side at the telephoto end than at the wide angle end.

By moving in the above described manner, the fourth lens unit can have the magnifying function. This allows a reduction in the magnification change provided by the other magnification changing lens units. This is advantageous when a high zoom ratio and excellent optical performance are both to be achieved.

It is more preferred that the fourth lens unit move only toward the image side during zooming from the wide angle end to the telephoto end.

This is advantageous when a high zoom ratio and a reduction of the telephoto ratio at the telephoto end are to be achieved. In addition, this preferred feature allows a reduction in the range of movement of the fourth lens unit during zooming, leading to a reduction in the size of the apparatus including the driving mechanisms.

It is preferred that the position of the first lens unit be fixed relative to the image pickup surface.

This makes the overall length of the zoom lens constant. This is advantageous for preventing the entrance of dust during operations such as zooming.

It is preferred that the first lens unit have curved lens surfaces each having a refractive power located respectively on the object side and one the image side of the reflecting surface, that the portion of the first lens unit that is located on the object side of the reflecting surface of the reflecting member have a negative refractive power, that the portion of the first lens unit that is located on image side of the reflecting surface of the reflecting member have a positive refractive power, and the first lens unit satisfy the following conditional expressions (7) and (8):

$$-0.5 < f_{1F}/f_{1R} < -0.06 \quad (7), \text{ and}$$

$$-3 < D_{1FR}/f_1 < -0.5 \quad (8),$$

where $f_{1F}$ is the combined focal length of the portion of the first lens unit that is located on the object side of the reflecting surface, $f_{1R}$ is the combined focal length of the portion of the first lens unit that is located on the image side of the reflecting surface, $D_{1FR}$ is the physical distance along the optical axis from the lens surface closest to the reflecting surface among the lens surfaces that are located on the object side of the reflecting surfaces to the lens surface closest to the reflecting surface among the lens surfaces that are located on the image side of the reflecting surfaces, and $f_1$ is the focal length of the first lens unit.

If the portion of the first lens unit on the object side of the reflecting surface has a negative refractive power and the portion of the first lens unit on the image side of the reflecting surface has a positive refractive power, the distance between the lens surfaces located in front and rear of the reflecting surface can be made small, and the first lens unit will function like a wide conversion lens, which is advantageous for achieving a large angle of view at the wide angle end. In addition, having refractive powers of opposite signs on the front and rear sides of the reflecting surface is advantageous for a reduction of aberrations.

Conditional expression (7) specifies a preferred range of the ratio of the combined focal length of the portion in the first lens unit that is located on the object side of the reflecting surface and the portion in the first lens unit that is located on the image side of the reflecting surface.

It is preferred that the negative refractive power of the portion that is located on the object side of the reflecting surface be so high that the lower limit of conditional expression (7) is reached. This is advantageous when a large angle of view at the wide angle end is to be achieved.

It is preferred that the negative refractive power of the portion that is located on the object side of the reflecting surface be so low that the upper limit of conditional expression (7) is not exceeded. This facilitates the prevention of excessively high distortion at the wide angle end.

Conditional expression (8) specifies a preferred range of the distance between the lens surfaces located in front and rear of the reflecting surface in the first lens unit.

It is preferred that the distance between the lens surfaces located in front and rear of the reflecting surface be so small that the lower limit of conditional expression (8) is reached. This leads to a reduction in the size of the zoom lens.

It is preferred that the distance between the lens surfaces located in front and rear of the reflecting surface be so large that the upper limit of conditional expression (8) is not exceeded. This is advantageous for keeping a sufficient light quantity in the peripheral region of the image in the case where the zoom lens has a wide angle of view, high speed, and high zoom ratio.

It is preferred that the second lens unit include three positive lenses and one negative lens, that the zoom lens have an aperture stop that is located closer to the image side than the first lens unit and closer to the object side than the lens closest to the image side in the second lens unit and moves toward the object side during zooming from the wide angle end to the telephoto end, and that the zoom lens satisfy the following conditional expressions (9) and (10):

$$3.3 < f_t/f_w < 15.0 \quad (9), \text{ and}$$

$$1.2 < F_{now} < 2.4 \quad (10),$$

where $f_t$ is the focal length of the zoom lens at the telephoto end, $f_w$ is the focal length of the zoom lens at the wide angle end, and $F_{now}$ is the least F-number of the zoom lens at the wide angle end.

The second lens unit is the primary magnification changing lens unit. If the zoom lens is designed to have high speed and high zoom ratio, it is preferred that aberrations generated in the second lens unit be made small. If the second lens unit includes three positive lenses and one negative lens, the second lens unit can be designed to have a sufficiently high refractive power while achieving satisfactory optical performance.

Sufficient brightness of the zoom lens generally necessitates a large size of the second lens unit. However, the above-described location and movement of the aperture stop allow a reduction in the size of the second lens unit while maintaining the refractive power of the second lens unit.

Conditional expression (9) specifies a preferred range of the zoom ratio in the above-described configuration. Conditional expression (10) specifies a preferred range of the F-number at the wide angle end.

If the zoom ratio is so high that the lower limit of conditional expression (9) is reached, the image pickup apparatus can suitably be used in various shooting situations.

A moderately low zoom ratio that does not exceed the upper limit of conditional expression (9) is advantageous for size reduction.

If the F-number is larger than the lower limit of conditional expression (10), the effective diameter of the zoom lens will readily be prevented from becoming large, leading to smallness in size.

It is preferred that the upper limit of conditiona expression (10) be not exceeded so that sufficient brightness (sufficiently high speed) is achieved.

It is preferred that the second lens unit consist of five lenses including, in order from the object side, a first positive lens, a second positive lens, a first negative lens, a second negative lens, and a third positive lens.

This configuration leads to a reduction in aberration in the second lens unit, and satisfactory optical performance can be achieved advantageously.

It is preferred that the first lens unit consist of, in order from the object side to the image side, a biconcave lens component, a prism having the aforementioned reflecting surface, and a positive meniscus lens component having a convex surface facing the object side and that the following conditional expressions (11) and (12) be satisfied:

$$1.8 < f_w/IH_t < 1.4 \quad (11), \text{ and}$$

$$0.75 < IH_w/IH_t < 0.95 \quad (12),$$

where $f_w$ is the focal length of the zoom lens at the wide angle end, $IH_t$ is the largest image height at the telephoto end or half the diagonal length of the effective image pickup area of the image pickup element at the telephoto end, $IH_w$ is the largest image height at the wide angle end or half the diagonal length of the effective image pickup area of the image pickup element at the wide angle end, where the term "lens component" refers to a lens member whose refractive surfaces that are in contact with air on the optical axis include only two surfaces or an object side surface and an image side surface.

With the above-described configuration, the first lens unit can have a sufficiently high negative refractive power while making spherical aberration and coma small, though the first lens unit has a simple configuration. Therefore, a wide angle of view can be achieved, and a sufficiently high zoom ratio can be achieved by the movement of the second lens unit.

A high negative refractive power of the first lens unit tends to lead to barrel distortion at the wide angle end. However, such barrel distortion can easily be corrected by signal processing of image signals.

Conditional expression (11) specifies a preferred range of the focal length of the zoom lens at the wide angle end.

If the lower limit of conditional expression (11) is reached, the effective diameter of the first lens unit can be made small even with a wide angle of view.

It is preferred that the angle of view at the wide angle end be so large that the upper limit of conditional expression (11) is not exceeded.

Conditional expression (12) specifies a preferred range of the ratio of the image height at the wide angle end and the image height at the telephoto end.

If the effective image pickup area in the focal length range near the wide angle end is so large that the lower limit of conditional expression (12) is reached, satisfactory image quality can be achieved by correcting distortion by signal processing.

If the upper limit of conditional expression (12) is not exceeded, the zoom lens is allowed to have distortion at the wide angle end. This is advantageous for size reduction.

It is preferred that the second lens unit, the third lens unit, and the fourth lens unit satisfy the following conditional expressions (13), (14), and (15):

$$1.7 < \beta_{2T}/\beta_{2W} < 6.0 \quad (13)$$

$$1.20 < \beta_{3T}/\beta_{3W} < 4.0 \quad (14), \text{ and}$$

$$1.04 < \beta_{4T}/\beta_{4W} < 2.0 \quad (15),$$

where $\beta_{2T}$ is the lateral magnification of the second lens unit at the telephoto end, $\beta_{2W}$ is the lateral magnification of the second lens unit at the wide angle end, $\beta_{3T}$ is the lateral magnification of the third lens unit at the telephoto end, $\beta_{3W}$ is the lateral magnification of the third lens unit at the wide angle end, $\beta_{4T}$ is the lateral magnification of the fourth lens unit at the telephoto end, and $\beta_{4W}$ is the lateral magnification of the fourth lens unit at the wide angle end.

Conditional expressions (13), (14), and (15) specify preferred ranges of the magnification changes provided respectively by the second lens unit, the third lens unit, and the fourth lens unit.

It is preferred that the second, third, and fourth lens units provide magnification changes so that the lower limits of conditional expressions (13), (14), and (15) are reached. This is advantageous for achieving sufficient magnification change while making the aberrations small.

It is preferred that the magnification changes provided by the second, third, and fourth lens units are balanced so that the upper limits of conditional expressions (13), (14), and (15) are not exceeded. This is advantageous for reduction of the amount of movement of the movable lens units and for reduction in the number of lenses.

It is preferred that the second lens unit consist of three lens components including, in order from the object side to the image side, the aforementioned object side positive lens component, the aforementioned cemented lens component, and the aforementioned image side positive lens component.

Including only three lens components allows to achieve both excellent performance and cost reduction.

Furthermore, it is preferred that the cemented lens component have a negative refractive power.

The cemented lens component is located between the positive lens components in the second lens unit. Therefore, the cemented lens component provides cancellation of aberrations in the second lens unit and facilitates reduction of spherical aberrations etc. with sufficient brightness (or sufficiently high speed) being achieved.

In this case, it is preferred that the following conditional expressions (A2) and (A3) be satisfied:

$$0.1 < |f_{2F}/f_{2C}| < 1 \quad (A2), \text{ and}$$

$$0.2 < |f_{2R}/f_{2C}| < 5 \quad (A3),$$

where $f_{2C}$ is the focal length of the cemented lens component in the second lens unit.

Conditional expression (A2) specifies a preferred range of the ratio of the focal length of the object side positive lens component and the focal length of the cemented lens component having a negative refractive power.

If the negative refractive power of the cemented lens component is so high that the lower limit of conditional expression (A2) is reached, aberrations generated by the positive lens components in the second lens unit can be cancelled efficiently.

If the refractive power of the object side positive lens component is so high that the upper limit of conditional expression (A2) is not exceeded, correction of spherical aberration is facilitated.

Conditional expression (A3) specifies a preferred range of the ratio of the focal length of the image side positive lens component and the focal length of the cemented lens component having a negative refractive power.

If the negative refractive power of the cemented lens component is so high that the lower limit of conditional expression (A3) is reached, aberrations generated by the positive lens components in the second lens unit can be cancelled efficiently.

If the negative refractive power of the cemented lens component is not excessively high so that the upper limit of conditional expression (A3) is not exceeded, correction of chromatic aberration generated in the second lens unit is facilitated.

It is preferred that the image side positive lens component be a cemented lens component made up of a negative lens and a positive lens.

Thus including a plurality of negative lenses in the second lens unit further facilitates reduction of aberrations.

It is preferred that the second lens unit consist, in order from the object side to the image side, of a positive single lens constituting the object side positive lens component, the cemented lens component made up of a positive lens and negative lens arranged in order from the object side, and a positive single lens constituting the image side positive lens component.

Constituting the cemented lens component by a positive lens and a negative lens arranged in order from the object side allows to make the positive refractive power of the positive single lens arranged closest to the object side small and facilitates correction of aberrations. Moreover, using a positive single lens as the image side positive lens component facilitates a size reduction of the second lens unit and cost reduction.

Alternatively, it is preferred that the second lens unit consist, in order from the object side to the image side, of a positive single lens constituting the object side positive lens component, the cemented lens component made up of a positive lens and a negative lens arranged in order from the object side, and a cemented lens component made up of a negative lens and a positive lens arranged in order from the object side, constituting the image side positive lens component.

Using a cemented lens as the image side positive lens component provides efficient correction of chromatic aberration generated in the second lens unit. This is advantageous when a high zoom ratio is to be achieved.

It is preferred that the third lens unit move in such a way that it becomes closest to the second lens unit at an intermediate focal length position in the course of zooming from the wide angle end to the telephoto end as compared to the state at the wide angle end and the state at the telephoto end and that the following conditional expression (1) be satisfied:

$$0.3 < D_{23W}/D_{34W} < 9 \quad (1).$$

where $D_{23W}$ is the axial distance between the second lens unit and the third lens unit at the wide angle end, and $D_{34W}$ is the axial distance between the third lens unit and the fourth lens unit at the wide angle end.

It is preferred that the third lens unit having a negative refractive power be located at a position that satisfies the conditional expression (1) at the wide angle end and move firstly closer to the second lens unit and then away from the second lens unit as described above.

Locating the third lens unit so distant from the second lens unit that the conditional expression (1) is satisfied at the wide angle end and moving it closer to the second lens unit during zooming in the wide angle focal length range are advantageous for changing the magnification of the zoom lens as a whole in the wide angle focal length range.

On the other hand, if the distance between the second lens unit and the third lens unit is too short, decentering aberrations caused by relative decentering (if any) between the second lens unit and the third lens unit will tend to be conspicuous. In particular, if the zoom ratio is high and/or the F-number is small, the adverse effect of decentering tends to matter. In view of this, the present invention employs the above-described configuration, in which the third lens unit is made farther from the second lens unit in the telephoto focal length range. This configuration reduces the adverse effect of decentering aberrations in the telephoto focal length range. This is advantageous when a sufficiently high zoom ratio and sufficient brightness (or sufficiently high speed) are to be achieved.

Conditional expression (1) specifies a preferred range of the location of the third lens unit at the wide angle end.

If the lower limit of conditional expression (1) is reached so that the third lens unit is located not too close to the second lens unit, the third lens unit can easily have a sufficient magnification changing function. This is advantageous when a high zoom ratio is to be achieved and when adverse effects of decentering in the focal length range near the wide angle end is to be reduced.

If the upper limit of conditional expression (1) is not exceeded so that the third lens unit is located not too close to the fourth lens unit, the size of the zoom lens can readily be made small, and the telecentricity on the image side can readily be achieved.

It is preferred that the positive single lens in the first lens unit satisfy the following conditional expression (B1):

$$-8 < (R_{1PF} + R_{1PR})/(R_{1PF} - R_{1PR}) < -1 \quad (B1)$$

where $R_{1PF}$ is the paraxial radius of curvature of the object side surface of the positive single lens in the first lens unit, and $R_{1PR}$ is the paraxial radius of curvature of the image side surface of the positive single lens in the first lens unit.

Conditional expression (B1) specifies a preferred condition concerning the shape factor of the positive single lens having a meniscus shape in the first lens unit.

If the positive refractive power of the object side surface of the positive single lens is so high that the lower limit of conditional expression (B1) is reached, the principal point of the positive single lens can readily be located closer to object side. This is advantageous for correction of chromatic aberration and size reduction of the reflecting prism.

If the positive single lens has a meniscus shape with which the upper limit of conditional expression (B1) is not exceeded, correction of curvature of field is facilitated.

It is preferred that the single lenses in the first lens unit satisfy the following conditional expression (B2):

$$20 < \nu d_{1N} - \nu d_{1P} < 40 \quad (B2),$$

where $\nu d_{1N}$ is the Abbe constant with respect to the d-line of the negative single lens in the first lens unit, and $\nu d_{1P}$ is the Abbe constant with respect to the d-line of the positive single lens in the first lens unit.

Conditional expression (B2) specifies a preferred range of the difference between the Abbe constant (with respect to the d-line) of the negative single lens in the first lens unit and that of the positive single lens in the first lens unit.

If the difference between the Abbe constants of these two lenses is so large that the lower limit of conditional expression (B2) is reached, correction of chromatic aberration generated in the first lens unit is facilitated.

If the difference between the Abbe constants of these two lenses is so small that the upper limit of conditional expression (B2) is not exceeded, the negative single lens can readily have an appropriate refractive index. This is advantageous when a wide angle of view is to be achieved with efficient reduction of aberrations.

It is preferred that the negative single lens in the first lens unit have a biconcave shape that satisfies the following conditional expression (B3):

$$0.4 < (R_{1NF} + R_{1NR})/(R_{1NF} - R_{1NR}) < 1 \quad (B3),$$

where $R_{1NF}$ is the paraxial radius of curvature of the object side surface of the negative single lens in the first lens unit, and $R_{1NR}$ is the paraxial radius of curvature of the image side surface of the negative single lens in the first lens unit.

Conditional expression (B3) specifies a preferred condition concerning the shape factor of the negative single lens in the first lens unit. The use of a biconcave negative lens that satisfies conditional expression (B3) is advantageous for designing the first lens unit to have an adequately high negative refractive power, for achieving an appropriate angle of view, and for reducing spherical aberration in the first lens unit.

If the refractive power of the object side surface of the negative single lens is not excessively high so that the lower limit of conditional expression (B3) is reached, the principal point of the negative single lens is prevented from being located distant from the principal point of the positive single lens in the first lens unit. This facilitates correction of aberrations generated in the first lens unit.

If the negative single lens has a biconcave shape with which the upper limit of conditional expression (B3) is not exceeded, the negative single lens can have an adequately high negative refractive power, and the refractive power can be distributed to the object side surface and the image side surface. This is advantageous for reduction of aberrations.

It is preferred that the second lens unit include at least three lens components including an object side positive lens component having a positive refractive power and located closest to the object side among the lens components in the second lens unit, an image side positive lens component having a positive refractive power and located closest to the image side among the lens components in the second lens unit, and a cemented lens component including a positive lens and a negative lens and located between the object side positive lens component and the image side positive lens component.

Here, the term "lens component" refers to a lens member whose refractive surfaces that are in contact with air on the optical axis include only two surfaces or an object side surface and an image side surface. The lens component is a single lens or a cemented lens.

In order to achieve an appropriately high zoom ratio while keeping sufficient brightness (or sufficiently high speed), it is preferred that the second lens unit have a sufficiently high positive refractive power and that aberrations in the second lens unit be small.

With the above-described configuration, the second lens unit includes at least three lens components, among which the lens component located closest to the object side and the lens component located closest to the image side have positive refractive powers to contribute to the positive refractive power of the second lens unit. In addition, the cemented lens component including a positive lens and a negative lens is provided between the two positive lens components. This cemented lens component can be designed to provide correction of chromatic aberration and curvature of field. This is advantageous when correction of aberrations and sufficient brightness (or sufficiently high speed) are both to be achieved.

Furthermore, it is preferred that the following conditional expression (A1) be satisfied:

$$0.1 < f_{2F}/f_{2R} < 0.61 \quad (A1),$$

where $f_{2F}$ is the focal length of the object side positive lens component in the second lens unit, and $f_{2R}$ is the focal length of the image side positive lens component in the second lens unit.

Conditional expression (A1) specifies a preferred range of the ratio of the focal length of the object side positive lens component and the focal length of the image side positive lens component.

If the image side positive lens component has a sufficiently high refractive power and the refractive power of the object side positive lens component is not too high so that the lower limit of conditional expression (A1) is reached, well balanced distribution of the positive refractive power can be achieved in the second lens unit. This is advantageous for correction of aberrations.

If the object side positive lens component has a sufficiently high refractive power so that the upper limit of conditional expression (A1) is not exceeded, correction of spherical aberration is facilitated.

It is preferred that the zoom lens have an aperture stop that is located closer to the image side than the first lens unit and closer to the object side than the lens closest to the image side in the second lens unit and moves toward the object side during zooming from the wide angle end to the telephoto end, and that the zoom lens satisfy the following conditional expressions (9) and (10):

$$3.3 < f_t/f_w < 15.0 \quad (9), \text{ and}$$

$$1.2 < F_{now} < 2.4 \quad (10),$$

where $f_t$ is the focal length of the zoom lens at the telephoto end, $f_w$ is the focal length of the zoom lens at the wide angle end, and $F_{now}$ is the least F-number of the zoom lens at the wide angle end.

Conditional expression (9) specifies a preferred range of the zoom ratio in the above-described configuration. Conditional expression (10) specifies a preferred range of the F-number at the wide angle end.

If the zoom ratio is so high that the lower limit of conditional expression (9) is reached, the image pickup apparatus can suitably be used in various shooting situations.

A moderately low zoom ratio of the zoom lens that does not exceed the upper limit of conditional expression (9) is advantageous for size reduction of the zoom lens.

If the F-number is larger than the lower limit of conditional expression (10), the effective diameter of the zoom lens will readily be prevented from becoming large, leading to smallness in size.

It is preferred that the upper limit of conditional expression (10) be not exceeded so that sufficient brightness (sufficiently high speed) is achieved.

It is preferred that the following conditional expressions (11) and (12) be satisfied:

$$0.8 < f_w/IH_t < 1.4 \quad (11), \text{ and}$$

$$0.75 < IH_w/IH_t < 0.95 \quad (12),$$

where $f_w$ is the focal length of the zoom lens at the wide angle end, $IH_t$ is the largest image height at the telephoto end or half the diagonal length of the effective image pickup area of the image pickup element at the telephoto end, and $IH_w$ is the largest image height at the wide angle end or half the diagonal length of the effective image pickup area of the image pickup element at the wide angle end.

With the above-described configuration, the first lens unit can have a sufficiently high negative refractive power while making spherical aberration and coma small, though the first lens unit has a simple configuration. Therefore, a wide angle of view can be achieved, and a sufficiently high zoom ratio can be achieved by the movement of the second lens unit.

A high negative refractive power of the first lens unit tends to lead to barrel distortion at the wide angle end. However, such barrel distortion can easily be corrected by signal processing of image signals.

Conditional expression (11) specifies a preferred range of the focal length of the zoom lens at the wide angle end.

If the lower limit of conditional expression (11) is reached, the effective diameter of the first lens unit can be made small even with a wide angle of view.

It is preferred that the angle of view at the wide angle end be so large that the upper limit of conditional expression (11) is not exceeded.

Conditional expression (12) specifies a preferred range of the ratio of the image height at the wide angle end and the image height at the telephoto end.

If the effective image pickup area in the focal length range near the wide angle end is so large that the lower limit of conditional expression (12) is reached, satisfactory image quality can be achieved by correcting distortion by signal processing.

If the upper limit of conditional expression (12) is not exceeded, the zoom lens is allowed to have distortion at the wide angle end. This is advantageous for size reduction.

In the above-described cases, it is preferred that the zoom lens have an aperture stop that moves toward the object side during zooming from the wide angle end to the telephoto end.

If this is the case, an increase in the size of the second lens unit can be prevented, and the aperture stop can have a sufficiently large effective radius.

In the above-described cases, it is preferred that conditional expression (C1) be satisfied.

It is preferred that the thickness of the second lens unit be so large relative to the effective radius of the aperture stop that the lower limit of conditional expression (C1) is reached. If this is the case, the second lens unit can be designed to have an appropriate positive refractive power as needed, the lenses in the second lens unit can have appropriate refractive powers, and satisfactory optical performance can be achieved.

It is preferred that the thickness of the second lens unit be not excessively large relative to the effective radius of the aperture stop so that the upper limit of conditional expression (C1) is not exceeded. If this is the case, the increase in the volume of the second lens unit can be made small even when sufficient brightness is achieved, leading to size reduction.

In the case where the zoom lens with a bent optical path has the focusing function, the features described in the foregoing should be interpreted as those for the state in which the zoom lens is focused at the longest distance.

In order for the above-described image pickup apparatus equipped with a zoom lens with a bent optical path to have excellent performance, it is more preferred that apparatus further have one of the features described in the following or two or more of them in combination.

To achieve an appropriately wide angle of view and satisfactory optical performance, it is preferred that the first lens unit consist, in order from the object side to the image side along the optical axis, of a biconcave lens component having a negative refractive power, the reflecting member, and a positive lens component having a positive refractive power and that the biconcave lens component have an aspheric lens surface.

Here, the term "lens component" refers to a lens member whose refractive surfaces that are in contact with air on the optical axis include only two surfaces or an object side surface and an image side surface. The lens component is a single lens or a cemented lens.

The use of the biconcave lens component as the lens component closest to the object side in the first lens unit contributes to the negative refractive power of the first lens unit and facilitates achieving a large angle of view at the wide angle end. In addition, the use of the biconcave lens component is also advantageous for reduction of spherical aberration, which tends to be conspicuous with a bright (or high speed) zoom lens.

The effective diameter of the biconcave negative lens component in the first lens unit becomes smaller at telephoto (or long) focal lengths and larger at wide angle (or short) focal lengths. Therefore, the use of an aspheric lens surface in this lens component facilitates reduction of aberrations in the wide angle focal length range.

Furthermore, it is preferred that the biconcave lens component include a plurality of aspheric lens surfaces. This further facilitates correction of aberrations.

It is also preferred that the following conditional expression (C2) be satisfied:

$$0.3 < f_{1F}/f_1 < 0.9 \quad (C2),$$

where $f_{1F}$ is the combined focal length of the portion of the first lens unit that is located on the object side of the reflecting surface, and $f_1$ is the focal length of the first lens unit.

If the negative refractive power of the portion of the first lens unit that is located on the object side of the reflecting surface is not excessively high so that the lower limit of conditional expression (C2) is reached, aberrations generated in the first lens unit can efficiently be made small.

If the negative refractive power of the portion of the first lens unit that is located on the object side of the reflecting surface is so high that the upper limit of conditional expression (C2) is not exceeded, a wide angle of view can be achieved advantageously.

It is also preferred that the following conditional expression (C3) be satisfied:

$$0.4 < (R_{1NCF} + R_{1NCR})/(R_{1NCF} - R_{1NCR}) < 1 \quad (C3),$$

where $R_{1NCF}$ is the paraxial radius of curvature of the object side surface of the biconcave lens component in the first lens unit, and $R_{1NCR}$ is the paraxial radius of curvature of the image side surface of the biconcave lens component in the first lens unit.

If the refractive power of the object side surface of the biconcave lens component is not excessively high so that the lower limit of conditional expression (C3) is reached, the position of the principal point of the biconcave lens component is prevented from being distant from the position of the principal point of the positive lens component in the first lens unit. This is advantageous for correction of aberrations generated in the first lens unit.

If the upper limit of conditional expression (C3) is not exceeded, the negative lens component can have a sufficiently high negative refractive power, and the negative refractive power can be distributed to the object side surface and the image side surface. This is advantageous for reduction of axial aberrations.

It is preferred that the magnification of the third lens unit be higher at the telephoto end than at the wide angle end.

If this is the case, the magnification change provided by the second lens unit can be made smaller. This is advantageous when correction of aberrations and high zoom ratio are both to be achieved.

It is preferred that the first lens unit consist, in order from the object side to the image side along the optical axis, of a negative single lens having a negative refractive power, the reflecting member, and a positive single lens having a positive refractive power and having a meniscus shape with a convex surface facing the object side and that the reflecting member be a reflecting prism having a flat entrance surface and a flat exit surface.

The flat incidence and exit surfaces of the reflecting prism lead to low cost. The number of optical components in the first lens unit is as small as three. Moreover, the first lens unit is designed to have a sufficiently high negative refractive power, which is needed to achieve a sufficiently large angle of view, and to facilitate correction of aberrations.

In particular, since the positive single lens has a meniscus shape with a convex surface facing the object side, the principal point of this positive single lens can readily be located closer to the object side along the optical axis. This allows a reduction in the size of the reflecting prism, leading to a size reduction with respect to the thickness direction.

The above feature additionally allows a reduction in the diameter of the negative single lens and a reduction in the distance between the negative single lens and the principal point of the positive single lens, facilitating a reduction in curvature of field and prevention of excessively high distortion.

The above-described configuration is advantageous when a sufficiently wide angle of view at the wide angle end, size reduction, and cost reduction are to be achieved in a negative-lead type zoom lens with a bent optical path, which can advantageously be designed to have a wide angle of view at the wide angle end.

It is preferred that the positive single lens in the first lens unit satisfy the following conditional expression (B1):

$$-8 < (R_{1PF} + R_{1PR})/(R_{1PF} - R_{1PR}) < -1 \quad (B1),$$

where $R_{1PF}$ is the paraxial radius of curvature of the object side surface of the positive single lens in the first lens unit, and $R_{1PR}$ is the paraxial radius of curvature of the image side surface of the positive single lens in the first lens unit.

Conditional expression (B1) specifies a preferred condition concerning the shape factor of the positive single lens having a meniscus shape in the first lens unit.

If the positive refractive power of the object side surface of the positive single lens is so high that the lower limit of conditional expression (B1) is reached, the principal point of the positive single lens can readily be located closer to object side. This is advantageous for correction of chromatic aberration and size reduction of the reflecting prism.

If the positive single lens has a meniscus shape with which the upper limit of conditional expression (B1) is not exceeded, correction of curvature of field is facilitated.

It is preferred that the single lenses in the first lens unit satisfy the following conditional expression (B2):

$$20 < vd_{1N} - vd_{1P} < 40 \quad (B2),$$

where $vd_{1N}$ is the Abbe constant with respect to the d-line of the negative single lens in the first lens unit, and $vd_{1P}$ is the Abbe constant with respect to the d-line of the positive single lens in the first lens unit.

Conditional expression (B2) specifies a preferred range of the difference between the Abbe constant (with respect to the d-line) of the negative single lens in the first lens unit and that of the positive single lens in the first lens unit.

If the difference between the Abbe constants of these two lenses is so large that the lower limit of conditional expression (B2) is reached, correction of chromatic aberration generated in the first lens unit is facilitated.

If the difference between the Abbe constants of these two lenses is so small that the upper limit of conditional expression (B2) is not exceeded, the negative single lens can readily have an appropriate refractive index. This is advantageous when a wide angle of view is to be achieved with efficient reduction of aberrations.

It is preferred that the second lens unit consist of three lens components including, in order from the object side to the image side, the aforementioned object side positive lens component, the aforementioned cemented lens component, and the aforementioned image side positive lens component.

Including only three lens components allows to achieve both excellent performance and cost reduction.

Furthermore, it is preferred that the cemented lens component have a negative refractive power.

The cemented lens component is located between the positive lens components in the second lens unit. Therefore, the cemented lens component having a negative refractive power provides cancellation of aberrations in the second lens unit and facilitates reduction of spherical aberrations etc. with sufficient brightness (or sufficiently high speed) being achieved.

In this case, it is preferred that the following conditional expressions (A2) and (A3) be satisfied:

$$0.1 < f_{2F}/|f_{2C}| < 1 \tag{A2}$$

and $$0.2 < f_{2R}/|f_{2C}| < 5 \tag{A3}$$

where $f_{2C}$ is the focal length of the cemented lens component in the second lens unit.

Conditional expression (A2) specifies a preferred range of the ratio of the focal length of the object side positive lens component and the focal length of the cemented lens component having a negative refractive power.

If the negative refractive power of the cemented lens component is so high that the lower limit of conditional expression (A2) is reached, aberrations generated by the positive lens components in the second lens unit can be cancelled efficiently.

If the refractive power of the object side positive lens component is so high that the upper limit of conditional expression (A2) is not exceeded, correction of spherical aberration is facilitated.

Conditional expression (A3) specifies a preferred range of the ratio of the focal length of the image side positive lens component and the focal length of the cemented lens component having a negative refractive power.

If the negative refractive power of the cemented lens component is so high that the lower limit of conditional expression (A3) is reached, aberrations generated by the positive lens components in the second lens unit can be cancelled efficiently.

If the negative refractive power of the cemented lens component is not excessively high so that the upper limit of conditional expression (A3) is not exceeded, correction of chromatic aberration generated in the second lens unit is facilitated.

It is preferred that the image side positive lens component be a cemented lens component made up of a negative lens and a positive lens.

Thus including a plurality of negative lenses in the second lens unit further facilitates reduction of aberrations.

It is preferred that the second lens unit consist, in order from the object side to the image side, of a positive single lens constituting the object side positive lens component, the cemented lens component made up of a positive lens and negative lens arranged in order from the object side, and a positive single lens constituting the image side positive lens component.

Constituting the cemented lens component by a positive lens and a negative lens arranged in order from the object side allows to make the positive refractive power of the positive single lens arranged closest to the object side small and facilitates correction of aberrations. Moreover, using a positive single lens as the image side positive lens component facilitates a size reduction of the second lens unit and cost reduction.

Alternatively, it is preferred that the second lens unit consist, in order from the object side to the image side, of a positive single lens constituting the object side positive lens component, the cemented lens component made up of a positive lens and a negative lens arranged in order from the object side, and a cemented lens component made up of a negative lens and a positive lens arranged in order from the object side, constituting the image side positive lens component.

Using a cemented lens as the image side positive lens component provides efficient correction of chromatic aberration generated in the second lens unit. This is advantageous when a high zoom ratio is to be achieved. It is preferred that the aperture stop be located closer to the image side than the first lens unit and closer to the object side than the lens closest to the image side in the second lens unit, and that the zoom lens satisfy the following conditional expressions (9) and (10):

$$3.3 < f_t/f_w < 15.0 \tag{9}$$

and $$1.2 < F_{now} < 2.4 \tag{10},$$

where $f_t$ is the focal length of the zoom lens at the telephoto end, $f_w$ is the focal length of the zoom lens at the wide angle end, and $F_{now}$ is the least F-number of the zoom lens at the wide angle end.

Conditional expression (9) specifies a preferred range of the zoom ratio in the above-described configuration. Conditional expression (10) specifies a preferred range of the F-number at the wide angle end.

If the zoom ratio is so high that the lower limit of conditional expression (9) is reached, the image pickup apparatus can suitably be used in various shooting situations.

A moderately low zoom ratio that does not exceed the upper limit of conditional expression (9) is advantageous for size reduction of the zoom lens.

If the F-number is larger than the lower limit of conditional expression (10), the effective diameter of the zoom lens will readily be prevented from becoming large, leading to smallness in size.

It is preferred that the upper limit of conditional expression (10) be not exceeded so that sufficient brightness (sufficiently high speed) is achieved.

Two or more of the features described in the foregoing may be adopted in combination.

It is more preferred that the lower limit value in conditional expression (C1) be 1.3, more preferably 1.5, still more preferably 1.8, still more preferably 1.9.

It is more preferred that the upper limit value in conditional expression (C1) be 2.3, more preferably 2.25, still more preferably 2.2.

It is more preferred that the lower limit value in conditional expression (C2) be 0.4, more preferably 0.5, still more preferably 0.6.

It is more preferred that the upper limit value in conditional expression (C2) be 0.85, more preferably 0.8, still more preferably 0.75, still more preferably 0.7.

It is more preferred that the lower limit value in conditional expression (C3) be 0.45, more preferably 0.5, still more preferably 0.55.

It is more preferred that the upper limit value in conditional expression (C3) be 0.9, more preferably 0.8, still more preferably 0.7.

It is more preferred that the lower limit value in conditional expression (B1) be −7, more preferably −6, still more preferably −5, still more preferably −4.

It is more preferred that the upper limit value in conditional expression (B1) be −1.5, more preferably −2, still more preferably −2.5.

It is more preferred that the lower limit value in conditional expression (B2) be 22, more preferably 25, still more preferably 28.

It is more preferred that the upper limit value in conditional expression (B2) be 45, more preferably 40, still more preferably 35, still more preferably 32.

It is more preferred that the lower limit value in conditional expression (A1) be 0.2, more preferably 0.3, still more preferably 0.35.

It is more preferred that the upper limit value in conditional expression (A1) be 0.55, more preferably 0.5.

It is more preferred that the lower limit value in conditional expression (A2) be 0.2, more preferably 0.3, still more preferably 0.4.

It is more preferred that the upper limit value in conditional expression (A2) be 0.8, more preferably 0.6, still more preferably 0.5.

It is more preferred that the lower limit value in conditional expression (A3) be 0.4, more preferably 0.6, still more preferably 0.7.

It is more preferred that the upper limit value in conditional expression (A3) be 4, more preferably 3, still more preferably 2, still more preferably 1.5.

It is more preferred that the lower limit value in conditional expression (1) be 0.5, more preferably 0.7, still more preferably 1.0, still more preferably 1.2.

It is more preferred that the upper limit value in conditional expression (1) be 7, more preferably 5, still more preferably 3, still more preferably 2.

It is more preferred that the lower limit value in conditional expression (2) be −4, more preferably −3, still more preferably −2.

It is more preferred that the upper limit value in conditional expression (2) be −1.1, more preferably −1.2, still more preferably −1.3.

It is more preferred that the lower limit value in conditional expression (3) be −0.18, more preferably −0.17, still more preferably −0.175, still more preferably −0.16, still more preferably −0.13.

It is more preferred that the upper limit value in conditional expression (3) be −0.02, more preferably −0.03, still more preferably −0.04.

It is more preferred that the lower limit value in conditional expression (4) be −0.5, more preferably −0.4, still more preferably −0.3.

It is more preferred that the upper limit value in conditional expression (4) be −0.12, more preferably −0.14, still more preferably −0.16.

It is more preferred that the lower limit value in conditional expression (5) be 0.2, more preferably 0.3.

It is more preferred that the upper limit value in conditional expression (5) be 0.8, more preferably 0.75, still more preferably 0.7, still more preferably 0.6, still more preferably 0.5.

It is more preferred that the lower limit value in conditional expression (6) be 1.5, more preferably 1.6, still more preferably 1.7, still more preferably 2, still more preferably 2.5.

It is more preferred that the upper limit value in conditional expression (6) be 5, more preferably 4, still more preferably 3.

It is more preferred that the lower limit value in conditional expression (7) be −0.3, more preferably −0.25, still more preferably −0.2.

It is more preferred that the upper limit value in conditional expression (7) be −0.1, more preferably −0.13, still more preferably −0.16.

It is more preferred that the lower limit value in conditional expression (8) be −2.5, more preferably −2, still more preferably −1.5.

It is more preferred that the upper limit value in conditional expression (8) be −0.7, more preferably −0.8, still more preferably −0.9.

It is more preferred that the lower limit value in conditional expression (9) be 3.6, more preferably 3.82.

It is more preferred that the upper limit value in conditional expression (9) be 10.0, more preferably 8.0, still more preferably 5.0.

It is more preferred that the lower limit value in conditional expression (10) be 1.4, more preferably 1.8, still more preferably 1.7, still more preferably 2, still more preferably 2.0.

It is more preferred that the upper limit value in conditional expression (10) be 2.2, more preferably 2.1, still more preferably 2.07, still more preferably 2.06.

It is more preferred that the lower limit value in conditional expression (11) be 0.9, more preferably 1.0, still more preferably 1.05.

It is more preferred that the upper limit value in conditional expression (11) be 1.3, more preferably 1.25, still more preferably 1.23, still more preferably 1.2.

It is more preferred that the lower limit value in conditional expression (12) be 0.8, more preferably 0.85.

It is more preferred that the upper limit value in conditional expression (12) be 0.92, more preferably 0.89.

It is more preferred that the lower limit value in conditional expression (13) be 1.9, more preferably 2.0.

It is more preferred that the upper limit value in conditional expression (13) be 3.5, more preferably 2.5.

It is more preferred that the lower limit value in conditional expression (14) be 1.35, more preferably 1.45.

It is more preferred that the upper limit value in conditional expression (14) be 2.5, more preferably 1.8.

It is more preferred that the lower limit value in conditional expression (15) be 1.07, more preferably 1.10.

It is more preferred that the upper limit value in conditional expression (15) be 1.5, more preferably 1.2

In the following, embodiments of the image pickup apparatus equipped with a zoom lens with a bent optical path according to the present invention will be described in detail with reference to the accompanying drawings. It should be understood that the present invention is not limited by the embodiments.

(Embodiments)

In the following, first to tenth embodiments of the zoom lens according to the present invention will be described. FIGS. 1A, 2A, 3A, 4A, 5A, 6A, 7A, 8A, 9A, and 10A are cross sectional views of the zoom lenses according to the first to tenth embodiments in the state in which they are focused on an object point at infinity at the wide angle end, FIGS. 1B, 2B, 3B, 4B, 5B, 6B, 7B, 8B, 9B, and 10B are cross sectional views of the zoom lenses according to the first to tenth embodiments in the state in which they are focused on an object point at infinity in an intermediate focal length state, and FIGS. 1C, 2C, 3C, 4C, 5C, 6C, 7C, 8C, 9C, and 10C are cross sectional views of the zoom lenses according to the first to tenth embodiments in the state in which they are focused on an object point at infinity at the telephoto end. In FIGS. 1A to 10A, 1B to 10B, and 1C to 10C, a first lens unit is denoted by G1, a second lens unit is denoted by G2, a third lens unit is denoted by G3, a fourth lens unit is denoted by G4, an aperture stop is denoted by S, a plane parallel plate constituting a low pass filter on which wavelength range restriction coating for restricting infrared light is denoted by F, a plane parallel plate constituting a cover glass for an electronic image pickup element is denoted by C, and the image plane is denoted by I. The cover glass C may have a multi-layer film for wavelength range restriction applied on its surface. The cover glass C may be adapted to have the low-pass filtering function. The low-pass filtering function of the plane parallel plate F may be eliminated.

In all the zoom lenses according to the embodiments, the aperture stop S moves integrally with the second lens unit G2.

All the numerical data presented below are for the state in which the zoom lens is focused on an object at infinity. In the numerical data, dimensions are in millimeters and angles are in degrees. Zoom data will be given for the wide angle end (WE), for an intermediate zoom state (ST) at which the third lens unit comes closest to the second lens unit in the course of zooming, and for the telephoto end (TE).

Figure 1B:
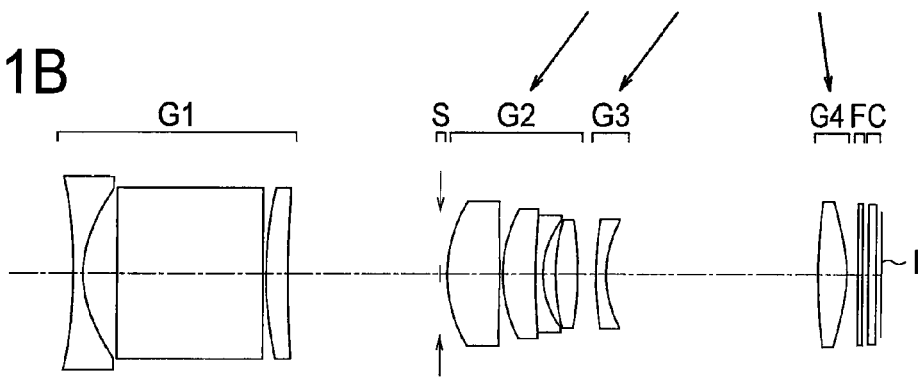
Figure 1C:
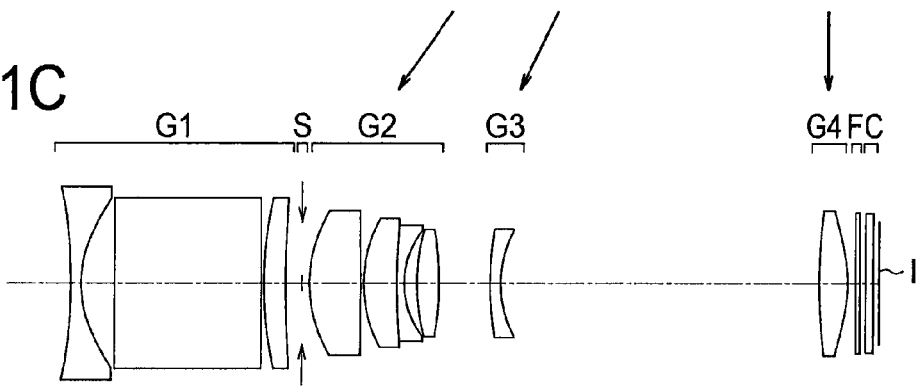

As shown in FIGS. 1A, 1B, and 1C, the zoom lens according to the first embodiment includes, in order from the object side, a first lens unit G1 having a negative refractive power, an aperture stop S, a second lens unit G2 having a positive refractive power, a third lens unit G3 having a negative refractive power, and a fourth lens unit G4 having a positive refractive power.

During zooming from the wide angle end to the telephoto end, the first lens unit G1 is fixed, the second lens unit G2 moves toward the object side, the third lens unit G3 moves toward the object side, and the fourth lens unit G4 moves toward the image side. The aperture stop S moves with the second lens unit G2. Focusing operation from an object point at long distance to an object point at short distance is performed by moving the third lens unit G3 toward the image side or by moving the fourth lens unit G4 toward the object side.

The first lens unit G1 is composed of a biconcave negative lens, a prism, and a positive meniscus lens having a convex surface directed toward the object side. The second lens unit G2 is composed of a biconvex positive lens, a cemented lens made up of a positive meniscus lens having a convex surface directed toward the object side and a negative meniscus lens having a convex surface directed toward the object side, and a biconvex positive lens. The third lens unit G3 is composed of a negative meniscus lens having a convex surface directed toward the object side. The fourth lens unit G4 is composed of a biconvex positive lens. The lens elements in each lens unit are arranged in the mentioned order from the object side.

Figure 24:
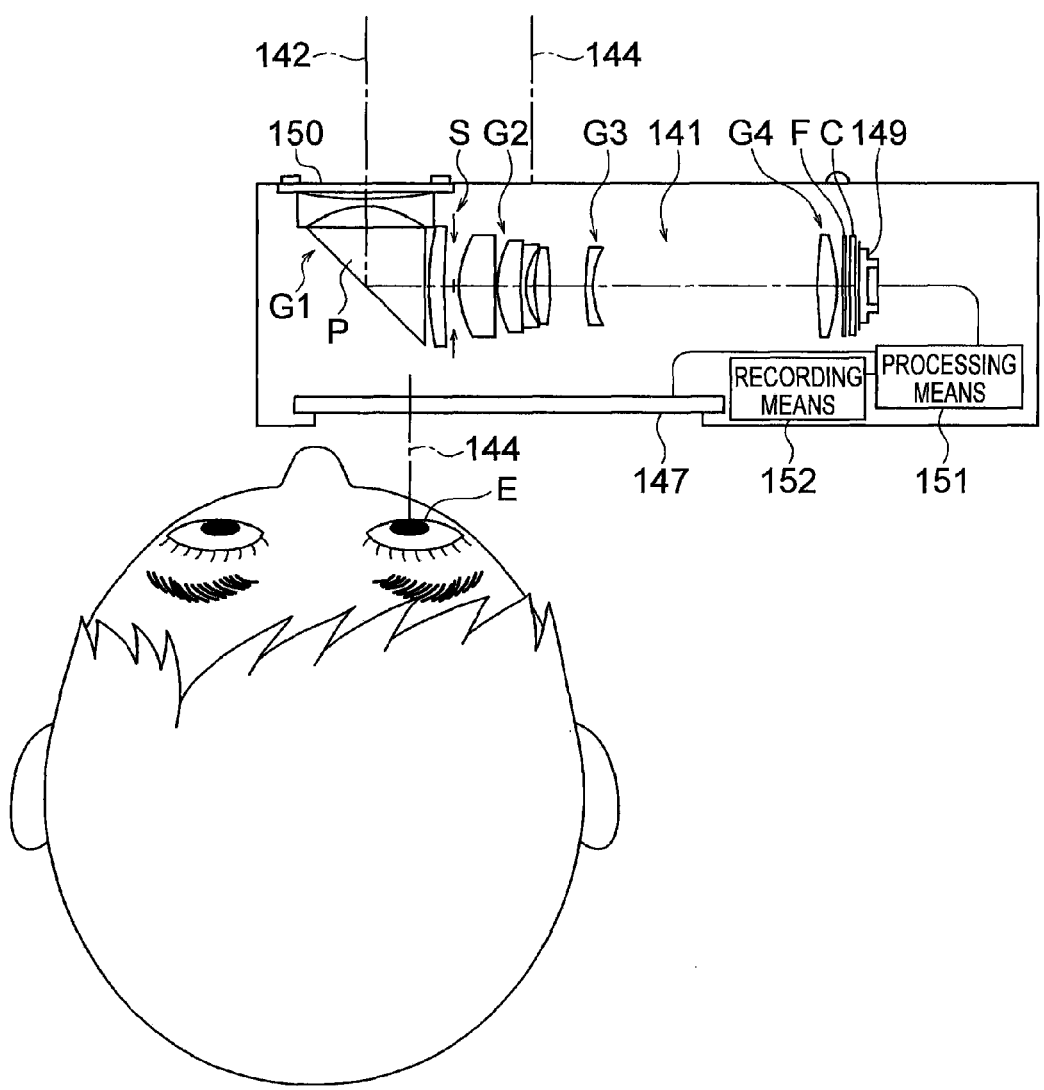
FIG. 24 is a schematic diagram illustrating the internal construction of the digital camera.

FIGS. 1A to 10A, 1B to 10B, and 1C to 10C are extended views in which the reflecting surface of the prism is not illustrated. Actually, the prism is a rectangular prism as shown in FIG. 24.

There are five aspheric surfaces, which include both surfaces of the biconcave negative lens in the first lens unit G1, both surfaces of the object side biconvex positive lens in the second lens unit G2, and the image side surface of the biconvex positive lens in the fourth lens unit G4.

Figure 2A:
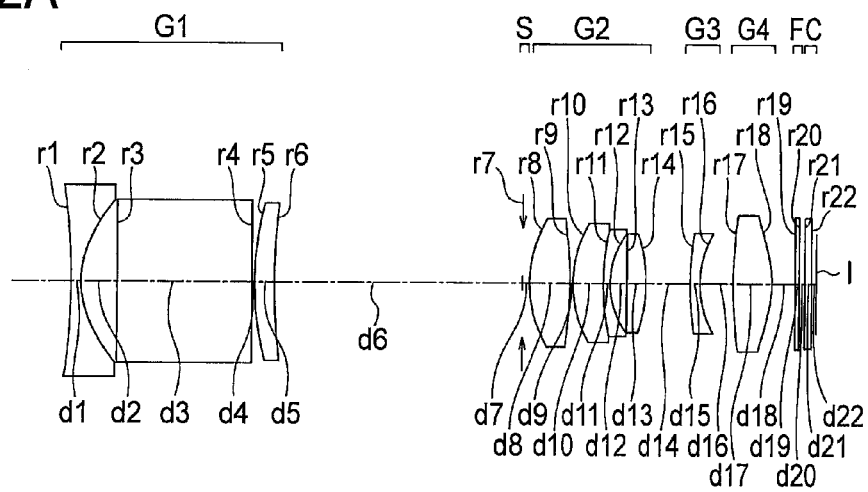
FIGS. 2A, 2B, and 2C are cross sectional views taken along the optical axis, showing the construction of a zoom lens with a bent optical path according to a second embodiment of the present invention in the state in which the zoom lens is focused on an object point at infinity, where
Figure 2B:
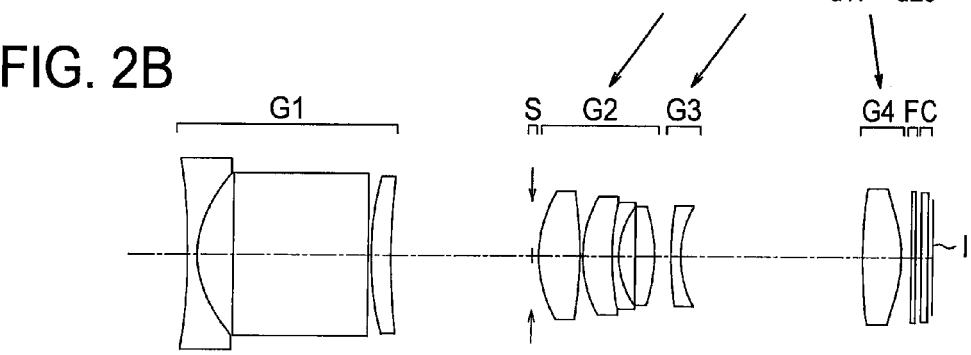
Figure 2C:
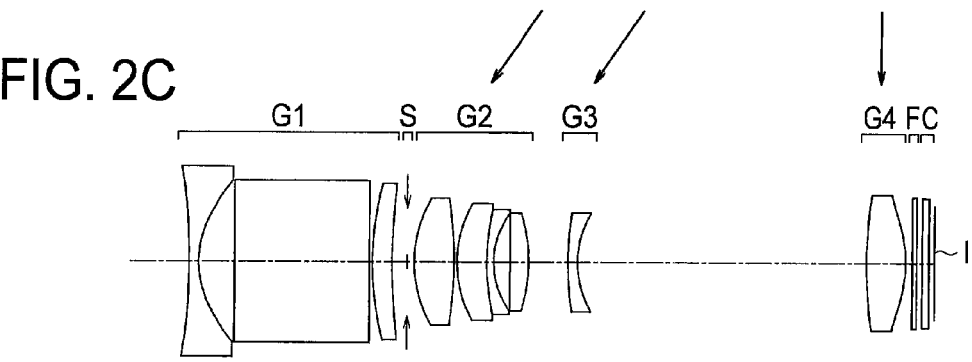

As shown in FIGS. 2A, 2B, and 2C, the zoom lens according to the second embodiment includes, in order from the object side, a first lens unit G1 having a negative refractive power, an aperture stop S, a second lens unit G2 having a positive refractive power, a third lens unit G3 having a negative refractive power, and a fourth lens unit G4 having a positive refractive power.

During zooming from the wide angle end to the telephoto end, the first lens unit G1 is fixed, the second lens unit G2 moves toward the object side, the third lens unit G3 moves toward the object side, and the fourth lens unit G4 moves toward the image side. The aperture stop S moves with the second lens unit G2. Focusing operation from an object point at long distance to an object point at short distance is performed by moving the third lens unit G3 toward the image side or by moving the fourth lens unit G4 toward the object side.

The first lens unit G1 is composed of a biconcave negative lens, a prism, and a positive meniscus lens having a convex surface directed toward the object side. The second lens unit G2 is composed of a biconvex positive lens, a cemented lens made up of a positive meniscus lens having a convex surface directed toward the object side and a negative meniscus lens having a convex surface directed toward the object side, and a positive meniscus lens having a convex surface directed toward the image side. The third lens unit G3 is composed of a negative meniscus lens having a convex surface directed toward the object side. The fourth lens unit G4 is composed of a biconvex positive lens. The lens elements in each lens unit are arranged in the mentioned order from the object side.

There are seven aspheric surfaces, which include both surfaces of the biconcave negative lens in the first lens unit G1, both surfaces of the biconvex positive lens in the second lens unit G2, the image side surface of the negative meniscus lens in the third lens unit G3, and both surfaces of the biconvex positive lens in the fourth lens unit G4.

Figure 3A:
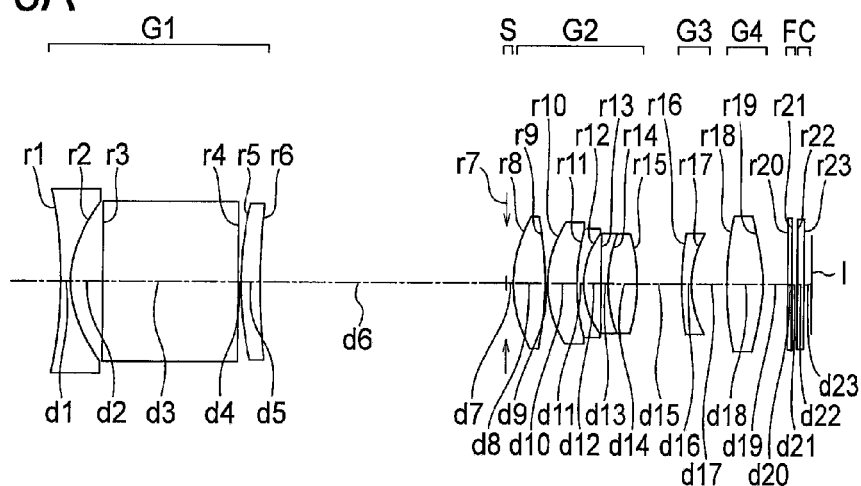
FIGS. 3A, 3B, and 3C are cross sectional views taken along the optical axis, showing the construction of a zoom lens with a bent optical path according to a third embodiment of the present invention in the state in which the zoom lens is focused on an object point at infinity, where
Figure 3B:
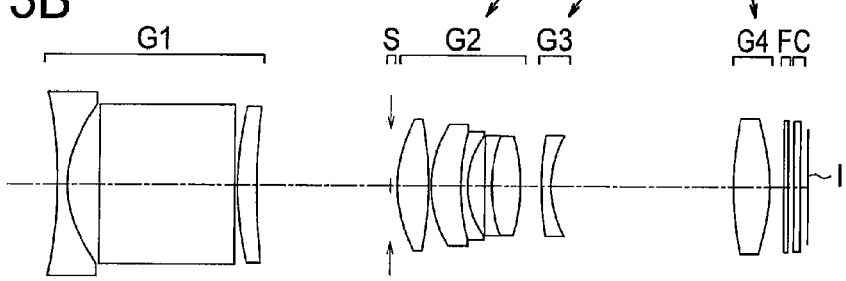
Figure 3C:
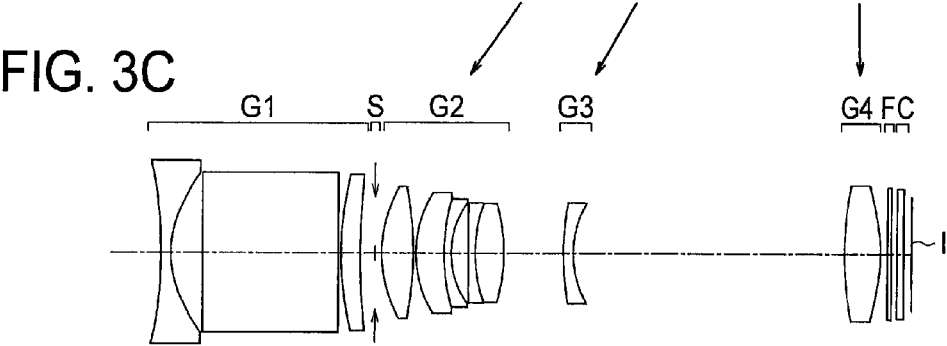

As shown in FIGS. 3A, 3B, and 3C, the zoom lens according to the third embodiment includes, in order from the object side, a first lens unit G1 having a negative refractive power, an aperture stop S, a second lens unit G2 having a positive refractive power, a third lens unit G3 having a negative refractive power, and a fourth lens unit G4 having a positive refractive power.

During zooming from the wide angle end to the telephoto end, the first lens unit G1 is fixed, the second lens unit G2 moves toward the object side, the third lens unit G3 moves toward the object side, and the fourth lens unit G4 moves toward the image side. The aperture stop S moves with the second lens unit G2. Focusing operation from an object point at long distance to an object point at short distance is performed by moving the third lens unit G3 toward the image side or by moving the fourth lens unit G4 toward the object side.

The first lens unit G1 is composed of a biconcave negative lens, a prism, and a positive meniscus lens having a convex surface directed toward the object side. The second lens unit G2 is composed of a biconvex positive lens, a cemented lens made up of a positive meniscus lens having a convex surface directed toward the object side and a negative meniscus lens having a convex surface directed toward the object side, and a cemented lens made up of a negative meniscus lens having a convex surface directed toward the object side and a biconvex positive lens. The third lens unit G3 is composed of a negative meniscus lens having a convex surface directed toward the object side. The fourth lens unit G4 is composed of a biconvex positive lens. The lens elements in each lens unit are arranged in the mentioned order from the object side.

There are six aspheric surfaces, which include both surfaces of the biconcave negative lens in the first lens unit G1, both surfaces of the object side biconvex positive lens in the second lens unit G2, the image side surface of the negative meniscus lens in the third lens unit G3, and the image side surface of the biconvex positive lens in the fourth lens unit G4.

Figure 4A:
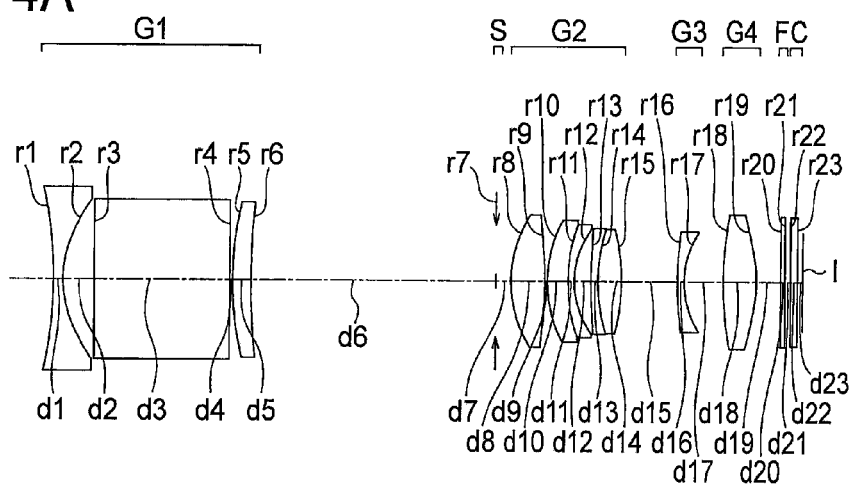
FIGS. 4A, 4B, and 4C are cross sectional views taken along the optical axis, showing the construction of a zoom lens with a bent optical path according to a fourth embodiment of the present invention in the state in which the zoom lens is focused on an object point at infinity, where
Figure 4B:
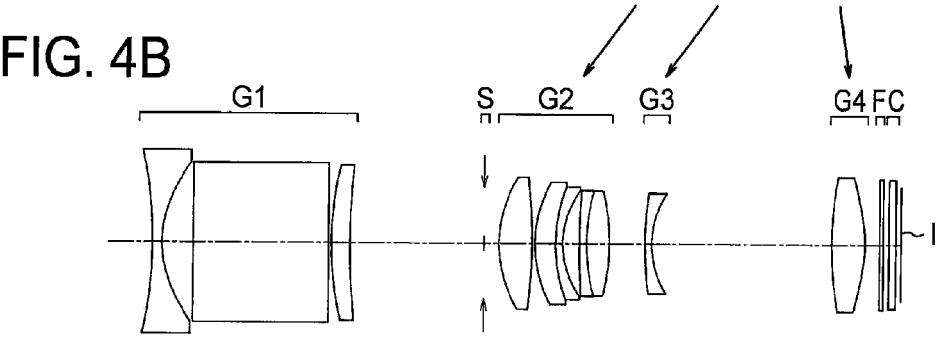
Figure 4C:
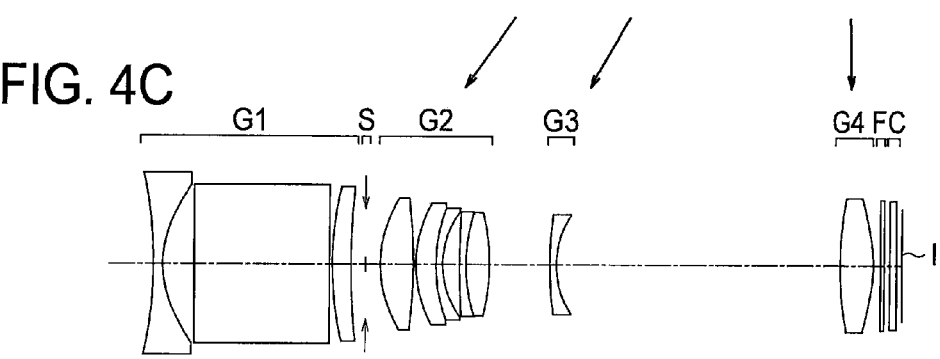

As shown in FIGS. 4A, 4B, and 4C, the zoom lens according to the fourth embodiment includes, in order from the object side, a first lens unit G1 having a negative refractive power, an aperture stop S, a second lens unit G2 having a positive refractive power, a third lens unit G3 having a negative refractive power, and a fourth lens unit G4 having a positive refractive power.

During zooming from the wide angle end to the telephoto end, the first lens unit G1 is fixed, the second lens unit G2 moves toward the object side, the third lens unit G3 moves toward the object side, and the fourth lens unit G4 moves toward the image side. The aperture stop S moves with the second lens unit G2. Focusing operation from an object point at long distance to an object point at short distance is performed by moving the third lens unit G3 toward the image side or by moving the fourth lens unit G4 toward the object side.

The first lens unit G1 is composed of a biconcave negative lens, a prism, and a positive meniscus lens having a convex surface directed toward the object side. The second lens unit G2 is composed of a biconvex positive lens, a cemented lens made up of a positive meniscus lens having a convex surface directed toward the object side and a negative meniscus lens having a convex surface directed toward the object side, and a cemented lens made up of a negative meniscus lens having a convex surface directed toward the object side and a biconvex positive lens. The third lens unit G3 is composed of a negative meniscus lens having a convex surface directed toward the object side. The fourth lens unit G4 is composed of a biconvex positive lens. The lens elements in each lens unit are arranged in the mentioned order from the object side.

There are seven aspheric surfaces, which include both surfaces of the biconcave negative lens in the first lens unit G1, both surfaces of the object side biconvex positive lens in the second lens unit G2, the image side surface of the image side biconvex positive lens in the second lens unit G2, the image side surface of the negative meniscus lens in the third lens unit G3, and the image side surface of the biconvex positive lens in the fourth lens unit G4.

Figure 5A:
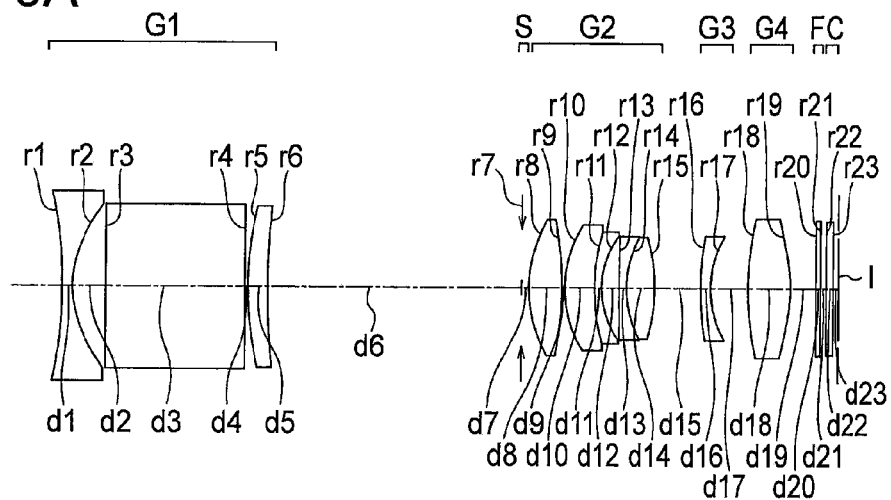
FIGS. 5A, 5B, and 5C are cross sectional views taken along the optical axis, showing the construction of a zoom lens with a bent optical path according to a fifth embodiment of the present invention in the state in which the zoom lens is focused on an object point at infinity, where
Figure 5B:
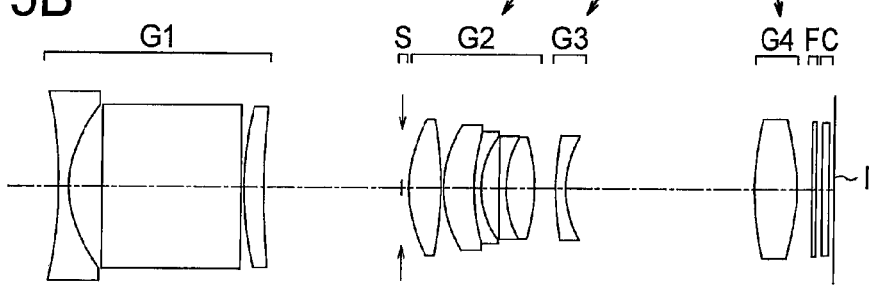
Figure 5C:
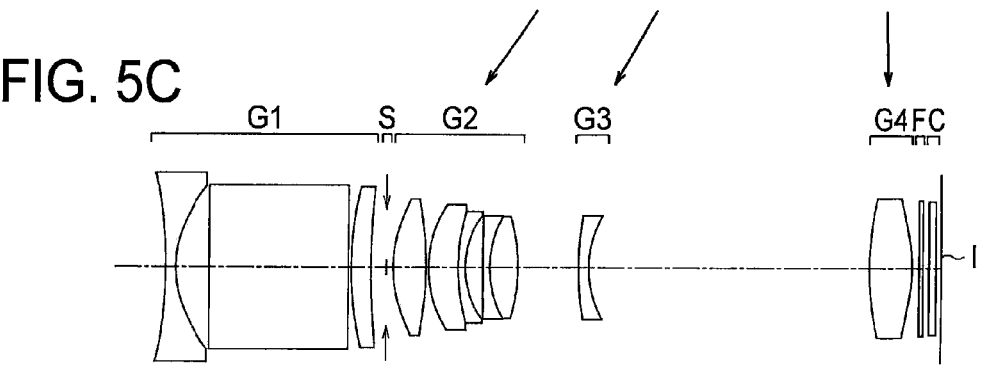

As shown in FIGS. 5A, 5B, and 5C, the zoom lens according to the fifth embodiment includes, in order from the object side, a first lens unit G1 having a negative refractive power, an aperture stop S, a second lens unit G2 having a positive refractive power, a third lens unit G3 having a negative refractive power, and a fourth lens unit G4 having a positive refractive power.

During zooming from the wide angle end to the telephoto end, the first lens unit G1 is fixed, the second lens unit G2 moves toward the object side, the third lens unit G3 moves toward the object side, and the fourth lens unit G4 moves toward the image side. The aperture stop S moves with the second lens unit G2. Focusing operation from an object point at long distance to an object point at short distance is performed by moving the third lens unit G3 toward the image side or by moving the fourth lens unit G4 toward the object side.

The first lens unit G1 is composed of a biconcave negative lens, a prism, and a positive meniscus lens having a convex surface directed toward the object side. The second lens unit G2 is composed of a biconvex positive lens, a cemented lens made up of a positive meniscus lens having a convex surface directed toward the object side and a negative meniscus lens having a convex surface directed toward the object side, and a cemented lens made up of a negative meniscus lens having a convex surface directed toward the object side and a biconvex positive lens. The third lens unit G3 is composed of a negative meniscus lens having a convex surface directed toward the object side. The fourth lens unit G4 is composed of a biconvex positive lens. The lens elements in each lens unit are arranged in the mentioned order from the object side.

There are six aspheric surfaces, which include both surfaces of the biconcave negative lens in the first lens unit G1, both surfaces of the object side biconvex positive lens in the second lens unit G2, the image side surface of the negative meniscus lens in the third lens unit G3, and the image side surface of the biconvex positive lens in the fourth lens unit G4.

Figure 6A:
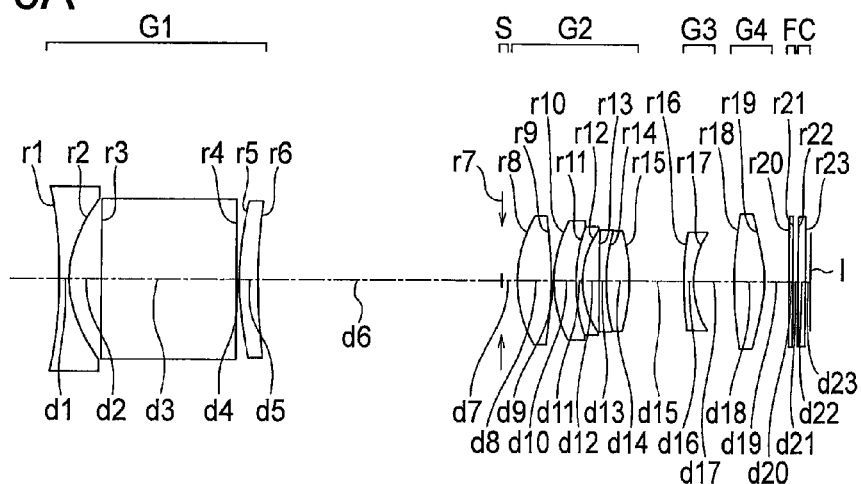
FIGS. 6A, 6B, and 6C are cross sectional views taken along the optical axis, showing the construction of a zoom lens with a bent optical path according to a sixth embodiment of the present invention in the state in which the zoom lens is focused on an object point at infinity, where
Figure 6B:
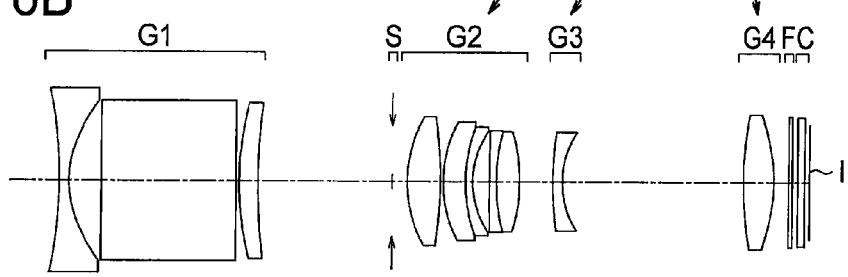
Figure 6C:
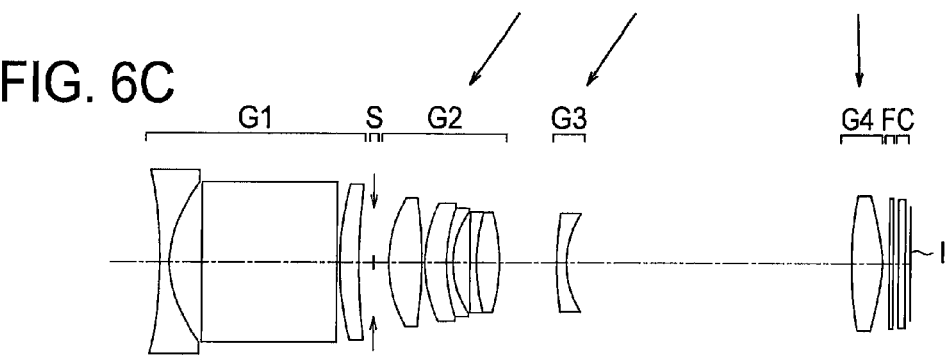

As shown in FIGS. 6A, 6B, and 6C, the zoom lens according to the sixth embodiment includes, in order from the object side, a first lens unit G1 having a negative refractive power, an aperture stop S, a second lens unit G2 having a positive refractive power, a third lens unit G3 having a negative refractive power, and a fourth lens unit G4 having a positive refractive power.

During zooming from the wide angle end to the telephoto end, the first lens unit G1 is fixed, the second lens unit G2 moves toward the object side, the third lens unit G3 moves toward the object side, and the fourth lens unit G4 moves toward the image side. The aperture stop S moves with the second lens unit G2. Focusing operation from an object point at long distance to an object point at short distance is performed by moving the third lens unit G3 toward the image side or by moving the fourth lens unit G4 toward the object side.

The first lens unit G1 is composed of a biconcave negative lens, a prism, and a positive meniscus lens having a convex surface directed toward the object side. The second lens unit G2 is composed of a biconvex positive lens, a cemented lens made up of a positive meniscus lens having a convex surface directed toward the object side and a negative meniscus lens having a convex surface directed toward the object side, and a cemented lens made up of a negative meniscus lens having a convex surface directed toward the object side and a biconvex positive lens. The third lens unit G3 is composed of a negative meniscus lens having a convex surface directed toward the object side. The fourth lens unit G4 is composed of a biconvex positive lens. The lens elements in each lens unit are arranged in the mentioned order from the object side.

There are six aspheric surfaces, which include both surfaces of the biconcave negative lens in the first lens unit G1, both surfaces of the object side biconvex positive lens in the second lens unit G2, the image side surface of the negative meniscus lens in the third lens unit G3, and the image side surface of the biconvex positive lens in the fourth lens unit G4.

Figure 7A:
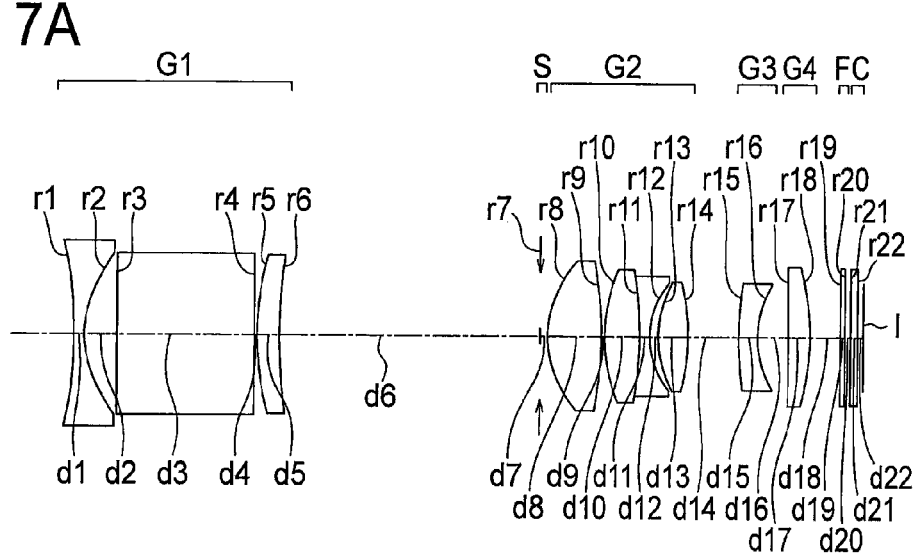
FIGS. 7A, 7B, and 7C are cross sectional views taken along the optical axis, showing the construction of a zoom lens with a bent optical path according to a seventh embodiment of the present invention in the state in which the zoom lens is focused on an object point at infinity, where
Figure 7B:
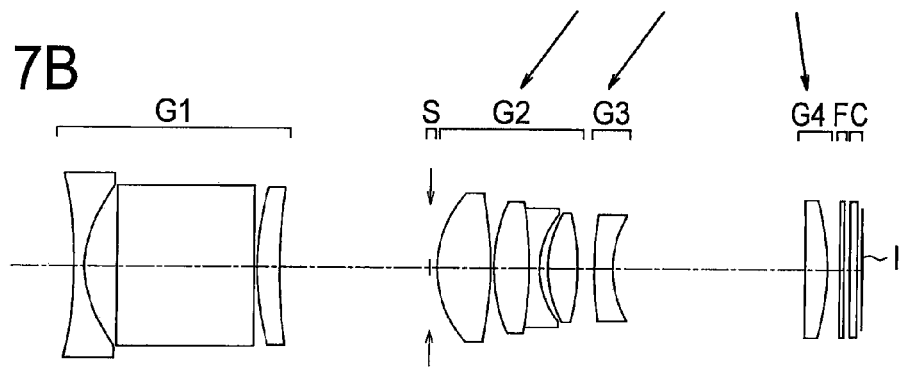
Figure 7C:
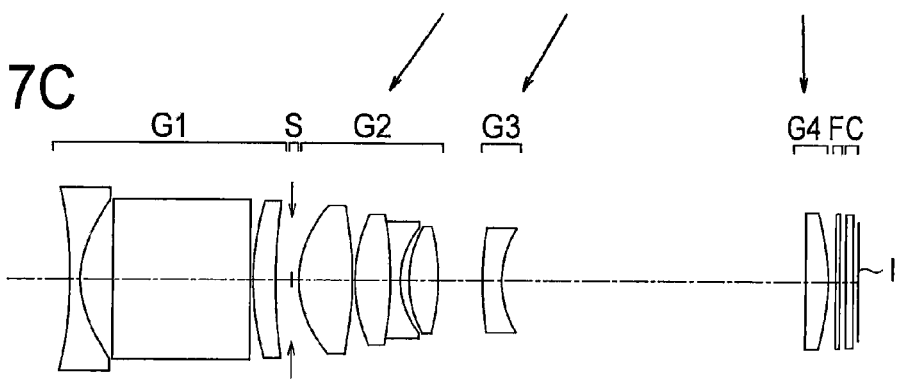

As shown in FIGS. 7A, 7B, and 7C, the zoom lens according to the seventh embodiment includes, in order from the object side, a first lens unit G1 having a negative refractive power, an aperture stop S, a second lens unit G2 having a positive refractive power, a third lens unit G3 having a negative refractive power, and a fourth lens unit G4 having a positive refractive power.

During zooming from the wide angle end to the telephoto end, the first lens unit G1 is fixed, the second lens unit G2 moves toward the object side, the third lens unit G3 moves toward the object side, and the fourth lens unit G4 moves toward the image side. The aperture stop S moves with the second lens unit G2. Focusing operation from an object point at long distance to an object point at short distance is performed by moving the third lens unit G3 toward the image side or by moving the fourth lens unit G4 toward the object side.

The first lens unit G1 is composed of a biconcave negative lens, a prism, and a positive meniscus lens having a convex surface directed toward the object side. The second lens unit G2 is composed of a biconvex positive lens, a cemented lens made up of a biconvex positive lens and a biconcave negative lens, and a biconvex positive lens. The third lens unit G3 is composed of a negative meniscus lens having a convex surface directed toward the object side. The fourth lens unit G4 is composed of a positive meniscus lens having a convex surface directed toward the image side. The lens elements in each lens unit are arranged in the mentioned order from the object side.

There are six aspheric surfaces, which include both surfaces of the biconcave negative lens in the first lens unit G1, the image side surface of the positive meniscus lens in the first lens unit G1, both surfaces of the object side biconvex positive lens in the second lens unit G2, and the image side surface of the positive meniscus lens in the fourth lens unit G4.

Figure 8A:
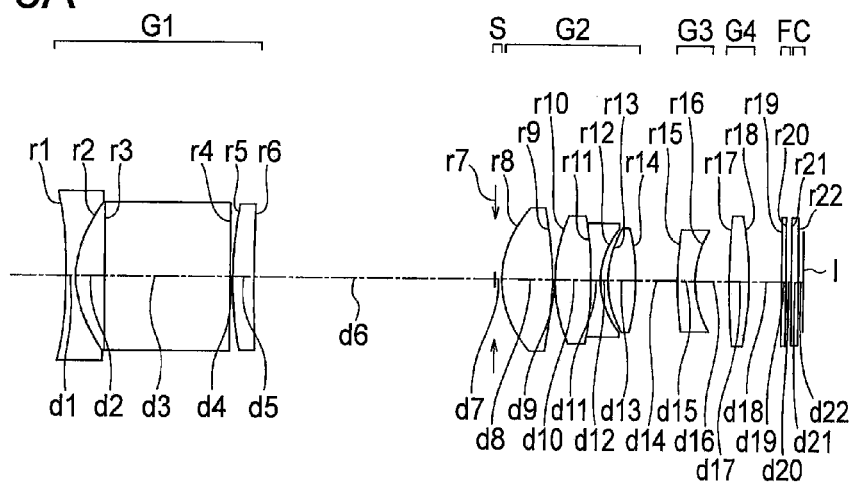
FIGS. 8A, 8B, and 8C are cross sectional views taken along the optical axis, showing the construction of a zoom lens with a bent optical path according to a eighth embodiment of the present invention in the state in which the zoom lens is focused on an object point at infinity, where
Figure 8B:
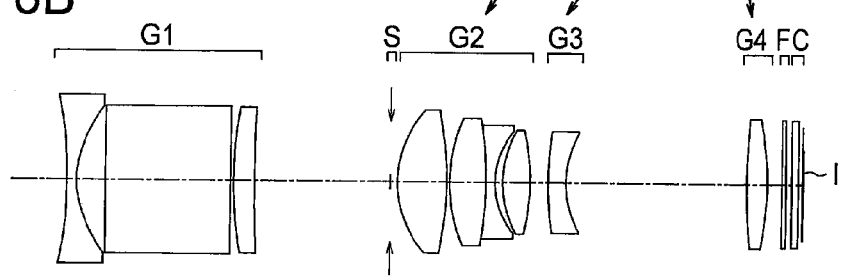
Figure 8C:
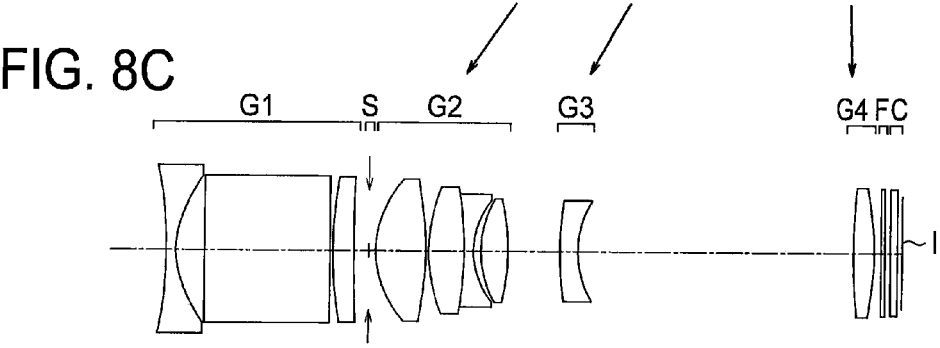

As shown in FIGS. 8A, 8B, and 8C, the zoom lens according to the eighth embodiment includes, in order from the object side, a first lens unit G1 having a negative refractive power, an aperture stop S, a second lens unit G2 having a positive refractive power, a third lens unit G3 having a negative refractive power, and a fourth lens unit G4 having a positive refractive power.

During zooming from the wide angle end to the telephoto end, the first lens unit G1 is fixed, the second lens unit G2 moves toward the object side, the third lens unit G3 moves toward the object side, and the fourth lens unit G4 moves toward the image side. The aperture stop S moves with the second lens unit G2. Focusing operation from an object point at long distance to an object point at short distance is performed by moving the third lens unit G3 toward the image side or by moving the fourth lens unit G4 toward the object side.

The first lens unit G1 is composed of a biconcave negative lens, a prism, and a positive meniscus lens having a convex surface directed toward the object side. The second lens unit G2 is composed of a biconvex positive lens, a cemented lens made up of a biconvex positive lens and a biconcave negative lens, and a biconvex positive lens. The third lens unit G3 is composed of a negative meniscus lens having a convex surface directed toward the object side. The fourth lens unit G4 is composed of a biconvex positive lens. The lens elements in each lens unit are arranged in the mentioned order from the object side.

There are six aspheric surfaces, which include both surfaces of the biconcave negative lens in the first lens unit G1, the image side surface of the positive meniscus lens in the first lens unit G1, both surfaces of the object side biconvex positive lens in the second lens unit G2, and the image side surface of the biconvex positive lens in the fourth lens unit G4.

Figure 9A:
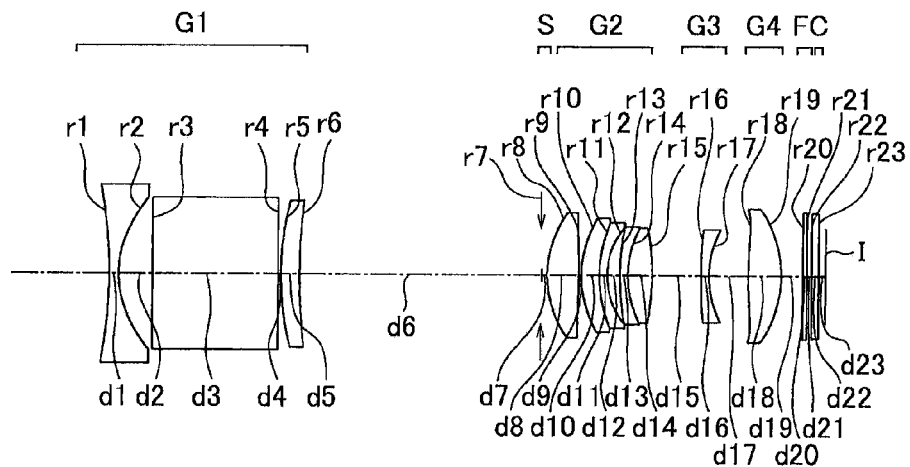
FIGS. 9A, 9B, and 9C are cross sectional views taken along the optical axis, showing the construction of a zoom lens with a bent optical path according to a ninth embodiment of the present invention in the state in which the zoom lens is focused on an object point at infinity, where
Figure 9B:
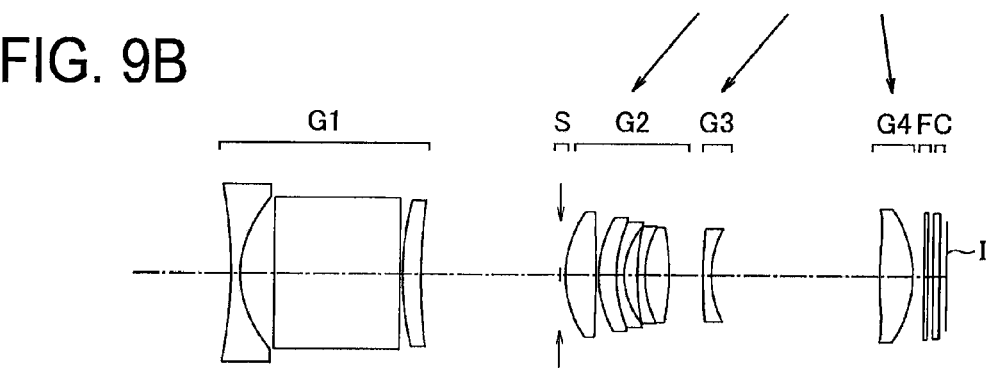
Figure 9C:
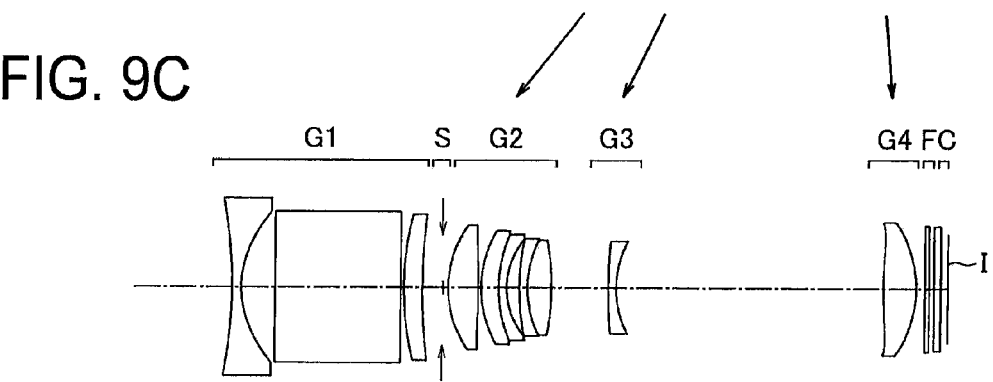

As shown in FIGS. 9A, 9B, and 9C, the zoom lens according to the ninth embodiment includes, in order from the object side, a first lens unit G1 having a negative refractive power, a second lens unit G2 having a positive refractive power, a third lens unit G3 having a negative refractive power, and a fourth lens unit G4 having a positive refractive power. The zoom lens also includes an aperture stop S disposed just in front of the second lens unit G2.

During zooming from the wide angle end to the telephoto end, the first lens unit G1 is fixed, the second lens unit G2 moves toward the object side, the third lens unit G3 moves toward the object side, and the fourth lens unit G4 moves toward the image side. The aperture stop S moves with the second lens unit G2. Focusing operation from an object point at long distance to an object point at short distance is performed by moving the third lens unit G3 toward the image side or by moving the fourth lens unit G4 toward the object side.

The first lens unit G1 is composed of a biconcave negative lens, a prism, and a positive meniscus lens having a convex surface directed toward the object side. The second lens unit G2 is composed of a biconvex positive lens, a cemented lens made up of a positive meniscus lens having a convex surface directed toward the object side and a negative meniscus lens having a convex surface directed toward the object side, and a cemented lens made up of a negative meniscus lens having a convex surface directed toward the object side and a biconvex positive lens. The third lens unit G3 is composed of a negative meniscus lens having a convex surface directed toward the object side. The fourth lens unit G4 is composed of a biconvex positive lens. The lens elements in each lens unit are arranged in the mentioned order from the object side.

There are eight aspheric surfaces, which include both surfaces of the biconcave negative lens in the first lens unit G1, both surfaces of the object side biconvex positive lens in the second lens unit G2, both surfaces of the negative meniscus lens in the third lens unit G3, and both surfaces of the biconvex positive lens in the fourth lens unit G4.

Figure 10A:
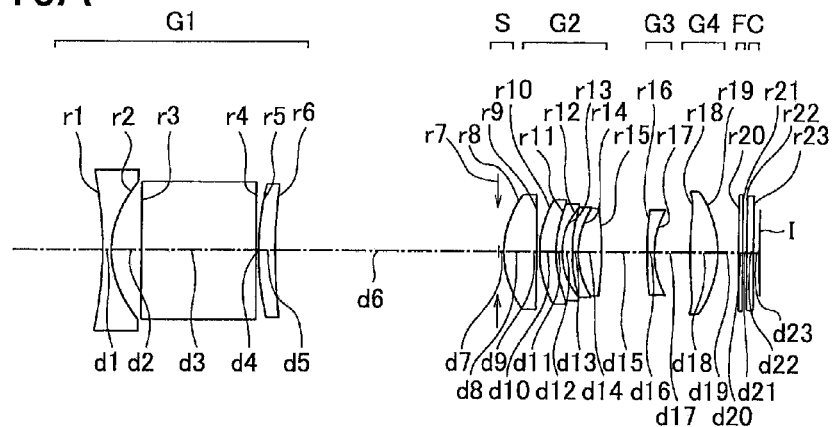
FIGS. 10A, 10B, and 10C are cross sectional views taken along the optical axis, showing the construction of a zoom lens with a bent optical path according to a tenth embodiment of the present invention in the state in which the zoom lens is focused on an object point at infinity, where
Figure 10B:
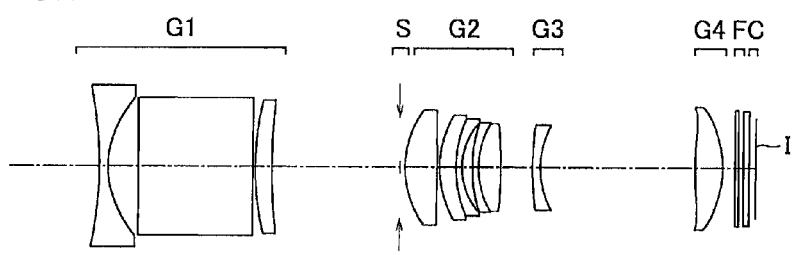
Figure 10C:
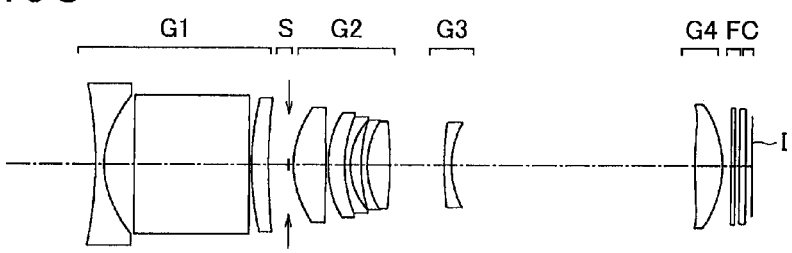

As shown in FIGS. 10A, 10B, and 10C, the zoom lens according to the tenth embodiment includes, in order from the object side, a first lens unit G1 having a negative refractive power, a second lens unit G2 having a positive refractive power, a third lens unit G3 having a negative refractive power, and a fourth lens unit G4 having a positive refractive power. The zoom lens also includes an aperture stop S disposed just in front of the second lens unit G2.

During zooming from the wide angle end to the telephoto end, the first lens unit G1 is fixed, the second lens unit G2 moves toward the object side, the third lens unit G3 moves toward the object side, and the fourth lens unit G4 moves toward the image side. The aperture stop S moves with the second lens unit G2. Focusing operation from an object point at long distance to an object point at short distance is performed by moving the third lens unit G3 toward the image side or by moving the fourth lens unit G4 toward the object side.

The first lens unit G1 is composed of a biconcave negative lens, a prism, and a positive meniscus lens having a convex surface directed toward the object side. The second lens unit G2 is composed of a biconvex positive lens, a cemented lens made up of a positive meniscus lens having a convex surface directed toward the object side and a negative meniscus lens having a convex surface directed toward the object side, and a cemented lens made up of a negative meniscus lens having a convex surface directed toward the object side and a biconvex positive lens. The third lens unit G3 is composed of a negative meniscus lens having a convex surface directed toward the object side. The fourth lens unit G4 is composed of a biconvex positive lens. The lens elements in each lens unit are arranged in the mentioned order from the object side.

There are eight aspheric surfaces, which include both surfaces of the biconcave negative lens in the first lens unit G1, both surfaces of the object side biconvex positive lens in the second lens unit G2, both surfaces of the negative meniscus lens in the third lens unit G3, and both surfaces of the biconvex positive lens in the fourth lens unit G4.

Numerical data of each embodiment described above is shown below. Apart from symbols described above, BF denotes a back focus, f1, f2, . . . denotes a focal length of each lens unit, FNO denotes an F number, ω denotes a half image angle, WE denotes a wide angle end, ST denotes an intermediate state in which the third lens unit moves to be closest to the second lens unit in the course of zooming, TE denotes a telephoto end, r denotes radius of curvature of each lens surface, d denotes a distance between two lenses, nd denotes a refractive index of each lens for a d-line, and νd denotes an Abbe's number for each lens. The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

A shape of the aspheric surface is described by the following expression (I) using each aspherical surface coefficient in each embodiment, when Z is let to be a coordinate point on an optical axis, and Y is let to be a coordinate point on a direction orthogonal to the optical axis, $$Z=(Y^2/r)/[1+\{1-(K+1)(Y/r)^2\}^{1/2}]+A_4Y^4+A_6Y^6+A_8Y^8+A_{10}Y^{10}+A_{12}Y^{12} \quad (I)$$

where, r denotes a paraxial radius of curvature, K denotes a conical coefficient, $A_4, A_6, A_8, A_{10}$, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

EXAMPLE 1

Unit mm

Surface data

| Surface no. | r | d | nd | vd |
|---|---|---|---|---|
| Object plane | ∞ | ∞ | | |
| 1* | −43.526 | 0.70 | 1.80610 | 40.92 |
| 2* | 7.498 | 2.23 | | |
| 3 | ∞ | 9.80 | 1.83481 | 42.71 |
| 4 | ∞ | 0.20 | | |
| 5 | 27.031 | 1.45 | 1.92286 | 18.90 |
| 6 | 81.054 | Variable | | |
| 7(stop) | ∞ | 0.50 | | |
| 8* | 9.321 | 3.50 | 1.74320 | 49.34 |
| 9* | −98.055 | 0.20 | | |
| 10 | 9.334 | 2.22 | 1.48749 | 70.23 |
| 11 | 46.784 | 0.50 | 1.80518 | 25.42 |
| 12 | 6.043 | 0.84 | | |
| 13 | 14.563 | 1.46 | 1.49700 | 81.54 |
| 14 | −23.024 | Variable | | |
| 15 | 22.137 | 0.70 | 1.51633 | 64.14 |
| 16 | 7.708 | Variable | | |
| 17 | 38.890 | 1.94 | 1.58313 | 59.38 |
| 18* | −8.453 | Variable | | |
| 19 | ∞ | 0.30 | 1.51633 | 64.14 |
| 20 | ∞ | 0.40 | | |
| 21 | ∞ | 0.50 | 1.51633 | 64.14 |
| 22 | ∞ | 0.37 | | |
| Image plane (Light receiving surface) | ∞ | | | |

Aspherical surface data

1st surface k = 0.000
A4 = −1.58944e−04, A6 = 3.91965e−06, A8 = −7.18057e−08,
A10 = 4.25832e−10

2nd surface k = −0.263
A4 = −4.46951e−04, A6 = 2.60829e−06, A8 = −9.25769e−08

8th surface k = −0.011
A4 = −6.45266e−05, A6 = 1.49707e−07, A8 = 9.85869e−09

9th surface k = 0.000
A4 = 1.48007e−04, A6 = 1.88272e−07, A8 = 2.47339e−08

18th surface k = 0.000
A4 = 2.04507e−03, A6 = −5.50760e−05, A8 = 7.16731e−07

Zoom data

| | WE | ST | TE |
|---|---|---|---|
| Focal length | 4.70 | 9.12 | 18.06 |
| Fno. | 2.05 | 3.24 | 4.80 |
| Angle of field 2ω | 82.78 | 48.40 | 24.86 |
| Image height | 3.60 | 4.16 | 4.16 |
| BF | 2.80 | 2.02 | 1.80 |
| Lens total length | 53.93 | 53.93 | 53.93 |
| d6 | 18.20 | 10.25 | 1.10 |
| d14 | 3.95 | 1.21 | 3.45 |
| d16 | 2.78 | 14.18 | 21.33 |
| d18 | 1.47 | 0.74 | 0.50 |

Unit focal length

| f1 = −12.20 | f2 = 12.01 | f3 = −23.29 | f4 = 12.09 |
|---|---|---|---|

EXAMPLE 2

Unit mm

Surface data

| Surface no. | r | d | nd | vd |
|---|---|---|---|---|
| Object plane | ∞ | ∞ | | |
| 1* | −54.294 | 0.70 | 1.74320 | 49.34 |
| 2* | 6.845 | 2.61 | | |
| 3 | ∞ | 9.80 | 1.83481 | 42.71 |
| 4 | ∞ | 0.20 | | |
| 5 | 22.599 | 1.43 | 1.92286 | 18.90 |
| 6 | 45.973 | Variable | | |
| 7(stop) | ∞ | 0.50 | | |
| 8* | 8.871 | 2.98 | 1.58313 | 59.38 |
| 9* | −23.063 | 0.20 | | |
| 10 | 8.797 | 2.16 | 1.51633 | 64.14 |
| 11 | 17.916 | 0.50 | 1.84666 | 23.78 |
| 12 | 6.177 | 1.19 | | |
| 13 | −787.254 | 1.37 | 1.49700 | 81.54 |
| 14 | −11.469 | Variable | | |
| 15 | 24.000 | 0.70 | 1.51633 | 64.14 |
| 16* | 7.134 | Variable | | |
| 17* | 28.124 | 2.82 | 1.58313 | 59.38 |
| 18* | −9.074 | Variable | | |
| 19 | ∞ | 0.30 | 1.51633 | 64.14 |
| 20 | ∞ | 0.40 | | |
| 21 | ∞ | 0.50 | 1.51633 | 64.14 |
| 22 | ∞ | 0.37 | | |
| Image plane (Light receiving surface) | ∞ | | | |

Aspherical surface data

1st surface k = 0.000
A4 = −1.02651e−04, A6 = 2.83302e−06, A8 = −4.57126e−08,
A10 = 2.94908e−10

2nd surface k = −0.394
A4 = −3.64706e−04, A6 = 5.39670e−07, A8 = −4.12932e−08

8th surface k = −0.279
A4 = −8.84624e−05, A6 = 3.94663e−07

9th surface k = 0.000
A4 = 2.79476e−04, A6 = −1.38828e−06, A8 = 1.48287e−08

16th surface k = 0.000
A4 = −1.22727e−04, A6 = 8.94531e−06, A8 = −5.91601e−07

17th surface k = 0.000
A4 = −3.46583e−04, A6 = −2.54819e−06, A8 = 4.74526e−07

18th surface k = 0.000
A4 = 1.00000e−03, A6 = −3.17235e−05, A8 = 9.68103e−07

Zoom data

| | WE | ST | TE |
|---|---|---|---|
| Focal length | 4.51 | 8.74 | 17.29 |
| Fno. | 2.05 | 3.26 | 4.81 |
| Angle of field 2ω | 83.85 | 49.99 | 25.92 |
| Image height | 3.60 | 4.16 | 4.16 |
| BF | 3.03 | 2.03 | 1.82 |
| Lens total length | 53.95 | 53.95 | 53.95 |
| d6 | 18.10 | 10.33 | 1.10 |
| d14 | 3.20 | 1.19 | 2.84 |

-continued

Unit mm

| | | | |
|---|---|---|---|
| d16 | 2.46 | 13.22 | 21.03 |
| d18 | 1.71 | 0.73 | 0.50 |

Unit focal length

| | | | |
|---|---|---|---|
| f1 = −12.23 | f2 = 11.63 | f3 = −19.94 | f4 = 12.10 |

EXAMPLE 3

Unit mm

Surface data

| Surface no. | r | d | nd | vd |
|---|---|---|---|---|
| Object plane | ∞ | ∞ | | |
| 1* | −35.285 | 0.70 | 1.74320 | 49.34 |
| 2* | 7.275 | 2.39 | | |
| 3 | ∞ | 9.80 | 1.83481 | 42.71 |
| 4 | ∞ | 0.20 | | |
| 5 | 23.911 | 1.44 | 1.92286 | 18.90 |
| 6 | 50.026 | Variable | | |
| 7(stop) | ∞ | 0.50 | | |
| 8* | 9.335 | 2.30 | 1.58313 | 59.38 |
| 9* | −21.315 | 0.20 | | |
| 10 | 8.440 | 2.12 | 1.51633 | 64.14 |
| 11 | 14.959 | 0.50 | 1.84666 | 23.78 |
| 12 | 6.220 | 1.26 | | |
| 13 | 435.767 | 0.51 | 1.61772 | 49.81 |
| 14 | 10.646 | 2.10 | 1.51633 | 64.14 |
| 15 | −13.062 | Variable | | |
| 16 | 22.013 | 0.70 | 1.51633 | 64.14 |
| 17* | 7.384 | Variable | | |
| 18 | 23.740 | 2.70 | 1.58313 | 59.38 |
| 19* | −10.127 | Variable | | |
| 20 | ∞ | 0.30 | 1.51633 | 64.14 |
| 21 | ∞ | 0.40 | | |
| 22 | ∞ | 0.50 | 1.51633 | 64.14 |
| 23 | ∞ | 0.53 | | |
| Image plane (Light receiving surface) | ∞ | | | |

Aspherical surface data

1st surface k = 0.000
A4 = −3.17786e−05, A6 = −3.30929e−07, A8 = 1.23452e−08,
A10 = −1.72009e−10
2nd surface k = −0.465
A4 = −2.96348e−04, A6 = −4.41306e−07, A8 = −2.63099e−08
8th surface k = −0.725
A4 = −2.99334e−05, A6 = −1.72903e−07
9th surface k = 0.000
A4 = 2.15653e−04, A6 = −1.96806e−06, A8 = 1.36225e−08
17th surface k = 0.000
A4 = −6.32012e−05, A6 = 3.53360e−07, A8 = 2.05889e−09
19th surface k = 0.000
A4 = 1.48095e−03, A6 = −3.95167e−05, A8 = 5.24751e−07

-continued

Unit mm

Zoom data

| | WE | ST | TE |
|---|---|---|---|
| Focal length | 4.64 | 9.01 | 17.82 |
| Fno. | 2.04 | 3.19 | 4.72 |
| Angle of field 2ω | 83.54 | 48.50 | 25.10 |
| Image height | 3.60 | 4.16 | 4.16 |
| BF | 3.29 | 2.48 | 1.98 |
| Lens total length | 54.60 | 54.60 | 54.60 |
| d6 | 18.06 | 9.84 | 1.09 |
| d15 | 3.28 | 1.52 | 4.36 |
| d17 | 2.56 | 13.31 | 19.78 |
| d19 | 1.80 | 1.04 | 0.49 |

Unit focal length

| | | | |
|---|---|---|---|
| f1 = −11.82 | f2 = 12.17 | f3 = −21.87 | f4 = 12.54 |

EXAMPLE 4

Unit mm

Surface data

| Surface no. | r | d | nd | vd |
|---|---|---|---|---|
| Object plane | ∞ | ∞ | | |
| 1* | −33.843 | 0.70 | 1.74320 | 49.34 |
| 2* | 7.644 | 2.33 | | |
| 3 | ∞ | 9.90 | 1.83481 | 42.71 |
| 4 | ∞ | 0.20 | | |
| 5 | 24.510 | 1.40 | 1.92286 | 18.90 |
| 6 | 51.949 | Variable | | |
| 7(stop) | ∞ | 1.10 | | |
| 8* | 8.754 | 2.45 | 1.58313 | 59.38 |
| 9* | −28.998 | 0.20 | | |
| 10 | 9.476 | 1.52 | 1.51633 | 64.14 |
| 11 | 11.791 | 0.50 | 1.84666 | 23.78 |
| 12 | 6.561 | 1.24 | | |
| 13 | 55.251 | 0.50 | 1.69895 | 30.13 |
| 14 | 13.166 | 1.72 | 1.58313 | 59.38 |
| 15* | −15.732 | Variable | | |
| 16 | 27.444 | 0.50 | 1.51633 | 64.14 |
| 17* | 6.814 | Variable | | |
| 18 | 25.778 | 2.49 | 1.58313 | 59.38 |
| 19* | −9.413 | Variable | | |
| 20 | ∞ | 0.30 | 1.51633 | 64.14 |
| 21 | ∞ | 0.40 | | |
| 22 | ∞ | 0.50 | 1.51633 | 64.14 |
| 23 | ∞ | 0.39 | | |
| Image plane (Light receiving surface) | ∞ | | | |

Aspherical surface data

1st surface k = 0.000
A4 = −2.91111e−05, A6 = 9.83567e−08, A8 = −8.64103e−10,
A10 = −3.48452e−12
2nd surface k = −0.580
A4 = −2.16660e−04, A6 = −1.39940e−07, A8 = −4.79094e−09
8th surface k = −0.463
A4 = −5.44461e−05, A6 = 2.29575e−07, A8 = 4.47084e−10
9th surface k = 0.000
A4 = 2.24075e−04, A6 = −1.40874e−06, A8 = 8.48251e−09

-continued

Unit mm

15th surface k = 0.000
A4 = 4.61499e−06, A6 = −5.50121e−08, A8 = 5.82837e−09
17th surface k = 0.000
A4 = −1.13376e−04, A6 = 4.51512e−07, A8 = 3.26203e−08
19th surface k = 0.000
A4 = 1.65047e−03, A6 = −4.18933e−05, A8 = 5.27429e−07

Zoom data

|  | WE | ST | TE |
|---|---|---|---|
| Focal length | 4.69 | 9.11 | 18.02 |
| Fno. | 2.04 | 3.22 | 4.77 |
| Angle of field 2ω | 83.12 | 47.93 | 24.90 |
| Image height | 3.60 | 4.16 | 4.16 |
| BF | 3.16 | 2.39 | 1.83 |
| Lens total length | 55.00 | 55.00 | 55.00 |
| d6 | 18.14 | 9.98 | 1.10 |
| d15 | 4.15 | 2.59 | 4.42 |
| d17 | 2.83 | 13.28 | 20.91 |
| d19 | 1.81 | 1.07 | 0.50 |

Unit focal length

| f1 = −12.25 | f2 = 11.77 | f3 = −17.70 | f4 = 12.14 |
|---|---|---|---|

EXAMPLE 5

Unit mm

Surface data

| Surface no. | r | d | nd | νd |
|---|---|---|---|---|
| Object plane | ∞ | ∞ | | |
| 1* | −34.510 | 0.70 | 1.74320 | 49.34 |
| 2* | 7.237 | 2.39 | | |
| 3 | ∞ | 9.80 | 1.83481 | 42.71 |
| 4 | ∞ | 0.20 | | |
| 5 | 24.395 | 1.42 | 1.92286 | 18.90 |
| 6 | 53.426 | Variable | | |
| 7(stop) | ∞ | 0.50 | | |
| 8* | 9.381 | 2.31 | 1.58313 | 59.38 |
| 9* | −21.518 | 0.20 | | |
| 10 | 8.407 | 2.12 | 1.51633 | 64.14 |
| 11 | 14.279 | 0.50 | 1.84666 | 23.78 |
| 12 | 6.264 | 1.25 | | |
| 13 | 467.915 | 0.50 | 1.58313 | 59.38 |
| 14 | 7.691 | 2.00 | 1.49700 | 81.54 |
| 15 | −12.607 | Variable | | |
| 16 | 21.992 | 0.70 | 1.51633 | 64.14 |
| 17* | 7.383 | Variable | | |
| 18 | 21.746 | 3.02 | 1.58313 | 59.38 |
| 19* | −10.431 | Variable | | |
| 20 | ∞ | 0.30 | 1.51633 | 64.14 |
| 21 | ∞ | 0.40 | | |
| 22 | ∞ | 0.50 | 1.51633 | 64.14 |
| 23 | ∞ | 0.37 | | |
| Image plane (Light receiving surface) | ∞ | | | |

Aspherical surface data

1st surface k = 0.000
A4 = −3.04381e−05, A6 = 1.69477e−07, A8 = −3.87833e−09,

-continued

Unit mm

A10 = −1.36632e−11
2nd surface k = −0.492
A4 = −2.91981e−04, A6 = 7.67946e−08, A8 = −3.49219e−08
8th surface k = −0.344
A4 = −9.23458e−5, A6 = 1.87782e−07
9th surface k = 0.000
A4 = 2.09424e−04, A6 = −1.23347e−06, A8 = 1.33931e−08
17th surface k = 0.000
A4 = −7.90656e−05, A6 = 2.39362e−06, A8 = −2.08011e−07
19th surface k = 0.000
A4 = 1.40524e−03, A6 = −3.31802e−05, A8 = 3.67016e−07

Zoom data

|  | WE | ST | TE |
|---|---|---|---|
| Focal length | 4.66 | 9.03 | 17.84 |
| Fno. | 2.04 | 3.20 | 4.74 |
| Angle of field 2ω | 83.26 | 48.52 | 25.15 |
| Image height | 3.60 | 4.16 | 4.16 |
| BF | 3.15 | 2.35 | 1.82 |
| Lens total length | 54.65 | 54.65 | 54.65 |
| d6 | 18.05 | 9.83 | 1.10 |
| d15 | 3.25 | 1.49 | 4.31 |
| d17 | 2.60 | 13.34 | 19.81 |
| d19 | 1.82 | 1.05 | 0.50 |

Unit focal length

| f1 = −11.82 | f2 = 12.16 | f3 = −21.88 | f4 = 12.52 |
|---|---|---|---|

EXAMPLE 6

Unit mm

Surface data

| Surface no. | r | d | nd | νd |
|---|---|---|---|---|
| Object plane | ∞ | ∞ | | |
| 1* | −38.010 | 0.70 | 1.74320 | 49.34 |
| 2* | 7.423 | 2.39 | | |
| 3 | ∞ | 9.80 | 1.83481 | 42.71 |
| 4 | ∞ | 0.20 | | |
| 5 | 22.864 | 1.41 | 1.92286 | 18.90 |
| 6 | 44.118 | Variable | | |
| 7(stop) | ∞ | 1.10 | | |
| 8* | 9.115 | 2.45 | 1.58313 | 59.38 |
| 9* | −25.067 | 0.20 | | |
| 10 | 9.466 | 1.63 | 1.51633 | 64.14 |
| 11 | 11.964 | 0.50 | 1.84666 | 23.78 |
| 12 | 6.710 | 1.22 | | |
| 13 | 237.080 | 0.50 | 1.69895 | 30.13 |
| 14 | 14.487 | 1.68 | 1.58313 | 59.38 |
| 15 | −13.429 | Variable | | |
| 16 | 25.892 | 0.70 | 1.51633 | 64.14 |
| 17* | 6.706 | Variable | | |
| 18 | 28.059 | 2.25 | 1.58313 | 59.38 |
| 19* | −9.015 | Variable | | |
| 20 | ∞ | 0.30 | 1.51633 | 64.14 |
| 21 | ∞ | 0.40 | | |
| 22 | ∞ | 0.50 | 1.51633 | 64.14 |
| 23 | ∞ | 0.37 | | |

-continued

| Unit mm | | | | |
|---|---|---|---|---|
| Image plane (Light receiving surface) | ∞ | | | |

Aspherical surface data

1st surface k = 0.000
A4 = −4.85058e−05, A6 = 4.76992e−07, A8 = −1.07358e−08,
A10 = 4.32102e−11
2nd surface k = −0.452
A4 = −2.71303e−04, A6 = 2.00782e−08, A8 = −3.64745e−08
8th surface k = −0.324
A4 = −9.02599e−05, A6 = 7.82224e−07
9th surface k = 0.000
A4 = 2.39349e−04, A6 = −7.52152e−07, A8 = 1.06553e−08
17th surface k = 0.000
A4 = −1.10231e−04, A6 = 1.86508e−06, A8 = −1.89133e−07
19th surface k = 0.000
A4 = 1.70441e−03, A6 = −4.15019e−05, A8 = 5.05361e−07

Zoom data

| | WE | ST | TE |
|---|---|---|---|
| Focal length | 4.64 | 9.00 | 17.80 |
| Fno. | 2.05 | 3.22 | 4.86 |
| Angle of field 2ω | 83.55 | 48.44 | 25.20 |
| Image height | 3.60 | 4.16 | 4.16 |
| BF | 3.12 | 2.35 | 1.80 |
| Lens total length | 54.63 | 54.63 | 54.63 |
| d6 | 17.89 | 9.91 | 1.10 |
| d15 | 3.99 | 2.40 | 4.21 |
| d17 | 2.93 | 13.24 | 20.79 |
| d19 | 1.79 | 1.05 | 0.50 |

Unit focal length

| f1 = −12.06 | f2 = 11.69 | f3 = −17.75 | f4 = 11.97 |
|---|---|---|---|

EXAMPLE 7

Unit mm

Surface data

| Surface no. | r | d | nd | vd |
|---|---|---|---|---|
| Object plane | ∞ | ∞ | | |
| 1* | −43.195 | 0.71 | 1.74320 | 49.34 |
| 2* | 6.532 | 2.26 | | |
| 3 | ∞ | 9.40 | 1.83481 | 42.71 |
| 4 | ∞ | 0.20 | | |
| 5 | 19.618 | 1.58 | 1.92286 | 20.88 |
| 6* | 40.454 | Variable | | |
| 7(stop) | ∞ | 0.50 | | |
| 8* | 7.100 | 3.70 | 1.49700 | 81.61 |
| 9* | −19.738 | 0.20 | | |
| 10 | 11.344 | 2.42 | 1.51633 | 64.14 |
| 11 | −26.489 | 0.70 | 1.88300 | 40.76 |
| 12 | 5.901 | 0.58 | | |
| 13 | 7.786 | 2.02 | 1.49700 | 81.61 |
| 14 | −15.169 | Variable | | |
| 15 | 25.467 | 1.30 | 1.51633 | 64.14 |
| 16 | 7.121 | Variable | | |
| 17 | −328.706 | 1.53 | 1.74320 | 49.34 |
| 18* | −12.674 | Variable | | |
| 19 | ∞ | 0.30 | 1.51633 | 64.14 |
| 20 | ∞ | 0.40 | | |
| 21 | ∞ | 0.50 | 1.51633 | 64.14 |
| 22 | ∞ | 0.37 | | |
| Image plane (Light receiving surface) | ∞ | | | |

Aspherical surface data

1st surface k = 0.000
A4 = −3.21889e−04, A6 = 9.77481e−06, A8 = −2.27194e−07,
A10 = 2.41713e−09
2nd surface k = 0.000
A4 = −9.39369e−04, A6 = 4.83003e−06, A8 = −3.13895e−07
6th surface k = 0.000
A4 = 1.51335e−05, A6 = 3.40697e−07
8th surface k = 0.000
A4 = −2.25534e−04, A6 = −2.31764e−06, A8 = −2.31822e−08
9th surface k = 0.000
A4 = 2.79817e−04, A6 = −2.89422e−06, A8 = 8.12041e−08
18th surface k = 0.000
A4 = 9.93323e−04, A6 = −2.81941e−05, A8 = 2.53008e−07

Zoom data

| | WE | ST | TE |
|---|---|---|---|
| Focal length | 4.93 | 9.58 | 19.26 |
| Fno. | 2.04 | 3.28 | 4.88 |
| Angle of field 2ω | 81.31 | 46.78 | 23.80 |
| Image height | 3.67 | 4.16 | 4.16 |
| BF | 3.37 | 2.08 | 1.79 |
| Lens total length | 53.94 | 53.94 | 53.94 |
| d6 | 17.91 | 10.36 | 1.10 |
| d14 | 3.51 | 1.12 | 3.07 |
| d16 | 2.10 | 13.25 | 20.89 |
| d18 | 2.06 | 0.82 | 0.50 |

Unit focal length

| f1 = −11.92 | f2 = 11.84 | f3 = −19.62 | f4 = 17.70 |
|---|---|---|---|

EXAMPLE 8

Unit mm

Surface data

| Surface no. | r | d | nd | vd |
|---|---|---|---|---|
| Object plane | ∞ | ∞ | | |
| 1* | −52.305 | 0.71 | 1.76802 | 49.24 |
| 2* | 6.467 | 2.16 | | |
| 3 | ∞ | 9.23 | 1.80100 | 34.97 |
| 4 | ∞ | 0.20 | | |
| 5 | 29.807 | 1.58 | 1.92286 | 20.88 |
| 6* | 132.862 | Variable | | |

-continued

Unit mm

| | | | | |
|---|---|---|---|---|
| 7(stop) | ∞ | 0.50 | | |
| 8* | 7.246 | 3.70 | 1.49700 | 81.61 |
| 9* | −19.668 | 0.20 | | |
| 10 | 11.750 | 2.67 | 1.51633 | 64.14 |
| 11 | −27.348 | 0.70 | 1.88300 | 40.76 |
| 12 | 5.959 | 0.55 | | |
| 13 | 7.727 | 2.00 | 1.49700 | 81.61 |
| 14 | −16.318 | Variable | | |
| 15 | 26.921 | 1.30 | 1.51633 | 64.14 |
| 16 | 7.261 | Variable | | |
| 17 | 47.587 | 1.53 | 1.74320 | 49.34 |
| 18* | −17.513 | Variable | | |
| 19 | ∞ | 0.30 | 1.51633 | 64.14 |
| 20 | ∞ | 0.40 | | |
| 21 | ∞ | 0.50 | 1.51633 | 64.14 |
| 22 | ∞ | 0.37 | | |
| Image plane (Light receiving surface) | ∞ | | | |

Aspherical surface data

1st surface k = 0.000
A4 = −3.77568e−04, A6 = 9.95170e−06, A8 = −2.18102e−07,
A10 = 2.52245e−09

2nd surface k = 0.000
A4 = −9.59409e−04, A6 = 1.72985e−06, A8 = −2.39562e−07

6th surface k = 0.000
A4 = −1.14666e−05, A6 = 3.16621e−07

8th surface k = 0.000
A4 = −2.23010e−04, A6 = −2.43373e−06, A8 = −1.92718e−08

9th surface k = 0.000
A4 = 2.56903e−04, A6 = −3.06037e−06, A8 = 7.76664e−08

18th surface k = 0.000
A4 = 6.61551e−04, A6 = −1.30525e−05

Zoom data

| | WE | ST | TE |
|---|---|---|---|
| Focal length | 4.94 | 9.64 | 19.34 |
| Fno. | 2.05 | 3.26 | 4.88 |
| Angle of field 2ω | 81.15 | 46.30 | 23.59 |
| Image height | 3.67 | 4.16 | 4.16 |
| BF | 3.70 | 2.31 | 1.77 |
| Lens total length | 54.11 | 54.11 | 54.11 |
| d6 | 17.85 | 10.06 | 1.10 |
| d14 | 3.10 | 1.32 | 3.88 |
| d16 | 2.49 | 13.37 | 20.34 |
| d18 | 2.39 | 1.07 | 0.50 |

Unit focal length

| f1 = −11.59 | f2 = 12.00 | f3 = −19.70 | f4 = 17.40 |
|---|---|---|---|

EXAMPLE 9

Unit mm

Surface data

| Surface no. | r | d | nd | νd |
|---|---|---|---|---|
| Object plane | ∞ | ∞ | | |
| 1* | −32.721 | 0.70 | 1.74320 | 49.34 |
| 2* | 7.357 | 2.60 | | |
| 3 | ∞ | 9.60 | 1.83400 | 37.18 |
| 4 | ∞ | 0.20 | | |
| 5 | 22.486 | 1.40 | 1.94595 | 17.94 |
| 6 | 42.781 | Variable | | |
| 7(stop) | ∞ | 0.40 | | |
| 8* | 7.883 | 2.36 | 1.58313 | 59.38 |
| 9* | −62.774 | 0.20 | | |
| 10 | 8.552 | 1.36 | 1.51633 | 64.14 |
| 11 | 10.233 | 0.60 | 1.84666 | 23.78 |
| 12 | 5.693 | 0.99 | | |
| 13 | 18.839 | 0.60 | 1.64769 | 33.79 |
| 14 | 7.921 | 1.84 | 1.58313 | 59.38 |
| 15 | −19.618 | Variable | | |
| 16* | 64.854 | 0.60 | 1.58313 | 59.38 |
| 17* | 8.067 | Variable | | |
| 18* | 27.277 | 2.52 | 1.53071 | 55.69 |
| 19* | −7.888 | Variable | | |
| 20 | ∞ | 0.30 | 1.51633 | 64.14 |
| 21 | ∞ | 0.40 | | |
| 22 | ∞ | 0.50 | 1.51633 | 64.14 |
| 23 | ∞ | 0.53 | | |
| Image plane (Light receiving surface) | ∞ | | | |

Aspherical surface data

1st surface

K = 0.000
A4 = 4.93489e−05, A6 = −1.29158e−07, A8 = −1.16334e−08,
A10 = 1.41556e−10

2nd surface

K = −0.473
A4 = −1.82450e−04, A6 = 1.42535e−06, A8 = −8.24347e−08,
A10 = 8.35344e−10

8th surface

K = −0.198
A4 = −1.03246e−04, A6 = 3.49289e−07, A8 = 6.10872e−09

9th surface

K = 0.000
A4 = 1.80453e−04, A6 = 1.17049e−07, A8 = 7.59420e−09

16th surface

K = 0.000
A4 = 7.72531e−04, A6 = −3.87260e−05, A8 = 8.88557e−07

17th surface

K = 0.000
A4 = 8.16286e−04, A6 = −4.32734e−05, A8 = 1.88065e−06,
A10 = −9.19886e−08

18th surface

K = 0.000
A4 = −5.96735e−04, A6 = 1.42792e−05, A8 = −8.01527e−07

19th surface

K = 0.000
A4 = 8.74596e−04, A6 = −9.08054e−06, A8 = −5.08363e−07,
A10 = 4.13678e−09

Zoom data

| | WE | ST | TE |
|---|---|---|---|
| Focal length | 4.59 | 8.91 | 17.63 |
| Fno. | 2.06 | 3.26 | 4.93 |
| Angle of field 2ω | 84.65 | 49.36 | 25.34 |
| Image height | 3.62 | 4.16 | 4.16 |
| BF | 3.16 | 2.35 | 2.19 |
| Lens total length | 54.55 | 54.55 | 54.55 |
| d6 | 18.66 | 10.75 | 1.60 |
| d15 | 3.75 | 2.55 | 4.40 |

-continued

Unit mm

| | | | |
|---|---|---|---|
| d17 | 3.00 | 12.91 | 20.39 |
| d19 | 1.68 | 0.89 | 0.71 |

Unit focal length

| | | | |
|---|---|---|---|
| f1 = −11.74 | f2 = 11.35 | f3 = −15.86 | f4 = 11.82 |

EXAMPLE 10

Unit mm

Surface data

| Surface no. | r | d | nd | vd |
|---|---|---|---|---|
| Object plane | ∞ | ∞ | | |
| 1* | −28.431 | 0.70 | 1.74156 | 49.21 |
| 2* | 7.498 | 2.52 | | |
| 3 | ∞ | 9.60 | 1.83400 | 37.18 |
| 4 | ∞ | 0.20 | | |
| 5 | 23.587 | 1.40 | 1.94595 | 17.94 |
| 6 | 48.810 | Variable | | |
| 7(stop) | ∞ | 0.44 | | |
| 8* | 7.803 | 2.70 | 1.58253 | 59.32 |
| 9* | −99.626 | 0.20 | | |
| 10 | 8.542 | 1.38 | 1.51633 | 64.14 |
| 11 | 10.200 | 0.50 | 1.84666 | 23.78 |
| 12 | 5.590 | 0.88 | | |
| 13 | 12.617 | 0.50 | 1.64769 | 33.79 |
| 14 | 6.926 | 1.90 | 1.58313 | 59.38 |
| 15 | −33.630 | Variable | | |
| 16* | 34.163 | 0.60 | 1.58253 | 59.32 |
| 17* | 7.376 | Variable | | |
| 18* | 27.500 | 2.32 | 1.53071 | 55.69 |
| 19* | −7.809 | Variable | | |
| 20 | ∞ | 0.30 | 1.51633 | 64.14 |
| 21 | ∞ | 0.40 | | |
| 22 | ∞ | 0.50 | 1.51633 | 64.14 |
| 23 | ∞ | 0.53 | | |
| Image plane (Light receiving surface) | ∞ | | | |

Aspherical surface data

1st surface

K = 0.000
A4 = 8.02335e−05, A6 = −1.22144e−06, A8 = 1.56276e−08,
A10 = −1.18185e−10

2nd surface

K = −0.381
A4 = −1.74640e−04, A6 = −1.56968e−06, A8 = 1.98476e−08,
A10 = −6.03739e−10

8th surface

K = −0.310
A4 = −6.99639e−05, A6 = 1.62806e−07, A8 = 1.23244e−08

9th surface

K = 0.000
A4 = 1.31566e−04, A6 = −1.80279e−08, A8 = 1.30000e−08

16th surface

K = 0.000
A4 = 2.46234e−04, A6 = −6.33452e−06, A8 = 3.86311e−07

17th surface

K = 0.000
A4 = 2.31935e−04, A6 = −4.77549e−06, A8 = −2.39171e−07,
A10 = 2.15321e−09

-continued

Unit mm

18th surface

K = 0.000
A4 = −6.23737e−04, A6 = 2.24258e−05, A8 = −1.07557e−06

19th surface

K = 0.000
A4 = 6.10677e−04, A6 = 2.86846e−05, A8 = −2.10458e−06,
A10 = 2.60906e−08

Zoom data

| | WE | ST | TE |
|---|---|---|---|
| Focal length | 4.58 | 8.90 | 17.67 |
| Fno. | 2.06 | 3.26 | 4.92 |
| Angle of field 2ω | 84.93 | 49.33 | 25.31 |
| Image height | 3.61 | 4.16 | 4.16 |
| BF | 3.27 | 2.49 | 2.22 |
| Lens total length | 54.61 | 54.61 | 54.61 |
| d6 | 18.72 | 10.71 | 1.66 |
| d15 | 3.82 | 2.61 | 4.60 |
| d17 | 2.99 | 12.94 | 20.29 |
| d19 | 1.79 | 1.06 | 0.77 |

Unit focal length

| | | | |
|---|---|---|---|
| f1 = −11.77 | f2 = 11.50 | f3 = −16.28 | f4 = 11.73 |

FIGS. 11A to 20L are aberrations diagrams of the zoom lenses according to the first to tenth embodiment respectively in the state in which they are focused on an object point at infinity. In these diagrams, "FIY" represents the largest image height.

FIGS. 11A to 11L are aberration diagrams of the zoom lens according to the first embodiment in the state in which the zoom lens is focused on an object point at infinity. FIGS. 11A, 11B, 11C, and 11D respectively show spherical aberration (SA), astigmatism (AS), distortion (DT), and chromatic aberration of magnification (CC) of the zoom lens at the wide angle end. FIGS. 11E, 11F, 11G, and 11H respectively show spherical aberration (SA), astigmatism (AS), distortion (DT), and chromatic aberration of magnification (CC) of the zoom lens in the intermediate focal length state. FIGS. 11I, 11J, 11K, and 11L respectively show spherical aberration (SA), astigmatism (AS), distortion (DT), and chromatic aberration of magnification (CC) of the zoom lens at the telephoto end.

FIGS. 12A to 12L are aberration diagrams of the zoom lens according to the second embodiment in the state in which the zoom lens is focused on an object point at infinity. FIGS. 12A, 12B, 12C, and 12D respectively show spherical aberration (SA), astigmatism (AS), distortion (DT), and chromatic aberration of magnification (CC) of the zoom lens at the wide angle end. FIGS. 12E, 12F, 12G, and 12H respectively show spherical aberration (SA), astigmatism (AS), distortion (DT), and chromatic aberration of magnification (CC) of the zoom lens in the intermediate focal length state. FIGS. 12I, 12J, 12K, and 12L respectively show spherical aberration (SA), astigmatism (AS), distortion (DT), and chromatic aberration of magnification (CC) of the zoom lens at the telephoto end.

FIGS. 13A to 13L are aberration diagrams of the zoom lens according to the third embodiment in the state in which the zoom lens is focused on an object point at infinity. FIGS. 13A, 13B, 13C, and 13D respectively show spherical aberration (SA), astigmatism (AS), distortion (DT), and chromatic aberration of magnification (CC) of the zoom lens at the wide angle end. FIGS. 13E, 13F, 13G, and 13H respectively show spherical aberration (SA), astigmatism (AS), distortion (DT), and chromatic aberration of magnification (CC) of the zoom lens in the intermediate focal length state. FIGS. 13I, 13J, 13K, and 13L respectively show spherical aberration (SA), astigmatism (AS), distortion (DT), and chromatic aberration of magnification (CC) of the zoom lens at the telephoto end.

FIGS. 14A to 14L are aberration diagrams of the zoom lens according to the fourth embodiment in the state in which the zoom lens is focused on an object point at infinity. FIGS. 14A, 14B, 14C, and 14D respectively show spherical aberration (SA), astigmatism (AS), distortion (DT), and chromatic aberration of magnification (CC) of the zoom lens at the wide angle end. FIGS. 14E, 14F, 14G, and 14H respectively show spherical aberration (SA), astigmatism (AS), distortion (DT), and chromatic aberration of magnification (CC) of the zoom lens in the intermediate focal length state. FIGS. 14I, 14J, 14K, and 14L respectively show spherical aberration (SA), astigmatism (AS), distortion (DT), and chromatic aberration of magnification (CC) of the zoom lens at the telephoto end.

FIGS. 15A to 15L are aberration diagrams of the zoom lens according to the fifth embodiment in the state in which the zoom lens is focused on an object point at infinity. FIGS. 15A, 15B, 15C, and 15D respectively show spherical aberration (SA), astigmatism (AS), distortion (DT), and chromatic aberration of magnification (CC) of the zoom lens at the wide angle end. FIGS. 15E, 15F, 15G, and 15H respectively show spherical aberration (SA), astigmatism (AS), distortion (DT), and chromatic aberration of magnification (CC) of the zoom lens in the intermediate focal length state. FIGS. 15I, 15J, 15K, and 15L respectively show spherical aberration (SA), astigmatism (AS), distortion (DT), and chromatic aberration of magnification (CC) of the zoom lens at the telephoto end.

FIGS. 16A to 16L are aberration diagrams of the zoom lens according to the sixth embodiment in the state in which the zoom lens is focused on an object point at infinity. FIGS. 16A, 16B, 16C, and 16D respectively show spherical aberration (SA), astigmatism (AS), distortion (DT), and chromatic aberration of magnification (CC) of the zoom lens at the wide angle end. FIGS. 16E, 16F, 16G, and 16H respectively show spherical aberration (SA), astigmatism (AS), distortion (DT), and chromatic aberration of magnification (CC) of the zoom lens in the intermediate focal length state. FIGS. 16I, 16J, 16K, and 16L respectively show spherical aberration (SA), astigmatism (AS), distortion (DT), and chromatic aberration of magnification (CC) of the zoom lens at the telephoto end.

FIGS. 17A to 17L are aberration diagrams of the zoom lens according to the seventh embodiment in the state in which the zoom lens is focused on an object point at infinity. FIGS. 17A, 17B, 17C, and 17D respectively show spherical aberration (SA), astigmatism (AS), distortion (DT), and chromatic aberration of magnification (CC) of the zoom lens at the wide angle end. FIGS. 17E, 17F, 17G, and 17H respectively show spherical aberration (SA), astigmatism (AS), distortion (DT), and chromatic aberration of magnification (CC) of the zoom lens in the intermediate focal length state. FIGS. 17I, 17J, 17K, and 17L respectively show spherical aberration (SA), astigmatism (AS), distortion (DT), and chromatic aberration of magnification (CC) of the zoom lens at the telephoto end.

FIGS. 18A to 18L are aberration diagrams of the zoom lens according to the eighth embodiment in the state in which the zoom lens is focused on an object point at infinity. FIGS. 18A, 18B, 18C, and 18D respectively show spherical aberration (SA), astigmatism (AS), distortion (DT), and chromatic aberration of magnification (CC) of the zoom lens at the wide angle end. FIGS. 18E, 18F, 18G, and 18H respectively show spherical aberration (SA), astigmatism (AS), distortion (DT), and chromatic aberration of magnification (CC) of the zoom lens in the intermediate focal length state. FIGS. 18I, 18J, 18K, and 18L respectively show spherical aberration (SA), astigmatism (AS), distortion (DT), and chromatic aberration of magnification (CC) of the zoom lens at the telephoto end.

FIGS. 19A to 19L are aberration diagrams of the zoom lens according to the ninth embodiment in the state in which the zoom lens is focused on an object point at infinity. FIGS. 19A, 19B, 19C, and 19D respectively show spherical aberration (SA), astigmatism (AS), distortion (DT), and chromatic aberration of magnification (CC) of the zoom lens at the wide angle end. FIGS. 19E, 19F, 19G, and 19H respectively show spherical aberration (SA), astigmatism (AS), distortion (DT), and chromatic aberration of magnification (CC) of the zoom lens in the intermediate focal length state. FIGS. 19I, 19J, 19K, and 19L respectively show spherical aberration (SA), astigmatism (AS), distortion (DT), and chromatic aberration of magnification (CC) of the zoom lens at the telephoto end.

FIGS. 20A to 20L are aberration diagrams of the zoom lens according to the tenth embodiment in the state in which the zoom lens is focused on an object point at infinity. FIGS. 20A, 20B, 20C, and 20D respectively show spherical aberration (SA), astigmatism (AS), distortion (DT), and chromatic aberration of magnification (CC) of the zoom lens at the wide angle end. FIGS. 20E, 20F, 20G, and 20H respectively show spherical aberration (SA), astigmatism (AS), distortion (DT), and chromatic aberration of magnification (CC) of the zoom lens in the intermediate focal length state. FIGS. 20I, 20J, 20K, and 20L respectively show spherical aberration (SA), astigmatism (AS), distortion (DT), and chromatic aberration of magnification (CC) of the zoom lens at the telephoto end.

Next, parameter and values of conditional expressions (1) to (15), (A1) to (A3), (B1) to (B3), and (C1) to (C3) in each embodiments are described. Here, "--" shows that the parameter of the conditional expression is not calculated.

| | Conditional expression | Example1 | Example2 | Example3 | Example4 |
|---|---|---|---|---|---|
| (1) | $D_{23W}/D_{34W}$ | 1.42 | 1.30 | 1.28 | 1.46 |
| (2) | $f_3/f_4$ | −1.93 | −1.65 | −1.74 | −1.46 |
| (3) | $D_{23MIN}/f_3$ | −0.05 | −0.06 | −0.07 | −0.15 |
| (4) | $D_{23MAX}/f_3$ | −0.17 | −0.16 | −0.20 | −0.25 |
| (5) | $D_{23MIN}/D_{23W}$ | 0.31 | 0.37 | 0.46 | 0.63 |
| (6) | $D_{23T}/D_{23MIN}$ | 2.86 | 2.38 | 2.87 | 1.70 |
| (7) | $f_{1F}/f_{1R}$ | −0.18 | −0.17 | −0.17 | −0.17 |
| (8) | $D_{1FR}/f_1$ | −1.00 | −1.03 | −1.05 | −1.02 |
| (9) | $f_t/f_w$ | 3.84 | 3.83 | 3.84 | 3.84 |
| (10) | $F_{now}$ | 2.05 | 2.05 | 2.04 | 2.04 |
| (11) | $f_w/IH_t$ | 1.13 | 1.08 | 1.12 | 1.13 |
| (12) | $IH_w/IH_t$ | 0.87 | 0.87 | 0.87 | 0.87 |
| (13) | $\beta_{2T}/\beta_{2W}$ | 2.23 | 2.13 | 2.26 | 2.09 |
| (14) | $\beta_{3T}/\beta_{3W}$ | 1.55 | 1.58 | 1.48 | 1.59 |
| (15) | $\beta_{4T}/\beta_{4W}$ | 1.11 | 1.14 | 1.15 | 1.16 |
| (A1) | $f_{2F}/f_{2R}$ | — | 0.49 | 0.36 | 0.48 |
| (A2) | $f_{2F}/|f_{2C}|$ | — | 0.54 | 0.46 | 0.45 |
| (A3) | $f_{2R}/|f_{2C}|$ | — | 1.10 | 1.26 | 0.94 |
| (B1) | $(R_{1PF} + R_{1PR})/(R_{1PF} - R_{1PR})$ | — | −2.93 | −2.83 | −2.79 |
| (B2) | $vd_{1N} - vd_{1P}$ | — | 30.44 | 30.44 | 30.44 |
| (B3) | $(R_{1NF} + R_{1NR})/(R_{1NF} - R_{1NR})$ | — | 0.78 | 0.66 | 0.63 |
| (C1) | $D_{2G}/\phi S$ | — | 2.15 | 2.21 | 2.03 |
| (C2) | $f_{1F}/f_1$ | — | 0.67 | 0.68 | 0.68 |
| (C3) | $(R_{1NCF} + R_{1NCR})/(R_{1NCF} - R_{1NCR})$ | — | 0.78 | 0.66 | 0.63 |

| | Conditional expression | Example5 | Example6 | Example7 | Example8 |
|---|---|---|---|---|---|
| (1) | $D_{23W}/D_{34W}$ | 1.25 | 1.36 | 1.67 | 1.24 |
| (2) | $f_3/f_4$ | −1.75 | −1.48 | −1.11 | −1.13 |
| (3) | $D_{23MIN}/f_3$ | −0.07 | −0.14 | −0.06 | −0.07 |
| (4) | $D_{23MAX}/f_3$ | −0.20 | −0.24 | −0.18 | −0.20 |
| (5) | $D_{23MIN}/D_{23W}$ | 0.46 | 0.60 | 0.32 | 0.43 |
| (6) | $D_{23T}/D_{23MIN}$ | 2.89 | 1.76 | 2.74 | 2.94 |

-continued

| | Conditional expression | | | | |
|---|---|---|---|---|---|
| (7) | $f_{1F}/f_{1R}$ | -0.17 | -0.17 | -0.19 | -0.18 |
| (8) | $D_{1FR}/f_1$ | -1.05 | -1.03 | -0.99 | -1.00 |
| (9) | $f_t/f_w$ | 3.83 | 3.83 | 3.91 | 3.92 |
| (10) | $F_{now}$ | 2.04 | 2.05 | 2.04 | 2.05 |
| (11) | $f_w/IH_t$ | 1.12 | 1.12 | 1.18 | 1.19 |
| (12) | $IH_W/IH_t$ | 0.87 | 0.87 | 0.88 | 0.88 |
| (13) | $\beta_{2T}/\beta_{2W}$ | 2.25 | 2.09 | 2.16 | 2.22 |
| (14) | $\beta_{3T}/\beta_{3W}$ | 1.48 | 1.59 | 1.63 | 1.54 |
| (15) | $\beta_{4T}/\beta_{4W}$ | 1.15 | 1.15 | 1.11 | 1.14 |
| (A1) | $f_{2F}/f_{2R}$ | 0.35 | 0.45 | — | — |
| (A2) | $f_{2F}/|f_{2C}|$ | 0.44 | 0.42 | — | — |
| (A3) | $f_{2R}/|f_{2C}|$ | 1.27 | 0.92 | — | — |
| (B1) | $(R_{1PF} + R_{1PR})/(R_{1PF} - R_{1PR})$ | -2.68 | -3.15 | — | — |
| (B2) | $vd_{1N} - vd_{1P}$ | 30.44 | 30.44 | — | — |
| (B3) | $(R_{1NF} + R_{1NR})/(R_{1NF} - R_{1NR})$ | 0.65 | 0.67 | — | — |
| (C1) | $D_{2G}/\phi S$ | 2.18 | 2.07 | — | — |
| (C2) | $f_{1F}/f_1$ | 0.68 | 0.69 | — | — |
| (C3) | $(R_{1NCF} + R_{1NCR})/(R_{1NCF} - R_{1NCR})$ | 0.65 | 0.67 | — | — |

| | Conditional expression | Example9 | Example10 |
|---|---|---|---|
| (1) | $D_{23W}/D_{34W}$ | 1.25 | 1.28 |
| (2) | $f_3/f_4$ | -1.34 | -1.39 |
| (3) | $D_{23MIN}/f_3$ | -0.16 | -0.16 |
| (4) | $D_{23MAX}/f_3$ | -0.28 | -0.28 |
| (5) | $D_{23MIN}/D_{23W}$ | 0.68 | 0.68 |
| (6) | $D_{23T}/D_{23MIN}$ | 1.73 | 1.76 |
| (7) | $f_{1F}/f_{1R}$ | -0.17 | -0.17 |
| (8) | $D_{1FR}/f_1$ | -1.06 | -1.05 |
| (9) | $f_t/f_w$ | 3.84 | 3.85 |
| (10) | $F_{now}$ | 2.06 | 2.06 |
| (11) | $f_w/IH_t$ | 1.19 | 1.19 |
| (12) | $IH_W/IH_t$ | 0.88 | 0.88 |
| (13) | $\beta_{2T}/\beta_{2W}$ | 2.12 | 2.13 |
| (14) | $\beta_{3T}/\beta_{3W}$ | 1.62 | 1.60 |
| (15) | $\beta_{4T}/\beta_{4W}$ | 1.12 | 1.13 |
| (A1) | $f_{2F}/f_{2R}$ | — | — |
| (A2) | $f_{2F}/|f_{2C}|$ | — | — |
| (A3) | $f_{2R}/|f_{2C}|$ | — | — |
| (B1) | $(R_{1PF} + R_{1PR})/(R_{1PF} - R_{1PR})$ | -3.22 | -2.87 |
| (B2) | $vd_{1N} - vd_{1P}$ | 31.40 | 31.27 |
| (B3) | $(R_{1NF} + R_{1NR})/(R_{1NF} - R_{1NR})$ | 0.63 | 0.58 |
| (C1) | $D_{2G}/\phi S$ | 1.96 | 1.98 |
| (C2) | $f_{1F}/f_1$ | 0.68 | 0.67 |
| (C3) | $(R_{1NCF} + R_{1NCR})/(R_{1NCF} - R_{1NCR})$ | 0.63 | 0.58 |

(Correction of Distortion)

Incidentally, when the zoom lens system of the present invention is used, a digital correction of distortion of an image may be carried out electrically. A basic concept for the digital correction of the distortion of an image will be described below.

Figure 21:
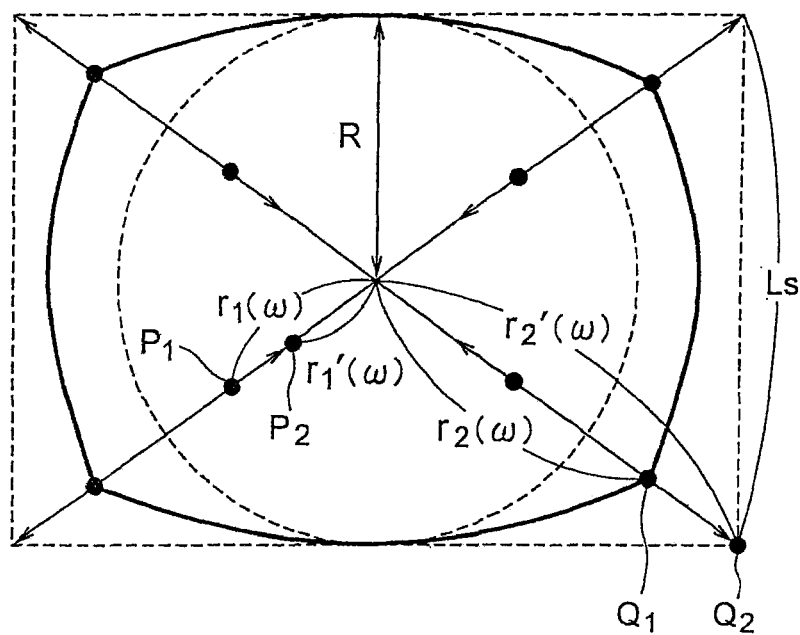
FIG. 21 illustrates correction of distortion.

For example, as shown in FIG. 21, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 21, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \tan \omega$$

where, $\omega$ is a half image angle of an object, f is a focal length of an imaging optical system (the zoom lens system in the present invention), and $\alpha$ is not less than zero and not more than 1.

Here, when an ideal image height corresponding to a circle (image height) of radius R is let to be Y, then $$\alpha = R/Y = R/(f \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega) - r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq 0.6 Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

The image pickup apparatus according to the present invention that forms an image of an object by a zoom lens and picks up the image by receiving it by an electronic image pickup element such as a CCD can be applied to an electronic image pickup apparatus, in particular to a digital camera or a video camera. In the following, an embodiment of the electronic image pickup apparatus will be described.

Figure 22:
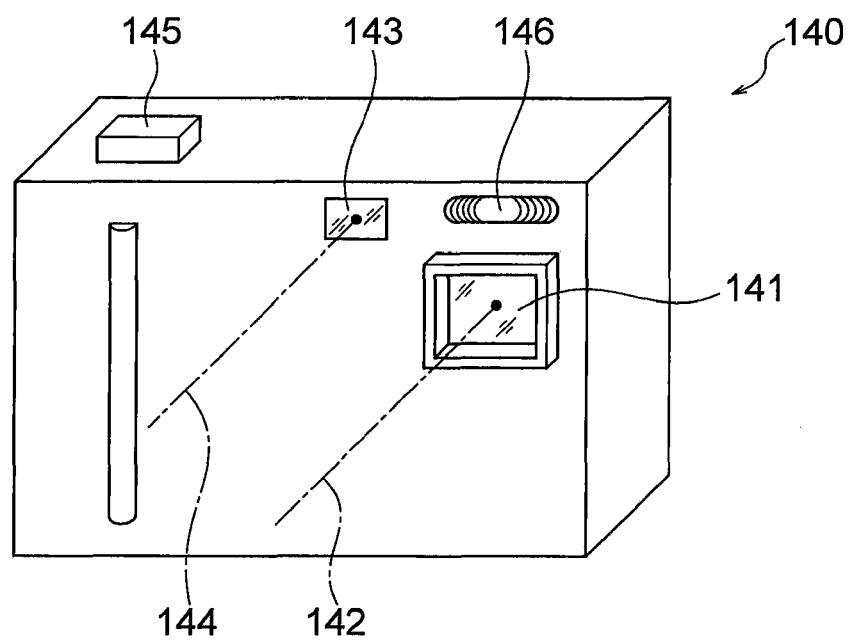
FIG. 22 is a front perspective view showing the outer appearance of a digital camera equipped with a zoom lens with a bent optical path according to the present invention.
Figure 23:
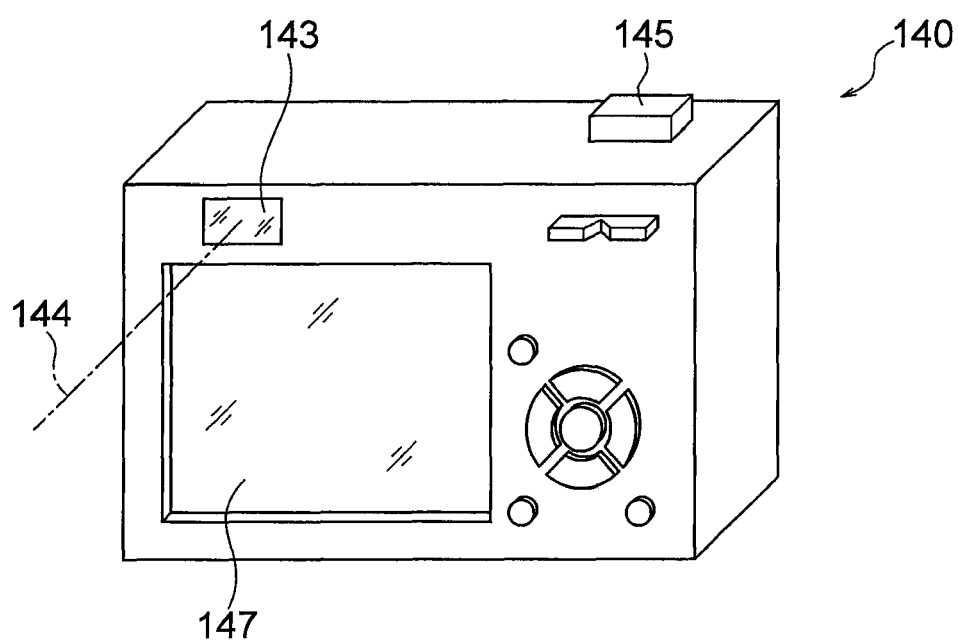
FIG. 23 is a rear perspective view of the digital camera.

FIGS. 22 to 24 schematically illustrate a digital camera equipped with a zoom lens as a taking optical system 141 according to the present invention. FIG. 22 is a front perspective view showing the outer appearance of the digital camera 140. FIG. 23 is a rear perspective view of the digital camera 140. FIG. 24 is a diagram schematically showing the internal construction of the digital camera 140. FIG. 24 shows a cross section, seen from above, taken on a plane perpendicular to the vertical direction of the digital camera 140. In FIG. 24, the viewfinder optical system and the cover glasses provided in front and rear of it are not illustrated. In the plane of the drawing sheet of FIG. 24, the longitudinal sides of the effective image pickup area of the CCD 149 are oriented parallel to the thickness direction of the digital camera 140.

The digital camera 140 illustrated in the drawings has the taking optical system 141 having a taking optical path 142, a viewfinder optical system 143 having a viewfinder optical path 144, a shutter release button 145, a flash 146, and a liquid crystal display monitor 147. In response to depression of the shutter release button 145 provided on the top of the camera 140, shooting through the taking optical system 141, e.g. the zoom lens having a bent optical path according to the first embodiment, is effected. Specifically, an image of an object is formed by the taking optical system 141 on the image pickup surface of the CCD 149 through a near-infrared cut filter and an optical low pass filter F. The image of the object picked up by the CCD 149 is processed by a processing unit 151 and displayed as an electronic image on the liquid crystal display monitor 147 provided on the back of the camera. The processing unit 151 is connected with a storage unit 152, in which picked-up electronic images can be stored. The storage unit 152 may be provided separately from the processing unit 151. The storage unit 152 may be an electrically writable medium such as a flexible disk, memory card, or MO. A C-MOS sensor may be used in place of the CCD 149.

A viewfinder objective optical system (not shown) is provided in the viewfinder optical path 144. An image of an object formed by the viewfinder objective optical system is formed in the viewfinder frame (not shown) of a Porro prism (not shown), which serves as an image erecting member. An eyepiece optical system (not shown) for delivering the erected image to the observer's eye E is provided in rear of the Porro prism. In addition, cover members 150 are provided at the entrance of the taking optical system 141, at the entrance of the viewfinder objective optical system, and at the exit of the eyepiece optical system respectively.

The taking optical system 141 of the digital camera 140 having the above-described construction is a zoom lens having a high zoom ratio of approximately 4 (four), high speed, and high optical performance. Therefore, an inexpensive, high-performance digital camera that is very slim in depth can be realized.

The plane parallel plates or the cover members 150 in the digital camera illustrated in FIG. 24 may be eliminated.

(Internal Circuit Configuration)

Figure 25:
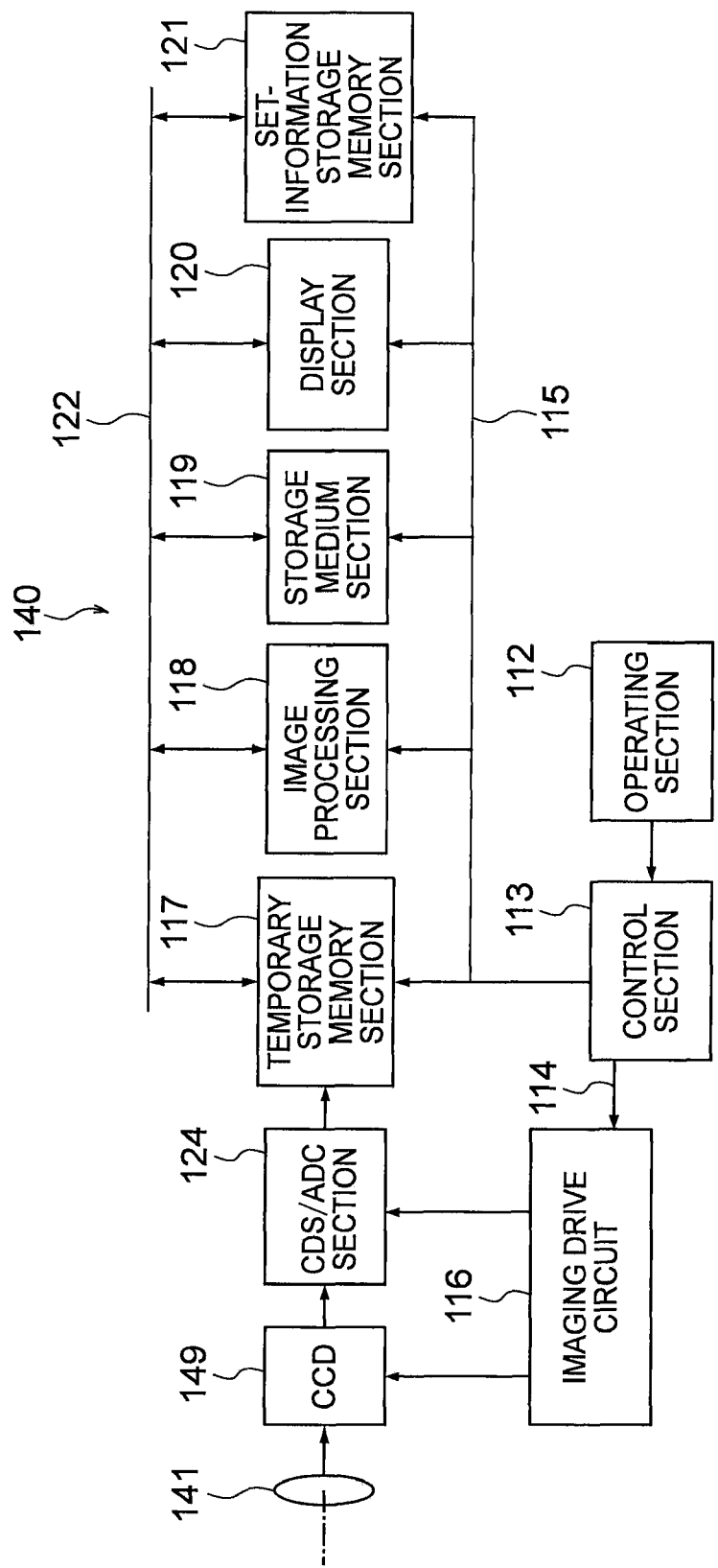
FIG. 25 is a block diagram showing the basic internal circuit configuration of the digital camera.

FIG. 25 is a block diagram of the relevant portion of the internal circuit of the digital camera 140. In the case described here, the processing unit described above includes for instance, a CDS/ADC section 124, a temporary storage memory 117, and an image processing section 118, and the storage unit includes a storage medium 119 for example.

As shown in FIG. 25, the digital camera 140 has an operating section 112 and a control section 113 connected to the operating section 112, an image pickup drive circuit 116 connected to a control signal output port of the control section 113 via a bus 114, the temporary storage memory 117, the image processing section 118, the storage medium 119, a display section 120, and a set-information storage memory section 121. The temporary storage memory 117, the image processing section 118, the storage medium 119, the display section 120, and the set-information storage memory section 121 are connected to control signal output ports of the control section 113 via buses 115.

The temporary storage memory 117, the image processing section 118, the storage medium section 119, the display section 120, and the set-information storage memory section 121 are configured to be capable of mutually inputting and outputting data via a bus 122. Moreover, the CCD 149 and the CDS/ADC section 124 are connected to the image pickup drive circuit 116.

The operating section 112 is a circuit equipped with various entry buttons and switches. The operating section 112 notifies the control section of event information entered from outside (by a user of the camera) through the entry buttons and switches.

The control section 113 is, for example, a central processing unit (CPU) and has a built-in program memory, which is not shown in the drawings. The control section 113 is a circuit that controls the entire digital camera 140 according to a program stored in the program memory, in response to instructions and commands entered by the user of the camera through the operating section 112.

The CCD 149 receives an image of the object formed by the taking optical system 141 according to the present invention. The CCD 149 is an image pickup element that is driven and controlled by the image pickup drive circuit 116 to convert the quantity of light of the object image into an electrical signal on a pixel-by-pixel basis and output it to the CDS/ADC section 124.

The CDS/ADC section 124 is a circuit that amplifies the electrical signal input from the CCD 149, performs analog-to-digital conversion, and outputs to the temporary storage memory 117 raw image data (or Bayer data, which will be hereinafter referred to as "RAW data") that has undergone only amplification and digital conversion.

The temporary storage memory 117 serves as a buffer and may consist of an SDRAM for example. The temporary storage memory 117 is a memory device that temporarily stores the RAW data output from the CDS/ADC section 124. The image processing section 118 is a circuit that reads the RAW data stored in the temporary storage memory 117 or the RAW data stored in the storage medium section 119 and performs various electrical image processing including distortion correction based on image-quality parameters specified by the control section 113.

The storage medium section 119 allows a detachable mounting of a recording medium such as, for example, a card-type or stick-type flash memory. The storage medium section 119 is a control circuit of the apparatus that records or writes RAW data transferred from the temporary storage memory 117 and image data having been processed in the image processing section 118 in the card-type or stick-type flash memory to have the data stored in it.

The display section 120 is equipped with the liquid-crystal display monitor and causes it to display images and operation menu etc. The set-information storage memory section 121 includes a ROM section in which various image-quality parameters are stored in advance and a RAM section for storing image quality parameters selected by an entry(ies) made through the operating section 112 from among the image quality parameters read from the ROM section. The set-information storage memory section 121 is a circuit that controls the input/output to/from the memories.

As described above, the digital camera 140 is equipped with the taking optical system 141 which is designed according to the present invention to have a sufficient wide angle focal length range, high speed, high zoom ratio, and stable imaging performance throughout the entire zoom range while being compact. Thus, high performance, small size, and wide angle of view can be achieved.

As described in the foregoing, the image pickup apparatus equipped with a zoom lens with a bent optical path according to the present invention is advantageous when a sufficiently wide angle of view, sufficiently high zoom ratio, sufficiently high speed, and satisfactory optical performance are all to be achieved.

The image pickup apparatus according to the first aspect of the present invention is equipped with a negative-lead zoom lens with a bent optical path, which is advantageous for achieving a wide angle of view and slimming of the image pickup apparatus. Thus, there can be provided an image pickup apparatus that can advantageously be designed to have satisfactory optical performance even with high speed and high zoom ratio.

The image pickup apparatus according to the second and fourth aspects of the present invention is equipped with a negative-lead zoom lens with a bent optical path, which is advantageous for achieving a wide angle of view and slimming of the image pickup apparatus. Thus, there can be provided an image pickup apparatus that can advantageously be designed to have satisfactory optical performance and small size even with high speed and high zoom ratio.

The image pickup apparatus equipped with a zoom lens with a bent optical path according to the third aspect of the present invention is advantageous when a sufficiently wide angle of view at the wide angle end, small size, and low cost are all to be achieved.

What is claimed is:

1. An image pickup apparatus equipped with a zoom lens with a bent optical path, comprising:
a zoom lens including a reflecting member having a reflecting surface that bends the optical path; and
an image pickup element disposed on the image side of the zoom lens and having an image pickup surface that receives an image formed by the zoom lens and converts it to an electrical signal,
wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power,
during zooming from the wide angle end to the telephoto end, the second lens unit moves closer to the first lens unit only toward the object side, the third lens unit moves in such a way that it becomes closest to the second lens unit at an intermediate focal length position in the course of zooming from the wide angle end to the telephoto end as compared to the state at the wide angle end and the state at the telephoto end, the fourth lens unit moves, and the following conditional expression (1) is satisfied:

$$0.3 < D_{23W}/D_{34W} < 9 \tag{1},$$

where $D_{23W}$ is the axial distance between the second lens unit and the third lens unit at the wide angle end, and $D_{34W}$ is the axial distance between the third lens unit and the fourth lens unit at the wide angle end.

2. An image pickup apparatus equipped with a zoom lens with a bent optical path comprising:

a zoom lens including a reflecting member having a reflecting surface that bends the optical path; and an image pickup element disposed on the image side of the zoom lens and having an image pickup surface that receives an image formed by the zoom lens and converts it to an electrical signal, wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power, the total number of lens units in the zoom lens is four, during zooming from the wide angle end to the telephoto end, the second lens unit moves closer to the first lens unit only toward the object side, the distance between the second lens unit and the third lens unit changes, and the distance between the third lens unit and the fourth lens unit changes, the second lens unit comprises at least three lens components including an object side positive lens component having a positive refractive power and located closest to the object side among the lens components in the second lens unit, an image side positive lens component having a positive refractive power and located closest to the image side among the lens components in the second lens unit, and a cemented lens component including a positive lens and a negative lens and located between the object side positive lens component and the image side positive lens component, and the following conditional expression (A1) is satisfied:

$$0.1 < f_{2F}/f_{2R} < 0.61 \tag{A1},$$

$$0.7 < |f_{2R}/f_{2C}| < 5 \tag{A3-1}$$

where $f_{2F}$ is the focal length of the object side positive lens component in the second lens unit, and $f_{2R}$ is the focal length of the image side positive lens component in the second lens unit.

3. An image pickup apparatus equipped with a zoom lens with a bent optical path comprising:

a zoom lens including a reflecting member having a reflecting surface that bends the optical path; and an image pickup element disposed on the image side of the zoom lens and having an image pickup surface that receives an image formed by the zoom lens and converts it to an electrical signal, wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power, during zooming from the wide angle end to the telephoto end, the second lens unit moves closer to the first lens unit only toward the object side, the distance between the second lens unit and the third lens unit changes, and the distance between the third lens unit and the fourth lens unit changes, the first lens unit comprises, in order from the object side to the image side along the optical axis, a negative single lens having a negative refractive power, the reflecting member, and a positive single lens having a positive refractive power and having a meniscus shape with a convex surface facing the object side, the total number of non-cemented lenses in the first lens unit is two, and the reflecting member is a reflecting prism having a flat entrance surface and a flat exit surface.

4. An image pickup apparatus equipped with a zoom lens with a bent optical path comprising:

a zoom lens including a reflecting member having a reflecting surface that bends the optical path; and an image pickup element disposed on the image side of the zoom lens and having an image pickup surface that receives an image formed by the zoom lens and converts it to an electrical signal, wherein the zoom lens comprises, in order from the object side to the image side, a first lens unit including the reflecting member and having a negative refractive power, a second lens unit having a positive refractive power, a third lens unit having a negative refractive power, and a fourth lens unit having a positive refractive power, during zooming from the wide angle end to the telephoto end, the second lens unit moves closer to the first lens unit toward the object side, the distance between the second lens unit and the third lens unit changes, and the distance between the third lens unit and the fourth lens unit changes, and the second lens unit comprises at least five lenses including a plurality of positive lenses and at least one negative lens.

5. The image pickup apparatus equipped with a zoom lens with a bent optical path according to claim 1, wherein the zoom lens is essentially a four-units zoom lens.

6. The image pick up apparatus equipped with a zoom lens with a bent optical path according to claim 1, wherein the third lens unit moves only toward the object side during zooming from the wide angle end to the telephoto end.

7. The image pick up apparatus equipped with a zoom lens with a bent optical path according to claim 1, wherein the third lens unit and the fourth lens unit satisfy the following conditional expression (2):

$$-5 < f_3/f_4 < -1 \tag{2},$$

where $f_3$ is the focal length of the third lens unit, and $f_4$ is the focal length of the fourth lens unit.

8. The image pick up apparatus equipped with a zoom lens with a bent optical path according to claim 1, wherein the following conditional expressions (3) and (4) are satisfied:

$$-0.2 < D_{23MIN}/f_3 < -0.01 \tag{3, and}$$

$$-0.6 < D_{23MAX}/f_3 < -0.1 \tag{4},$$

where $D_{23MIN}$ is the smallest value of the distance on the optical axis between the second lens unit and the third lens unit, $D_{23MAX}$ is the largest value of the distance on the optical axis between the second lens unit and the third lens unit, and $f_3$ is the focal length of the third lens unit.

9. The image pick up apparatus equipped with a zoom lens with a bent optical path according to claim 1, wherein the following conditional expression (5) is satisfied:

$$0.1 < D_{23MIN}/D_{23W} < 0.9 \quad (5),$$

where $D_{23MIN}$ is the smallest value of the distance on the optical axis between the second lens unit and the third lens unit, and $D_{23W}$ is the distance on the optical axis between the second lens unit and the third lens unit at the wide angle end.

10. The image pick up apparatus equipped with a zoom lens with a bent optical path according to claim 1, wherein the following conditional expression (6) is satisfied:

$$1.1 < D_{23T}/D_{23MIN} < 6 \quad (6),$$

where $D_{23T}$ is the distance on the optical axis between the second lens unit and the third lens unit at the telephoto end, and $D_{23MIN}$ is the smallest value of the distance on the optical axis between the second lens unit and the third lens unit.

11. The image pick up apparatus equipped with a zoom lens with a bent optical path according to claim 1, wherein the fourth lens unit moves to be located closer to the image side at the telephoto end than at the wide angle end.

12. The image pick up apparatus equipped with a zoom lens with a bent optical path according to claim 11, wherein the fourth lens unit moves only toward the image side during zooming from the wide angle end to the telephoto end.

13. The image pick up apparatus equipped with a zoom lens with a bent optical path according to claim 1, wherein the position of the first lens unit is fixed relative to the image pickup surface.

14. The image pick up apparatus equipped with a zoom lens with a bent optical path according to claim 1, wherein the first lens unit has curved lens surfaces each having a refractive power located respectively on the object side and on the image side of the reflecting surface, a portion of the first lens unit that is located on the object side of the reflecting surface of the reflecting member has a negative refractive power, a portion of the first lens unit that is located on image side of the reflecting surface of the reflecting member has a positive refractive power, and the first lens unit satisfies the following conditional expressions (7) and (8):

$$-0.5 < f_{1F}/f_{1R} < -0.06 \quad (7), \text{ and}$$

$$-3 < D_{1FR}/f_1 < -0.5 \quad (8),$$

where $f_{1F}$ is the combined focal length of the portion of the first lens unit that is located on the object side of the reflecting surface, $f_{1R}$ is the combined focal length of the portion of the first lens unit that is located on the image side of the reflecting surface, $D_{1FR}$ is the physical distance along the optical axis from the lens surface closest to the reflecting surface among the lens surfaces that are located on the object side of the reflecting surfaces to the lens surface closest to the reflecting surface among the lens surfaces that are located on the image side of the reflecting surfaces, and $f_1$ is the focal length of the first lens unit.

15. The image pick up apparatus equipped with a zoom lens with a bent optical path according to claim 1, wherein the second lens unit comprises three positive lenses and one negative lens, the zoom lens has an aperture stop that is located closer to the image side than the first lens unit and closer to the object side than the lens closest to the image side in the second lens unit and moves toward the object side during zooming from the wide angle end to the telephoto end, and the zoom lens satisfies the following conditional expressions (9) and (10):

$$3.3 < f_t/f_w < 15.0 \quad (9), \text{ and}$$

$$1.2 < F_{now} < 2.4 \quad (10),$$

where $f_t$ is the focal length of the zoom lens at the telephoto end, $f_w$ is the focal length of the zoom lens at the wide angle end, and $F_{now}$ is the least F-number of the zoom lens at the wide angle end.

16. The image pick up apparatus equipped with a zoom lens with a bent optical path according to claim 1, wherein the second lens unit consists of five lenses having, in order from the object side, a first positive lens, a second positive lens, a first negative lens, a second negative lens, and a third positive lens.

17. The image pick up apparatus equipped with a zoom lens with a bent optical path according to claim 1, wherein the first lens unit consists of, in order from the object side to the image side, a biconcave lens component, a prism having the reflecting surface, and a positive meniscus lens component having a convex surface facing the object side, and the following conditional expressions (11) and (12) are satisfied:

$$0.8 < f_w/IH_t < 1.4 \quad (11), \text{ and}$$

$$0.75 < IH_w/IH_t < 0.95 \quad (12),$$

where $f_w$ is the focal length of the zoom lens at the wide angle end, $IH_t$ is the largest image height at the telephoto end or half the diagonal length of the effective image pickup area of the image pickup element at the telephoto end, $IH_w$ is the largest image height at the wide angle end or half the diagonal length of the effective image pickup area of the image pickup element at the wide angle end, where the term "lens component" refers to a lens member whose refractive surfaces that are in contact with air on the optical axis include only two surfaces or an object side surface and an image side surface.

18. The image pick up apparatus equipped with a zoom lens with a bent optical path according to claim 1, wherein the second lens unit, the third lens unit, and the fourth lens unit satisfy the following conditional expressions (13), (14), and (15):

$$1.7 < \beta_{2T}/\beta_{2W} < 6.0 \quad (13),$$

$$1.20 < \beta_{3T}/\beta_{3W} < 4.0 \quad (14), \text{ and}$$

$$1.04 < \beta_{4T}/\beta_{4W} < 2.0 \quad (15),$$

where $\beta_{2T}$ is the lateral magnification of the second lens unit at the telephoto end in a state in which the zoom lens is focused on an object point at infinity, $\beta_{2W}$ is the lateral magnification of the second lens unit at the wide angle end, in a state in which the zoom lens is focused on an object point at infinity, $\beta_{3T}$ is the lateral magnification of the third lens unit at the telephoto end, in a state in which the zoom lens is focused on an object point at infinity, $\beta_{3W}$ is the lateral magnification of the third lens unit at the wide angle end, in a state in which the zoom lens is focused on an object point at infinity, $\beta_{4T}$ is the lateral magnification of the fourth lens unit at the telephoto end, in a state in which the zoom lens is focused on an object point at infinity, and $\beta_{4W}$ is the lateral magnification of the fourth lens unit at the wide angle end in a state in which the zoom lens is focused on an object point at infinity.

19. The image pick up apparatus equipped with a zoom lens with a bent optical path according to claim 2, wherein the second lens unit consists of three lens components having, in order from the object side to the image side, the object side positive lens component, the cemented lens component, and the image side positive lens component.

20. The image pick up apparatus equipped with a zoom lens with a bent optical path according to claim 19, wherein the cemented lens component has a negative refractive power.

21. The image pick up apparatus equipped with a zoom lens with a bent optical path according to claim 20, wherein the following conditional expressions (A2) and (A3) are satisfied:

$$0.1 < f_{2F}/|f_{2C}| < 1 \quad (A2), \text{ and}$$

$$0.2 < f_{2R}/|f_{2C}| < 5 \quad (A3),$$

where $f_{2C}$ is the focal length of the cemented lens component in the second lens unit.

22. The image pick up apparatus equipped with a zoom lens with a bent optical path according to claim 2, wherein the image side positive lens component is a cemented lens component made up of a negative lens and a positive lens.

23. The image pick up apparatus equipped with a zoom lens with a bent optical path according to claim 2, wherein the second lens unit consists, in order from the object side to the image side, of a positive single lens constituting the object side positive lens component, the cemented lens component made up of a positive lens and negative lens arranged in order from the object side, and a positive single lens constituting the image side positive lens component.

24. The image pick up apparatus equipped with a zoom lens with a bent optical path according to claim 2, wherein the second lens unit consists, in order from the object side to the image side, of a positive single lens constituting the object side positive lens component, the cemented lens component made up of a positive lens and a negative lens arranged in order from the object side, and a cemented lens component made up of a negative lens and a positive lens arranged in order from the object side, constituting the image side positive lens component.

25. The image pick up apparatus equipped with a zoom lens with a bent optical path according to claim 2, wherein the third lens unit moves in such a way that it becomes closest to the second lens unit at an intermediate focal length position in the course of zooming from the wide angle end to the telephoto end as compared to the state at the wide angle end and the state at the telephoto end, and the following conditional expression (1) is satisfied:

$$0.3 < D_{23W}/D_{34W} < 9 \quad (1),$$

where $D_{23W}$ is the axial distance between the second lens unit and the third lens unit at the wide angle end, and $D_{34W}$ is the axial distance between the third lens unit and the fourth lens unit at the wide angle end.

26. The image pick up apparatus equipped with a zoom lens with a bent optical path according to claim 3, wherein the positive single lens in the first lens unit satisfies the following conditional expression (B1):

$$-8 < (R_{1PF}+R_{1PR})/(R_{1PF}-R_{1PR}) < -1 \quad (B1),$$

where $R_{1PF}$ is the paraxial radius of curvature of the object side surface of the positive single lens in the first lens unit, and $R_{1PR}$ is the paraxial radius of curvature of the image side surface of the positive single lens in the first lens unit.

27. The image pick up apparatus equipped with a zoom lens with a bent optical path according to claim 3, wherein the negative single lens and the positive single lens in the first lens unit satisfy the following conditional expression (B2):

$$20 < vd_{1N} - vd_{1P} < 40 \quad (B2),$$

where $vd_{1N}$ is the Abbe constant with respect to the d-line of the negative single lens in the first lens unit, and $vd_{1P}$ is the Abbe constant with respect to the d-line of the positive single lens in the first lens unit.

28. The image pick up apparatus equipped with a zoom lens with a bent optical path according to claim 3, wherein the negative single lens in the first lens unit has a biconcave shape that satisfies the following conditional expression (B3):

$$0.4 < (R_{1NF}+R_{1NR})/(R_{1NF}-R_{1NR}) < 1 \quad (B3),$$

where $R_{1NF}$ is the paraxial radius of curvature of the object side surface of the negative single lens in the first lens unit, and $R_{1NR}$ is the paraxial radius of curvature of the image side surface of the negative single lens in the first lens unit.

29. The image pick up apparatus equipped with a zoom lens with a bent optical path according to claim 3, wherein the second lens unit comprises at least three lens components including an object side positive lens component having a positive refractive power and located closest to the object side among the lens components in the second lens unit, an image side positive lens component having a positive refractive power and located closest to the image side among the lens components in the second lens unit, and a cemented lens component including a positive lens and a negative lens and located between the object side positive lens component and the image side positive lens component.

30. The image pick up apparatus equipped with a zoom lens with a bent optical path according to claim 29, wherein the following conditional expression (A1) is satisfied:

$$0.1 < f_{2F}/f_{2R} < 0.61 \quad (A1),$$

where $f_{2F}$ is the focal length of the object side positive lens component in the second lens unit, and $f_{2R}$ is the focal length of the image side positive lens component in the second lens unit.

31. The image pick up apparatus equipped with a zoom lens with a bent optical path according to claim 3, wherein the zoom lens has an aperture stop that is located closer to the image side than the first lens unit and closer to the object side than the lens closest to the image side in the second lens unit and moves toward the object side during zooming from the wide angle end to the telephoto end, and the zoom lens satisfies the following conditional expressions (9) and (10):

$$3.3 < f_t/f_w < 15.0 \quad (9), \text{ and}$$

$$1.2 < F_{now} < 2.4 \quad (10),$$

where $f_t$ is the focal length of the zoom lens at the telephoto end, $f_w$ is the focal length of the zoom lens at the wide angle end, and $F_{now}$ is the least F-number of the zoom lens at the wide angle end.

32. The image pick up apparatus equipped with a zoom lens with a bent optical path according to claim 3, wherein the following conditional expressions (11) and (12) are satisfied:

$$0.8 < f_{wx}/IH_t < 1.4 \quad (11), \text{ and}$$

$$0.75 < IH_w/IH_t < 0.95 \quad (12),$$

where $f_w$ is the focal length of the zoom lens at the wide angle end, $IH_t$ is the largest image height at the telephoto end or half the diagonal length of the effective image pickup area of the image pickup element at the telephoto end, and $IH_w$ is the largest image height at the wide angle end or half the diagonal length of the effective image pickup area of the image pickup element at the wide angle end.

33. The image pick up apparatus equipped with a zoom lens with a bent optical path according to claim 4, wherein the zoom lens has an aperture stop that moves toward the object side during zooming from the wide angle end to the telephoto end.

34. The image pick up apparatus equipped with a zoom lens with a bent optical path according to claim 4, wherein the first lens unit consists, in order from the object side to the image side along the optical axis, of a biconcave lens component having a negative refractive power, the reflecting member, and a positive lens component having a positive refractive power, the biconcave lens component having an aspheric lens surface.

35. The image pick up apparatus equipped with a zoom lens with a bent optical path according to claim 34, wherein the biconcave lens component includes a plurality of aspheric lens surfaces.

36. The image pick up apparatus equipped with a zoom lens with a bent optical path according to claim 34, wherein the following conditional expression (C2) is satisfied:

$$0.3 < f_{1F}/f_1 < 0.9 \tag{C2}$$

where $f_{1F}$ is the combined focal length of a portion of the first lens unit that is located on the object side of the reflecting surface, and $f_1$ is the focal length of the first lens unit.

37. The image pick up apparatus equipped with a zoom lens with a bent optical path according to claim 34, wherein the following conditional expression (C3) is satisfied:

$$0.4 < (R_{1NCF} + R_{1NCR})/(R_{1NCF} - R_{1NCR}) < 1 \tag{C3}$$

where $R_{1NCF}$ is the paraxial radius of curvature of the object side surface of the biconcave lens component in the first lens unit, and $R_{1NCR}$ is the paraxial radius of curvature of the image side surface of the biconcave lens component in the first lens unit.

38. The image pick up apparatus equipped with a zoom lens with a bent optical path according to claim 4, wherein the magnification of the third lens unit is higher at the telephoto end in a state in which the zoom lens is focused on an object point at infinity than at the wide angle end in a state in which the zoom lens is focused on an object point at infinity.

39. The image pick up apparatus equipped with a zoom lens with a bent optical path according to claim 4, wherein the first lens unit consists, in order from the object side to the image side along the optical axis, of a negative single lens having a negative refractive power, the reflecting member, and a positive single lens having a positive refractive power and having a meniscus shape with a convex surface facing the object side, and the reflecting member is a reflecting prism having a flat entrance surface and a flat exit surface.

40. The image pick up apparatus equipped with a zoom lens with a bent optical path according to claim 39, wherein the positive single lens in the first lens unit satisfies the following conditional expression (B1):

$$-8 < (R_{1PF} + R_{1PR})/(R_{1PF} - R_{1PR}) < -1 \tag{B1}$$

where $R_{1PF}$ is the paraxial radius of curvature of the object side surface of the positive single lens in the first lens unit, and $R_{1PR}$ is the paraxial radius of curvature of the image side surface of the positive single lens in the first lens unit.

41. The image pick up apparatus equipped with a zoom lens with a bent optical path according to claim 39, wherein the negative single lens and the positive single lens in the first lens unit satisfy the following conditional expression (B2):

$$20 < vd_{1N} - vd_{1P} < 40 \tag{B2}$$

where $vd_{1N}$ is the Abbe constant with respect to the d-line of the negative single lens in the first lens unit, and $vd_{1P}$ is the Abbe constant with respect to the d-line of the positive single lens in the first lens unit.

42. The image pick up apparatus equipped with a zoom lens with a bent optical path according to claim 29, wherein the second lens unit consists of three lens components including, in order from the object side to the image side, the object side positive lens component, the cemented lens component, and the image side positive lens component.

43. The image pick up apparatus equipped with a zoom lens with a bent optical path according to claim 29, wherein the cemented lens component has a negative refractive power.

44. The image pick up apparatus equipped with a zoom lens with a bent optical path according to claim 43, wherein the following conditional expressions (A2) and (A3) are satisfied:

$$0.1 < f_{2F}/|f_{2C}| < 1 \tag{A2}$$

$$0.2 < f_{2R}/|f_{2C}| < 5 \tag{A3}$$

where $f_{2F}$ is the focal length of the object side positive lens component in the second lens unit, $f_{2C}$ is the focal length of the image side positive lens component in the second lens unit, and $f_{2C}$ is the focal length of the cemented lens component in the second lens unit.

45. The image pick up apparatus equipped with a zoom lens with a bent optical path according to claim 29, wherein the image side positive lens component is a cemented lens component made up of a negative lens and a positive lens.

46. The image pick up apparatus equipped with a zoom lens with a bent optical path according to claim 29, wherein the second lens unit consists, in order from the object side to the image side, of a positive single lens constituting the object side positive lens component, the cemented lens component made up of a positive lens and negative lens arranged in order from the object side, and a positive single lens constituting the image side positive lens component.

47. The image pick up apparatus equipped with a zoom lens with a bent optical path according to claim 29, wherein the second lens unit consists, in order from the object side to the image side, of a positive single lens constituting the object side positive lens component, the cemented lens component made up of a positive lens and a negative lens arranged in order from the object side, and a cemented lens component made up of a negative lens and a positive lens arranged in order from the object side, constituting the image side positive lens component.

48. The image pick up apparatus equipped with a zoom lens with a bent optical path according to claim 1, wherein the first lens unit is fixed during zooming from the wide angle end to the telephoto end.

49. The image pick up apparatus equipped with a zoom lens with a bent optical path according to claim 2, wherein the first lens unit is fixed during zooming from the wide angle end to the telephoto end.

50. The image pick up apparatus equipped with a zoom lens with a bent optical path according to claim 3, wherein the first lens unit is fixed during zooming from the wide angle end to the telephoto end.

51. The image pick up apparatus equipped with a zoom lens with a bent optical path according to claim 4, wherein the first lens unit is fixed during zooming from the wide angle end to the telephoto end.

* * * * *